United States Patent [19]

Olmstead

[11] Patent Number: 5,770,847
[45] Date of Patent: Jun. 23, 1998

[54] BAR CODE READER WITH MULTI-FOCUS LENS

[75] Inventor: Bryan Olmstead, Eugene, Oreg.

[73] Assignee: Spectra-Physics Scanning Systems, Inc., Eugene, Oreg.

[21] Appl. No.: 363,258

[22] Filed: Dec. 23, 1994

[51] Int. Cl.$^6$ ........................................... G06K 7/10
[52] U.S. Cl. ..................... 235/462; 235/472; 235/454; 235/467; 235/470; 250/201; 250/568; 359/565; 359/30
[58] Field of Search ..................... 235/462, 472, 235/454, 467, 470; 250/566, 234, 568, 201, 216, 204; 359/30, 565, 742, 825

[56] References Cited

U.S. PATENT DOCUMENTS

| | | | |
|---|---|---|---|
| 2,811,081 | 10/1957 | Praeger | 88/57 |
| 3,004,470 | 10/1961 | Rühle | 88/57 |
| 3,801,775 | 4/1974 | Acker | 235/61.11 E |
| 4,000,397 | 12/1976 | Hebert et al. | 235/61.11 E |
| 4,135,161 | 1/1979 | Torrieri | 328/108 |
| 4,246,612 | 1/1981 | Berry et al. | 358/206 |
| 4,335,302 | 6/1982 | Robillard | 235/462 |
| 4,354,101 | 10/1982 | Hester et al. | 235/463 |
| 4,612,437 | 9/1986 | Ohsato | 250/201 |
| 4,675,513 | 6/1987 | Kuze | 235/375 |
| 4,687,912 | 8/1987 | Ohta | 235/463 |
| 4,691,367 | 9/1987 | Wevelsiep | 382/61 |
| 4,697,098 | 9/1987 | Cloke | 307/354 |
| 4,740,675 | 4/1988 | Brosnan et al. | 235/462 |
| 4,749,879 | 6/1988 | Peterson et al. | 307/354 |
| 4,782,220 | 11/1988 | Shuren | 235/463 |
| 4,818,886 | 4/1989 | Drucker | 250/566 |
| 4,843,222 | 6/1989 | Hochgraf | 235/470 |
| 4,861,972 | 8/1989 | Elliott et al. | 235/462 |
| 4,874,933 | 10/1989 | Sanner | 235/470 |
| 4,879,456 | 11/1989 | Cherry et al. | 235/462 |
| 4,963,719 | 10/1990 | Brooks et al. | 235/462 |
| 4,978,860 | 12/1990 | Bayley et al. | 250/568 |
| 5,010,241 | 4/1991 | Butterworth | 250/566 X |
| 5,071,207 | 12/1991 | Ceglio et al. | 359/565 X |
| 5,081,540 | 1/1992 | Dufresne et al. | 359/30 |
| 5,081,541 | 1/1992 | Sirat et al. | 359/30 |

(List continued on next page.)

FOREIGN PATENT DOCUMENTS

| | | |
|---|---|---|
| 61-285404 | 12/1986 | Japan . |
| 174687 | 3/1989 | Japan . |
| 9415314 | 7/1994 | WIPO . |

OTHER PUBLICATIONS

Dickson, "Optical Character Recognition Scanner", May 1972, pp. 3594–3595, IBM Technical Disclosure Bulletin, vol. 14, No. 12.

Williams, Arthur, *Filter Design Handbook* (1981), pp. 2–55 to 02–58, 2–60, 2–64,02–67 to 2–68, 3–15 to 3–19, 7–14 to 7–15, 7–19 to 7–20, 12–58 and 12–67. Month missing.

Ronald E. Crochiere and Lawrence R. Rabiner, *Multirate Digital Signal Processing* (Prentice–Hall 1983), pp. 20–29. Month missing.

*Primary Examiner*—Donald T. Hajec
*Assistant Examiner*—Michael G. Lee
*Attorney, Agent, or Firm*—Lyon & Lyon

[57] ABSTRACT

A method and apparatus are provided for reading bar codes or other images while reducing or eliminating the need for self-generated illumination. An image reader comprises an efficient optical collection system including an aperture with a high aspect ratio and/or a multi-focal lens or lenses. A CCD detector receives collected light and is coupled to an adaptive exposure circuit for preventing saturation of a CCD detector at high illumination levels. A correlated double sampling circuit receives the output of the CCD detector to allow lower light levels to be detected by the system. The correlated double sampling circuit is connected to a signal processing block which uses a derivative based technique for enhanced edge detection. Edge detection information may be provided to a decoder for decoding. Various other embodiments may utilize some but not all of the above elements, or may include additional refinements, while obtaining the benefit of reducing or eliminating the need for self-generated illumination.

18 Claims, 43 Drawing Sheets

U.S. PATENT DOCUMENTS

| | | | |
|---|---|---|---|
| 5,103,080 | 4/1992 | Barkan | 235/437 |
| 5,103,209 | 4/1992 | Lizzi et al. | 340/572 |
| 5,121,009 | 6/1992 | Braathen | 307/520 |
| 5,124,537 | 6/1992 | Chandler et al. | 235/462 |
| 5,126,544 | 6/1992 | Izumi | 235/462 |
| 5,144,118 | 9/1992 | Actis et al. | 235/462 |
| 5,144,460 | 9/1992 | Barbanell | 359/30 X |
| 5,155,343 | 10/1992 | Chandler et al. | 235/462 |
| 5,155,344 | 10/1992 | Fardeau et al. | 235/462 |
| 5,200,597 | 4/1993 | Eastman et al. | 235/455 |
| 5,210,398 | 5/1993 | Metlitsky | 235/462 |
| 5,229,797 | 7/1993 | Futhey et al. | 359/565 X |
| 5,272,323 | 12/1993 | Martino | 235/462 |
| 5,285,314 | 2/1994 | Futhey | 359/565 |
| 5,291,005 | 3/1994 | Ishii et al. | 235/449 |
| 5,296,690 | 3/1994 | Chandler et al. | 235/462 |
| 5,304,787 | 4/1994 | Wang | 235/462 |
| 5,311,001 | 5/1994 | Joseph et al. | 235/462 |
| 5,319,181 | 6/1994 | Shellhammer et al. | 235/462 |
| 5,329,104 | 7/1994 | Ouchi et al. | 235/462 |
| 5,329,105 | 7/1994 | Klancnik et al. | 235/462 |
| 5,343,028 | 8/1994 | Figarella et al. | 235/462 |
| 5,347,121 | 9/1994 | Rudeen | 250/235 |
| 5,349,172 | 9/1994 | Roustaei | 235/472 |
| 5,378,881 | 1/1995 | Adachi | 235/462 |
| 5,386,105 | 1/1995 | Quinn et al. | 235/462 |
| 5,408,081 | 4/1995 | Barkan | 235/462 |
| 5,442,480 | 8/1995 | Swanson et al. | 359/565 X |
| 5,446,272 | 8/1995 | Barkan | 235/462 |
| 5,463,211 | 10/1995 | Arends et al. | 235/462 |

FIG. 3A
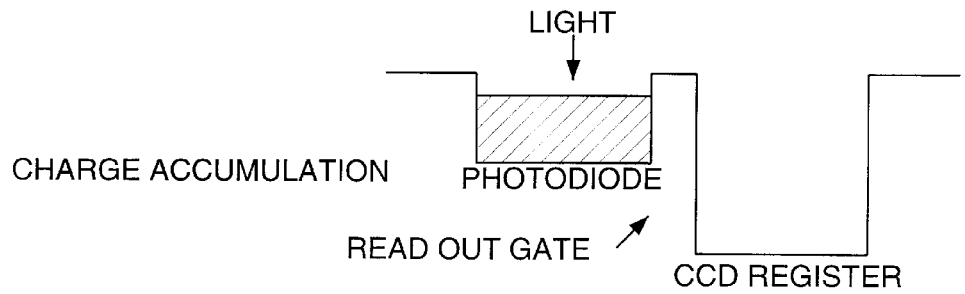
CHARGE ACCUMULATION
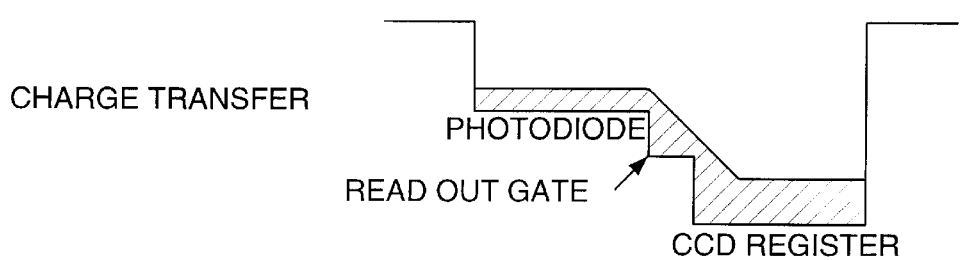
CHARGE TRANSFER
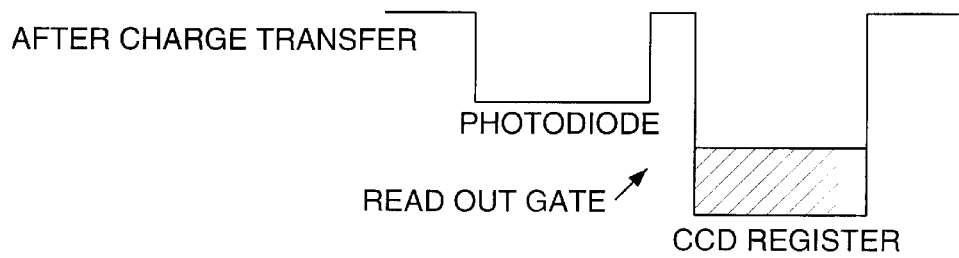
AFTER CHARGE TRANSFER
FIG. 4
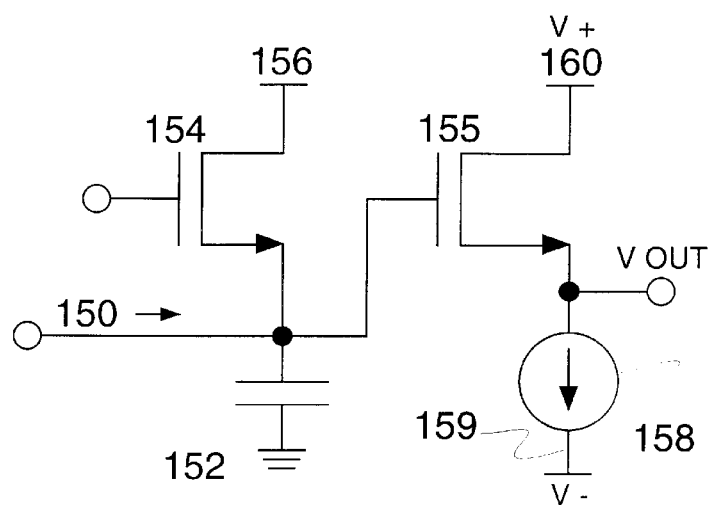

CDS PROCESSOR

| ANGLE | INTENSITY |
|-------|-----------|
| 0 | 100.0 |
| 10 | 94.1 |
| 20 | 78.0 |
| 30 | 56.2 |
| 40 | 34.4 |
| 50 | 17.1 |
| 60 | 6.2 |
| 70 | 1.4 |
| 80 | 0.1 |
| 90 | 0.0 |

FIG. 14A
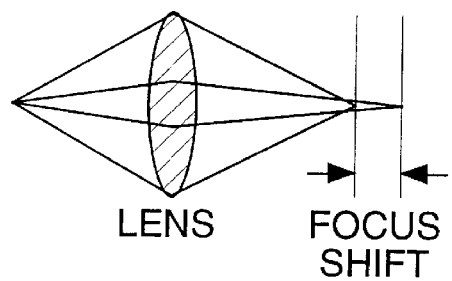
LENS   FOCUS SHIFT
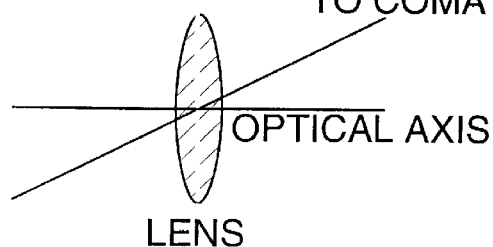
FIG. 14B
FIG. 14C
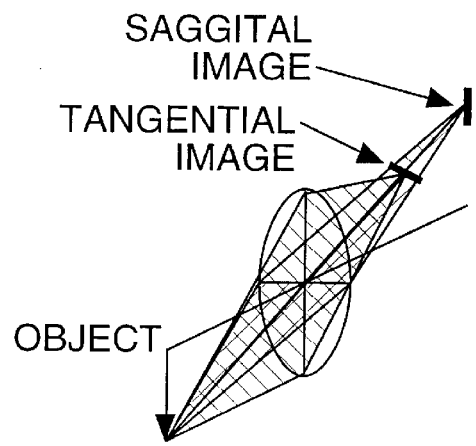
IDEAL "PETZVAL" SURFACE
SAGGITAL SURFACE
TANGENTIAL SURFACE
FIG. 14D 500
501

COMBINED ZONES — 503

502
505

LINE SPREAD FUNCTION

506

LINE SPREAD FUNCTION

FIG 28A
FIG 28B
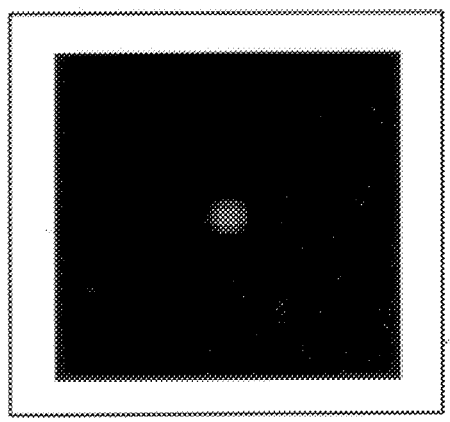
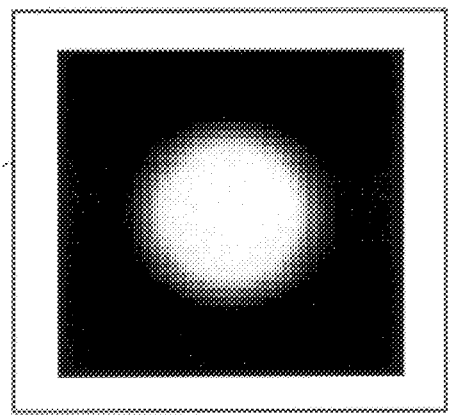
510
511
FIG 28C
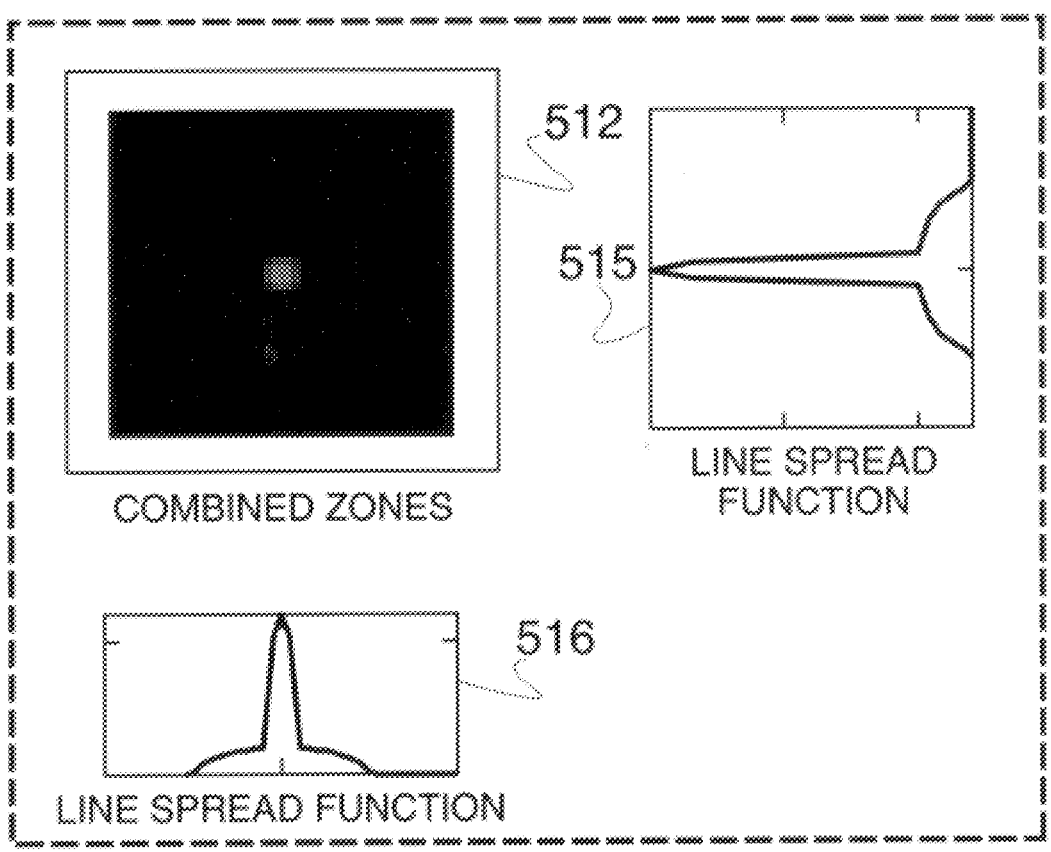
512
515
516
COMBINED ZONES
LINE SPREAD FUNCTION
LINE SPREAD FUNCTION

COMBINED ZONES

LINE SPREAD FUNCTION

LINE SPREAD FUNCTION

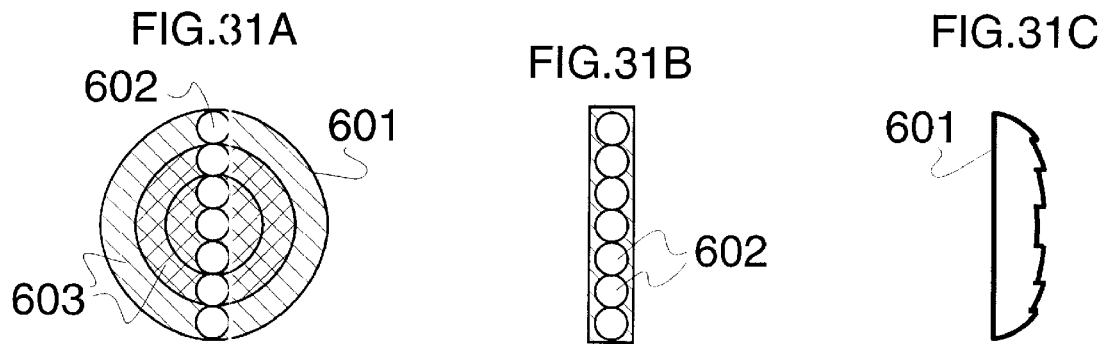
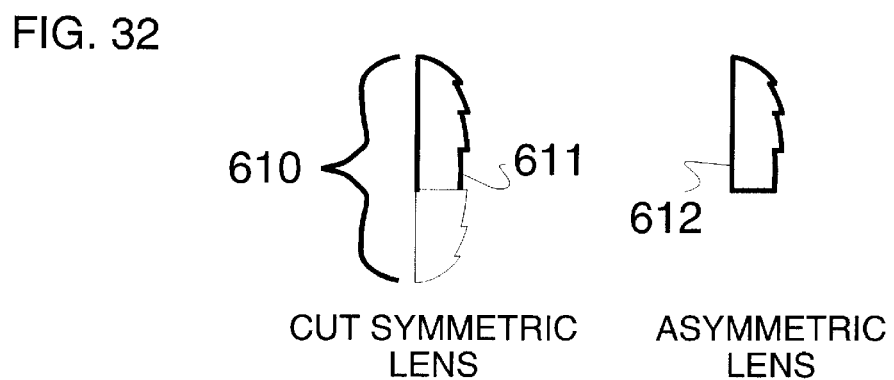
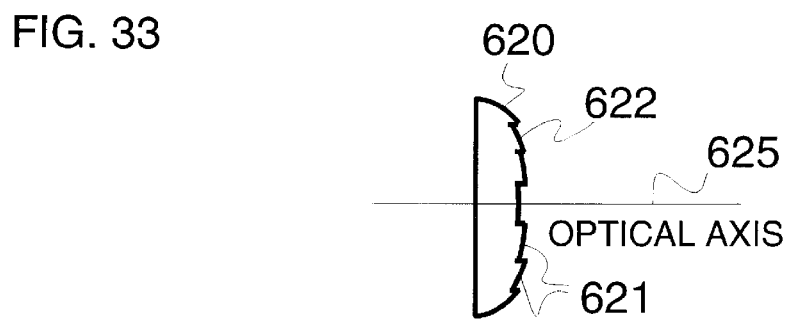

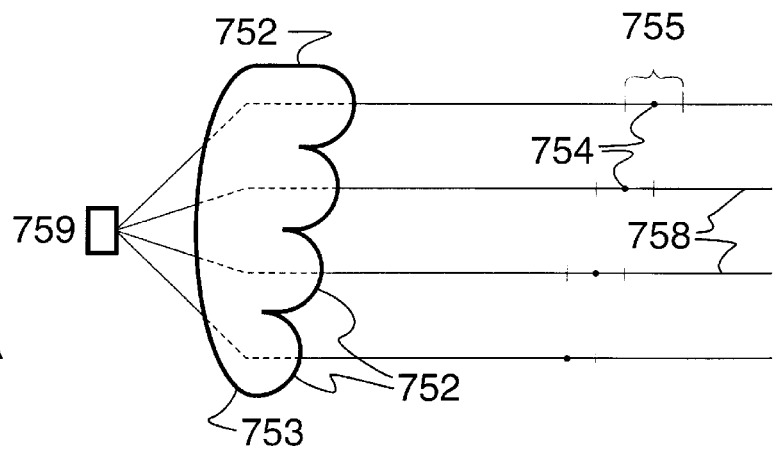
FIG. 38A
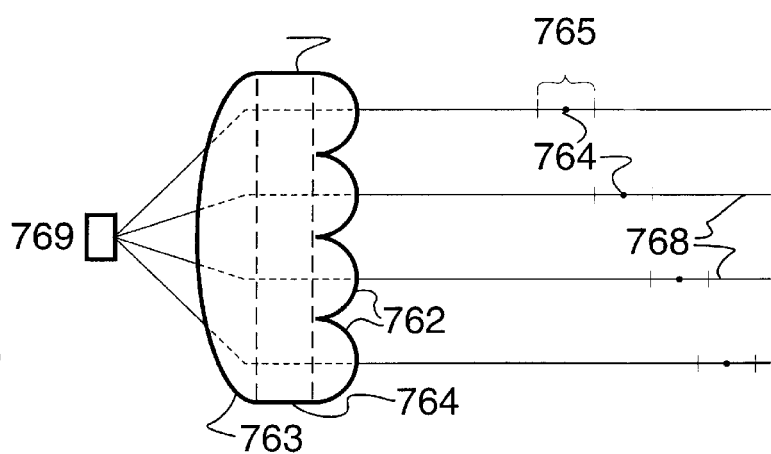
FIG. 38B
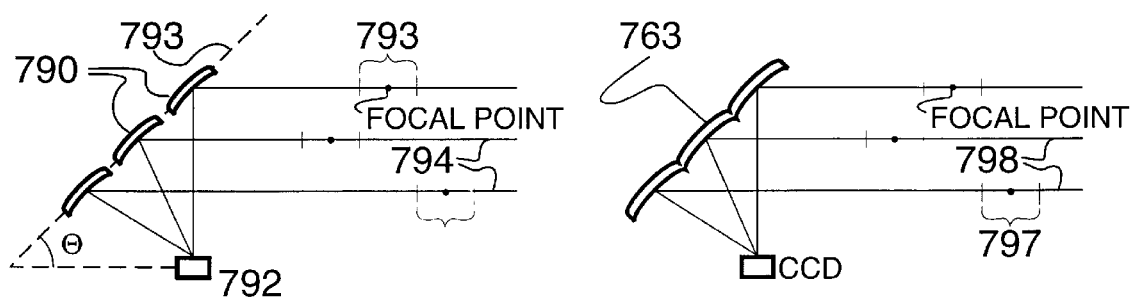
FIG. 39A
FIG. 39B

FIG. 40A
FIG. 40B
FIG. 40C
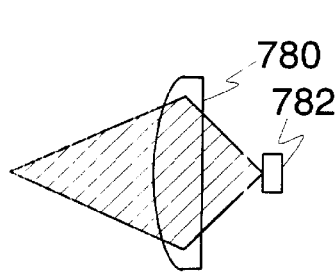
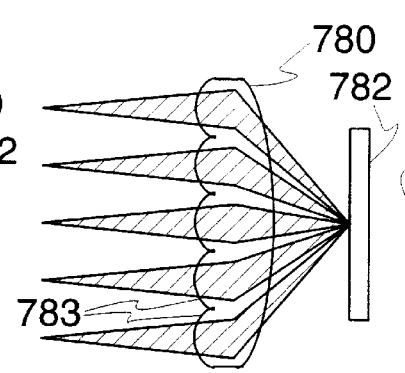
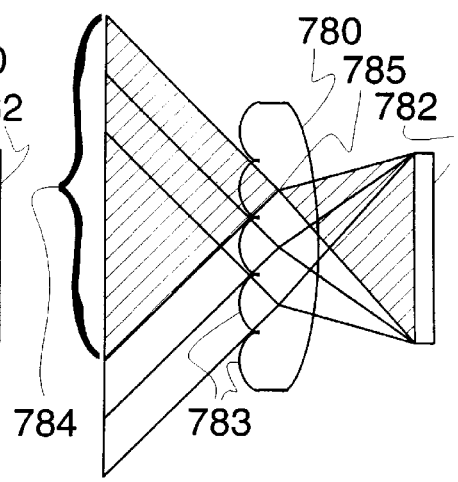
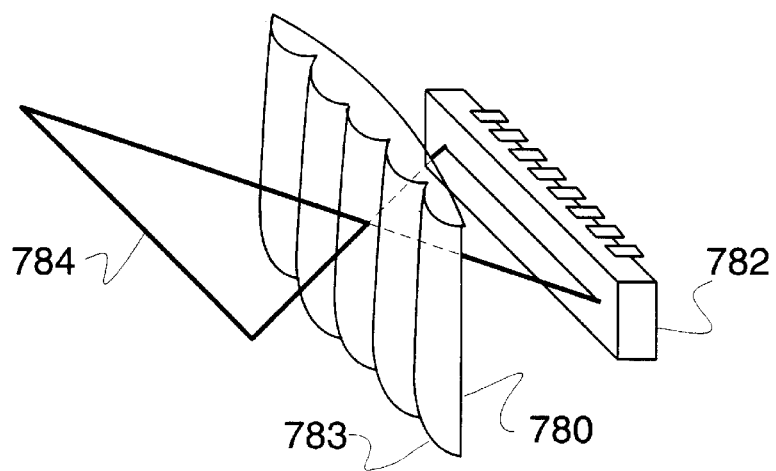
FIG. 40D

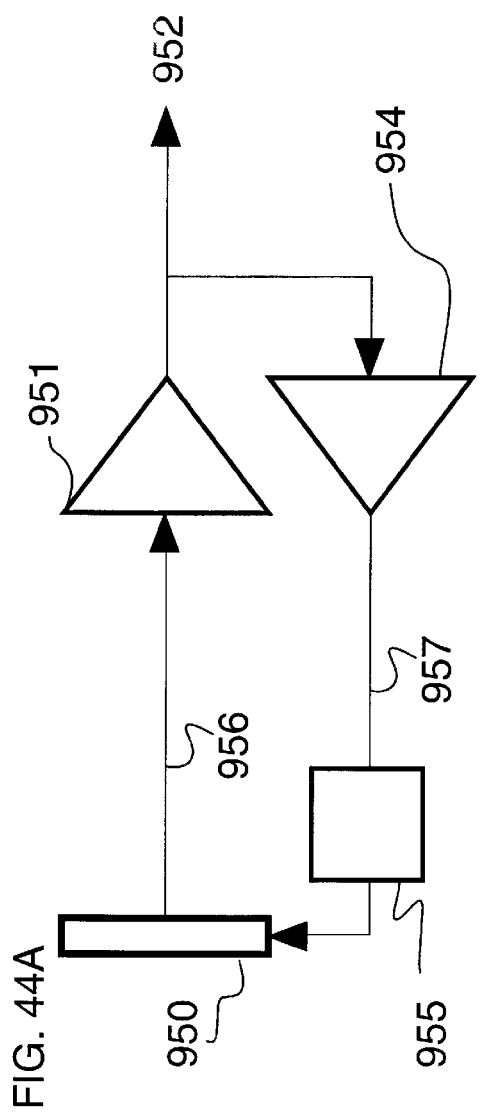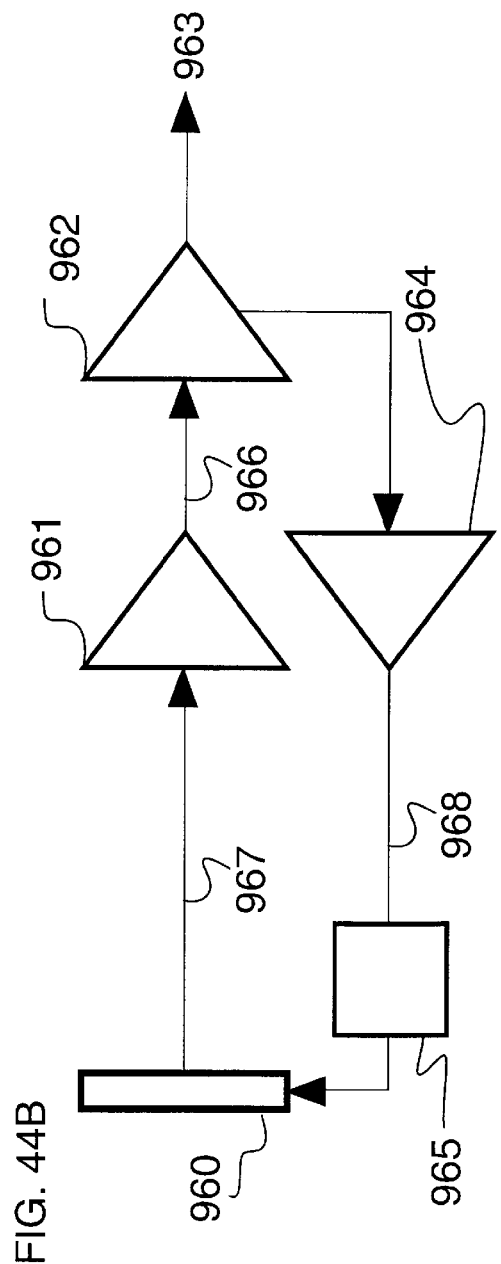
FIG. 44A
FIG. 44B

CCDs AND
IMAGING LENSES

BAR CODE READER WITH MULTI-FOCUS LENS

FIELD OF THE INVENTION

The field of the present invention relates to image detection and, in particular, to a method and apparatus for reading images such as bar code labels without requiring a self-generated illumination source.

BACKGROUND OF THE INVENTION

Labels bearing information in any of a number of different encoded formats are commonly affixed to products, packaging, or other items and are used in many applications. It is common, for example, to encode retail product identification information in a bar code format on a product package or a label affixed to a product package. Bar code symbols are also used on a broad range of retail packages for check-out and inventory purposes. A bar code reading device, located at the check-out station of a retail establishment, may be used by a clerk to read product identification data into an associated point-of-sale computer system.

A number of existing bar codes consist of a series of parallel light and dark rectangular areas of varying widths. The light areas are often referred to as "spaces" and the dark areas as "bars". The bars and spaces are typically arranged and selected so as to define different characters of a particular bar code.

A bar code label may be read by a device (e.g., a scanner) which detects reflected and/or refracted light from the bars and spaces comprising the characters. Such a device typically includes a light source for illuminating the bar code label to be read. One common method of illuminating the bar code label is by use of a scanning laser beam, in which case a spot of light is swept across the bar code label and the intensity of returned light is detected by an optical detector. The optical detector generates an electrical signal having an amplitude determined by the intensity of the detected light. Another method for illuminating the bar code label is by use of a uniform light source with an array of optical detectors connected to an analog shift register (commonly called a charge-coupled device or CCD). In such a technique, as with a scanning laser, an electrical signal is generated having an amplitude determined by the intensity of the collected light. In either the laser or CCD technique, the amplitude of the electrical input signal has one population of levels for dark bars and a second population of levels for light spaces. As a label is scanned, positive-going transitions and negative-going transitions in the electrical signal occur, signifying transitions between bars and spaces. The electrical signal may be converted to a binary scan signal which is analyzed to determine the arrangement of bars and spaces of the scanned label. The bar and space information is provided to a decoding unit to determine whether the bar code is recognized and, if so, to decode the information contained in the bar code.

An essential element of virtually every existing bar code reader system is a means for illuminating the bar code. Laser based scanners, for example, typically use a flying laser spot to illuminate the bar code and detect the returned light. Wand devices generally use a light emitting diode (LED) to illuminate a small portion of the bar code and a detector to image the bar code while the operator physically sweeps the illuminated beam across the bar code. Video based readers, such as readers utilizing charge-coupled devices to receive input, typically use a plurality of LED's to illuminate the entire bar code with uniform intensity, and then image the entire bar code with a CCD sensor.

Each of the above systems relies on self-generated illumination for the purpose of distinguishing the bars and spaces of the bar code or for increasing the amount of collected light to enable reasonable performance. The requirement of self-generated illumination may, however, lead to additional complexity, a larger or bulkier device, and/or higher power consumption. For example, a scanning device using a flying laser spot may require a patterned mirror structure, bifocal lens, laser light source, and motor to sweep the laser spot across a target. Each of these components adds complexity and bulk to the overall system. Furthermore, the motor used for sweeping the laser spot tends to be one of the least reliable components of a scanner, followed by the laser illumination source. The use of a motor and laser illumination source tends to make a system less reliable and more costly. In short, the requirement of a self-generated illumination generally makes an image reading system more complex, costly and unreliable. These drawbacks may be significant in certain applications, particularly in low-cost, handheld reading applications.

In addition, CCD readers often have significant depth of field limitations. For example, CCD readers using red LED's for illumination typically have a depth of field of less than one inch. This limits the types of applications in which CCD readers may be used, and limits the versatility of such CCD readers in general. Moreover, due to low sweep speeds, use of CCD readers has also generally been limited to handheld devices.

It would therefore be advantageous to provide a bar code reader capable of operation without self-generated illumination. It would further be advantageous to provide such a bar code reader having an increased depth of field, that may be utilized in a broad base of applications including hand-held devices as well as other applications. It would further be advantageous to provide a bar code reader having a reduced number of moving parts and exhibiting increased reliability.

SUMMARY OF THE INVENTION

The invention provides in various aspects a method and apparatus for reading bar codes or other images while reducing or eliminating the need for self-generated illumination.

A preferred embodiment of the invention utilizes a CCD based imaging system. The imaging system comprises an adaptive exposure circuit which is used to prevent saturation of a CCD detector at high illumination levels, thereby increasing the system's dynamic range. The imaging system further comprises an efficient optical collection system, which may include an aperture with a high aspect ratio and/or a multi-plane imaging technique. The imaging system thereby may have an increased depth of field at a particular light level, or an increased read rate, or both. A correlated double sampling circuit is preferably used in conjunction with the CCD detector to allow lower light levels to be detected by the system. The correlated double sampling circuit may also provide an increased depth of field, an increased read rate, or both. The imaging system further takes advantage of derivative based signal processing for enhanced edge detection.

Various other embodiments may utilize some but not all of the above elements, or may include additional refinements, while obtaining the benefit of reducing or eliminating the need for self-generated illumination.

BRIEF DESCRIPTION OF THE DRAWINGS

The various objects, features and advantages of the present invention may be better understood by examining the Detailed Description of the Preferred Embodiments found below, together with the appended figures, wherein:

FIG. 3A is a potential diagram illustrating the processes of charge accumulation and charge transfer from a photodiode to a CCD shift register location.

FIG. 4 is a diagram of a simplified output stage of a CCD detector.

FIGS. 14A–14D are diagrams of various types of aberrations and distortions that may be associated with an optical system.

FIGS. 21A and 21B are diagrams showing an oblique view and a front view, respectively, of a symmetric multi-focal lens.

FIGS. 26A through 30C are approximated point spread function plots of various combinations of center and ring zones of various focal lengths.

FIGS. 31A–31C are diagrams of a symmetric multi-focus lens shown from several viewpoints with a plurality of apertures.

FIG. 32 is a diagram of a cut-away symmetric lens.

FIG. 33 is a diagram of an asymmetric lens having its optical axis in the center of the lens.

FIGS. 38A–38B are diagrams of alternate embodiments of a poly-optic lens system.

FIGS. 39A–39B are diagrams of alternate embodiments of an optical system using curved mirrors to collect light.

FIGS. 40A–40D are diagrams of a particular poly-optic lens from different angles illustrating light collection.

FIGS. 44A and 44B are block diagrams showing alternative configurations of an optical system employing an adaptive exposure circuit.

DETAILED DESCRIPTION OF THE PREFERRED EMBODIMENTS

Figure 1:
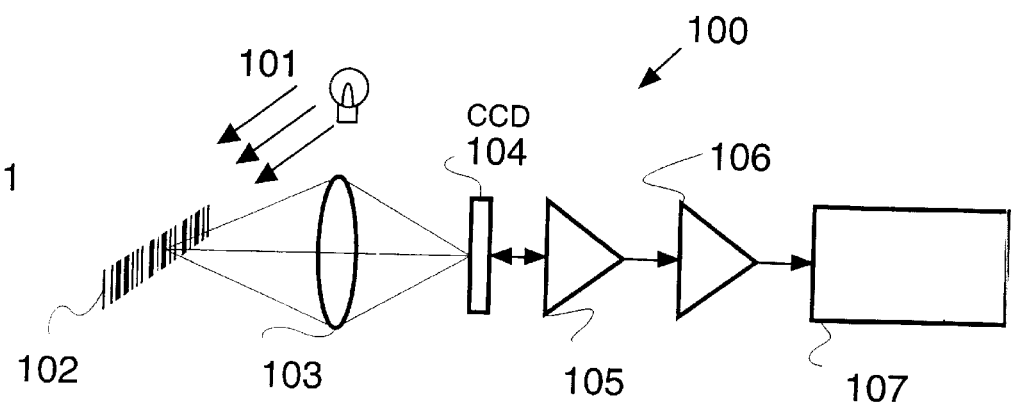
FIG. 1 is a block diagram of an optical reading system in accordance with one or more aspects of the present invention.

FIG. 1 is a block diagram of an image reading system in accordance with one or more aspects of the present invention.

The image reading system of FIG. 1 comprises an optical collection system 103, a CCD detector 104, a pre-amplification block 105, a signal processing block 106, and a decoding block 107. The optical collection system 103 gathers ambient light reflecting off a target (such as a bar code label 102), and focuses the gathered light on the CCD detector 104. The CCD detector 104 interacts with the pre-amplification block 105 to obtain a CCD input signal comprised of imaging data. The CCD input signal may be processed by the signal processing block 106 and provided to the decoding block 107 for decoding, as further explained herein.

Figure 2:
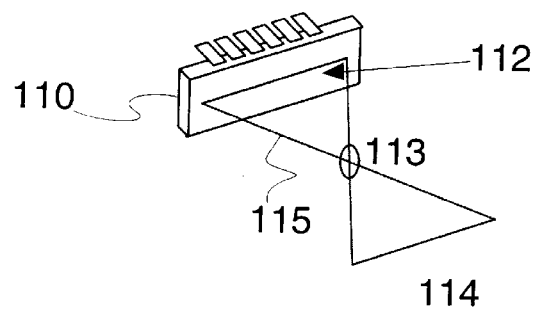
FIG. 2 is a diagram of a CCD detector receiving a focused beam of light.

FIG. 2 is a diagram of a CCD detector 110 receiving a focused beam of light 115. Light is reflected from a target located at a target line 114. The reflected light is passed through a lens 113 and focused onto the CCD detector 110. The CCD detector 110 may be embodied as a linear integrated chip comprising an array of photodiodes 112. In operation, the CCD detector 110 acts in a manner similar to a video camera, with the array of photodiodes 112 corresponding to pixel locations. The pixel size and spacing along with the focusing limitations of the lens 113 generally define the depth of field and the minimum bar code size for an imager incorporating such a CCD detector 110.

Linear CCD detectors have four basic elements. These four basic elements relate to photon to electron conversion, charge storage, charge transfer, and charge to voltage conversion. Photon to electron conversion is performed by multiple photodiodes (e.g., pixels 112). Typical photodiodes have a quantum efficiency of 50%, which means that one electron charge is generated for every two photons that hit the photodiode. The electron charges are stored in a potential well, which acts like a capacitor. When an exposure period is complete, a read out gate pulse received from a controller allows the accumulated charges to be dumped into a CCD shift register. A potential diagram illustrating the processes of charge accumulation and charge transfer from a photodiode to a CCD shift register location is shown in FIG. 3A.

Figure 3B:
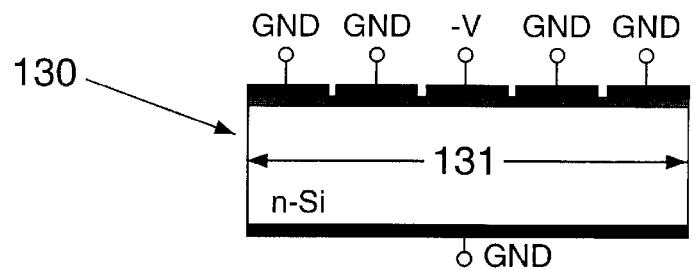
FIG. 3B is a physical illustration of a charge coupled device having five potential wells.
Figure 3C:
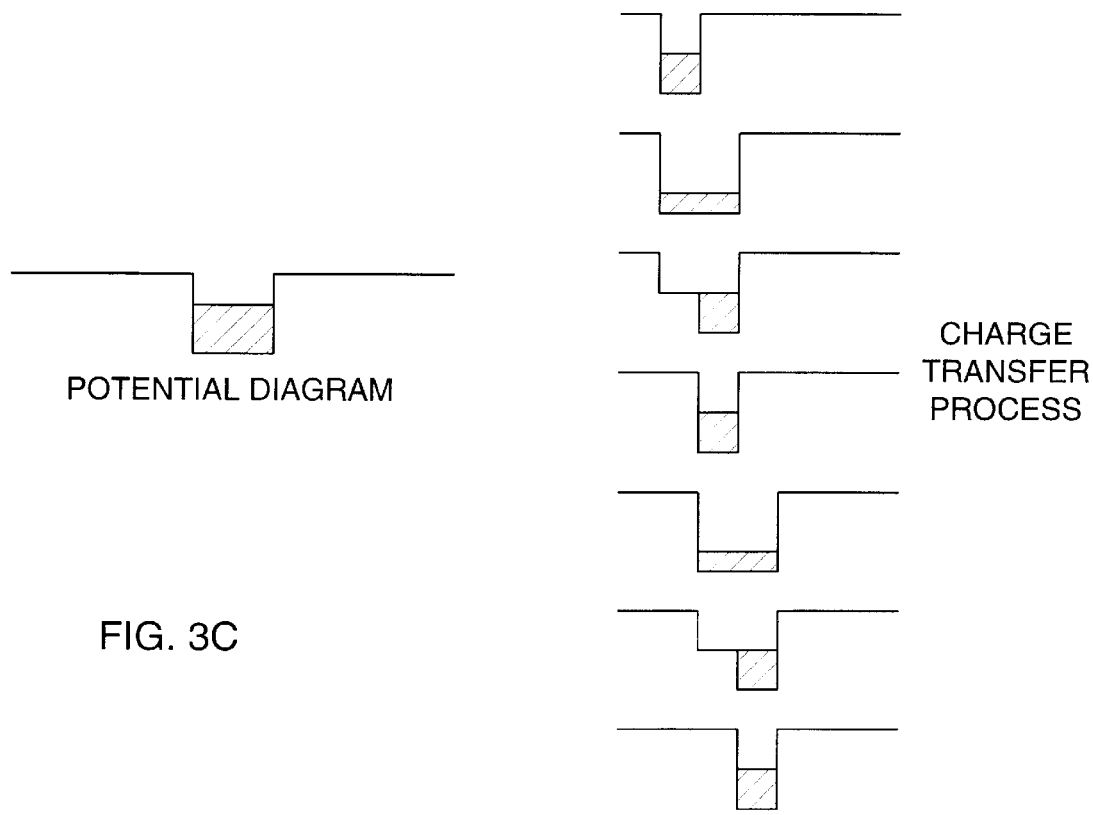
FIG. 3C is a potential diagram illustrating a transfer of charge along a CCD shift register.

Charge transfer along the shift register occurs while the photodiodes collect charge during the next exposure period. The charge coupled device may be embodied as a distributed gate metal-oxide silicon field-effect transistor (MOSFET) 130, a physical illustration of which is shown in FIG. 3B. The distributed gate MOSFET 130 has a long source-drain channel 131 and contains a plurality of gates 132 (one gate 132 per pixel 112). Charge is injected at each gate location (e.g., shift register location) by a photodiode, by the process depicted in FIG. 3A. Charge is transferred along a chain of shift register locations by controlling the gate voltages. For the MOSFET 130 of FIG. 3B, three clocks are needed to transfer the charge along the shift register. Photodiodes can thus inject charge every three gates. Alternatively, two clocks may be used so as to allow the photodiodes to inject charge every two gates. A potential diagram illustrating the described charge transfer process is shown in FIG. 3C.

At the end of the analog shift register, an amplifier converts the charge to voltage. This conversion is typically accomplished by allowing a capacitor to integrate the charge and then buffering the voltage to an output pin. A MOSFET is used to clear the charge from the capacitor between transfers of each pixel. The conversion process may also involve amplification of the converted voltage level. The output voltage generally has a DC bias level equal to about half of the power supply voltage. The higher the input light intensity, the lower the DC bias voltage, as the photoelectric charge is in the form of injected electrons.

FIG. 4 is a diagram of a simplified output stage of a CCD detector 110 such as shown in FIG. 2. In FIG. 4, a flow of electrons 150 is accumulated by an integration capacitor 152 (also referred to a sense capacitor). A transistor 154, such as a MOSFET, clears the stored charge between each pixel. The MOSFET 154 may be referred to as a reset transistor or a reset MOSFET. The MOSFET 154 is connected to a reference voltage source 156. The voltage level of the sense capacitor 152 may be read through a buffer stage 155, which also may comprise a MOSFET. The buffer MOSFET 155 is connected at one end to a positive bias voltage 160, at the other end through a current sink 158 to a negative bias voltage 159. In one embodiment, the current sink 158 comprises a resistor, and the negative bias voltage 159 is set to ground level.

Further information pertaining to the operation of charge-coupled devices may be found in J. Millman, *Microelectronics, Digital and Analog Circuits and Systems*, (McGraw-Hill 1979), pp. 298–312, J. D. Mosley, "CCD Imaging Arrays," *EDN Magazine*, (Aug. 20, 1990), pp. 116–126, and in the 1993 *Linear Sensor IC Databook* published by Sony Corporation.

Figure 5:
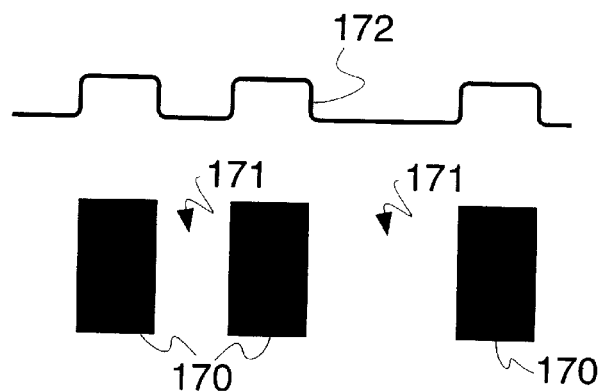
FIG. 5 is a diagram of a bar code and a corresponding waveform after filtering.

The CCD detector 110 provides data in the form of a discrete time analog signal. The analog signal appears similar to "stair-steps", with data from each pixel contributing to one of the steps. Most CCD chips have an output signal that is in a low state when the image is bright (white) and a high state when the image is dark (black). The signal output from the CCD detector 110 may be low pass filtered to arrive at a smooth signal, such as shown in FIG. 5. In FIG. 5, an exemplary portion of a bar code is shown having darker bars 170 and lighter spaces 171. A corresponding CCD output signal 172 is shown, after low pass filtering, above the bar code portion. The filtered CCD output signal 172 is shown in a high state when the darker bars 170 are read, and a low state when the lighter spaces 171 are read. The CCD output signal 172 may have a sizable DC component (e.g., 4.5 volts).

The amplitude of the CCD output signal 172 depends mainly on the sensitivity of the photodiode array and the exposure time. During the exposure time, the photodetectors in the CCD detector 110 collect charge. Periodically, the accumulated charge is dumped into an analog shift register. The information in the analog shift register is serially read out to form an analog CCD signal which, when filtered, corresponds to the CCD output signal 172.

All of the accumulated data must be transferred from the photodetectors and read out between exposures, so that residual charge does not distort the data from the next exposure period. If it is required to have an exposure time faster than the data read out time, a shuttered CCD device may be used, thereby allowing the exposure time to fill some fraction of the read out time.

The CCD detector 110 may particularly be embodied as a CCD chip of the ILX series as manufactured by Sony, such as an ILX-503A chip (having 2048 pixels) or ILX-505A chip (having 2592 pixels). The Sony ILX-703A may be used in applications requiring an electronic shutter. Descriptions of these devices may be found in the Sony 1993 CCD Linear Sensor IC Databook.

Figure 6:
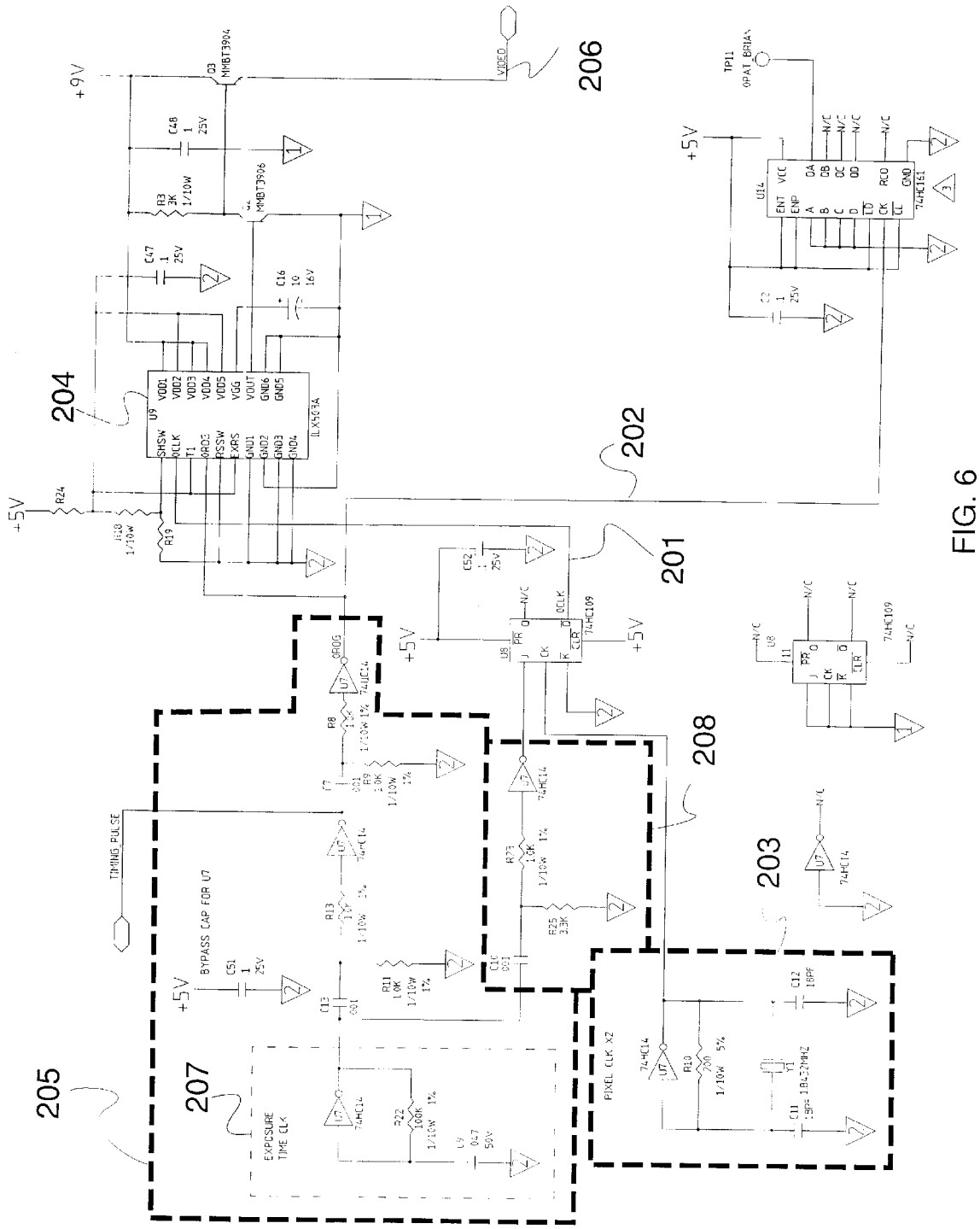
FIG. 6 is a circuit diagram of a driver circuit for driving a CCD chip.

FIG. 6 is a circuit diagram of a driver circuit suitable for driving an ILX-503 or ILX-703 CCD chip 204. The FIG. 6 driver circuit generates a pixel clock signal (øCLK) 201 and a read out gate clock signal (øROG) 202 to facilitate transfer of charge from the photodetectors to the analog shift register. The pixel clock signal 201 is generated by a resonator oscillator circuit 203 as depicted in FIG. 6. The read out gate clock signal 202 is generated by a read out gate clock generator circuit 205 as also depicted in FIG. 6. The read out gate clock generator circuit 205 comprises an oscillator circuit 207 followed by a pair of one-shot circuits. Another one-shot circuit 208 acts to temporarily disable the pixel clock signal 201 when the read out gate clock signal 202 is generated. The CCD chip 204 generates a CCD video output signal 206.

The CCD output signal 206 may, as noted, be provided to a low-pass reconstruction filter and thereafter to other circuitry for signal processing, decoding and other functions as further described herein. The low-pass reconstruction filter may be embodied as part of the pre-amplification block 105 or the signal processing block 106. The low pass filter preferably is constructed so as to block out signals having a frequency higher than one-half the frequency of the pixel clock signal 201. The low pass filter preferably has a steep filtering characteristic, since a gradual filter may increase the number of pixels per bar required for reading a bar code. The low pass filter may also provide gain, if necessary, depending on the light level and the exposure time.

To achieve necessary coverage, multiple linear CCD arrays may be used for imaging. Sensitivity tends to decrease with larger imagers, making the use of multiple linear CCD arrays preferable in certain applications. Moreover, cost tends to increase geometrically with larger CCD arrays. Although a number of embodiments are described herein in terms of linear CCD arrays, it should be noted that many principles of the embodied devices described are applicable to area CCD sensors as well.

Figure 7:
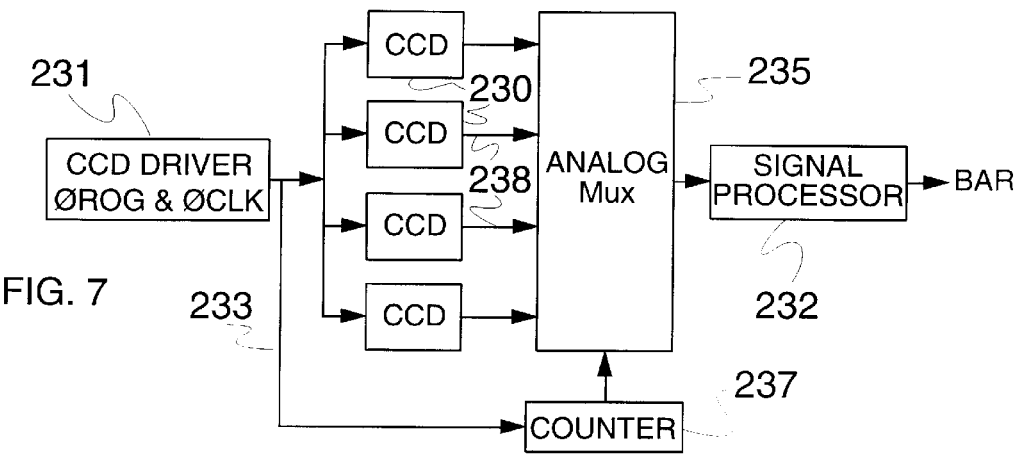
FIG. 7 is a block diagram of a multiple-CCD detector system.

FIG. 7 is a block diagram of a multiple-CCD detector system, which may be configured, for example, to implement a low-cost multiple scan line system. In FIG. 7, a plurality of CCD detectors 230 are clocked by a single CCD driver circuit 231, such as shown previously in FIG. 6. The CCD driver circuit 231 provides a pixel clock signal and a read out gate clock signal 233 to each of the CCD detectors 230. The CCD detectors 230 are coupled to a signal processor 232 via a high speed analog multiplexer 235, which selects the CCD detectors 230 in sequence for processing. A counter 237 may be coupled to the CCD driver circuit 231 so as to count clock pulses and switch the high speed analog multiplexer 235 at appropriate times. The signal processor 232 receives a CCD output signal 238 from each CCD detector 230 in sequence, as controlled by the analog multiplexer 235, and thereby processes the CCD output signals 238 repetitively, in a sequential fashion.

The CCD detectors 230 may be physically placed in a variety of different patterns so as to generate a desired imaging pattern.

There are a variety of sources of noise in CCD chips which may need to be accounted for in designing a CCD-based optical system. Four sources of noise in particular are noted here. The first is photodetector shot noise, which may be described by the following equation:

$$I_{rms} = \sqrt{(2eI_dB)}$$

where $I_d$ is the dark current (in amps) of the photodetector, B is the bandwidth of the system (in hertz), and e is the charge on an electron (i.e., $1.6 \times 10^{-19}$C). Dark current $I_d$ is a strong function of temperature, doubling every 25° C. (in the case of the ILX-503A chip). The effect of photodetector shot noise becomes more pronounced the longer the photodetector integrates. Thus for longer exposure times, the photodetector shot noise will increase. The effect of this shot noise, however, tends to be offset by the fact that longer exposure leads to more signal. The signal-to-noise ratio due to shot noise is proportional to the square root of the exposure time.

A second source of noise is associated with the process of charge transfer. This source of noise results from surface states (i.e., 1/f) and thermal noise generated by the charge transfer MOSFET. Charge transfer noise manifests as a linear growth of noise from the starting pixel to the ending pixel. While the first pixel to be transferred stays in the charge transfer register for only a short time, the last pixel remains much longer, therefore accumulating much more noise than the first pixel. Because charge transfer efficiencies are generally high, this noise is usually not significant enough to degrade performance.

A third source of noise is known as kTC noise. This type of noise is caused by a switched capacitor effect related to the reset transistor at the end of the CCD chain. A similar effect may also occur in switched capacitor filters. This source of noise is typically the dominant noise source in the CCD chip, but can be mitigated or removed by other techniques discussed herein, such as correlated double sampling.

Figure 9A:
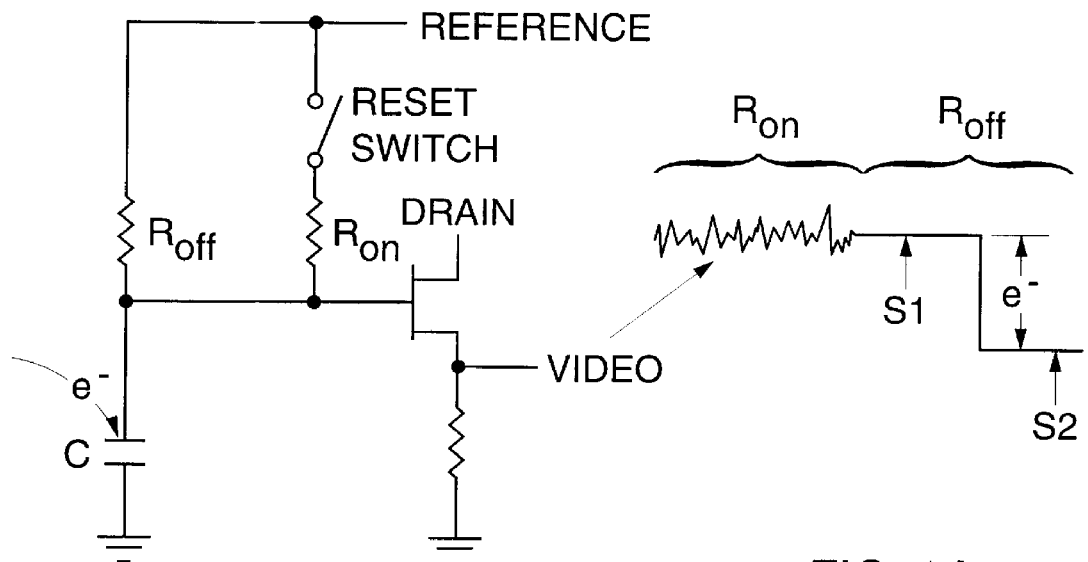
FIG. 9 is a circuit diagram of a CCD output stage.
Figure 9B:
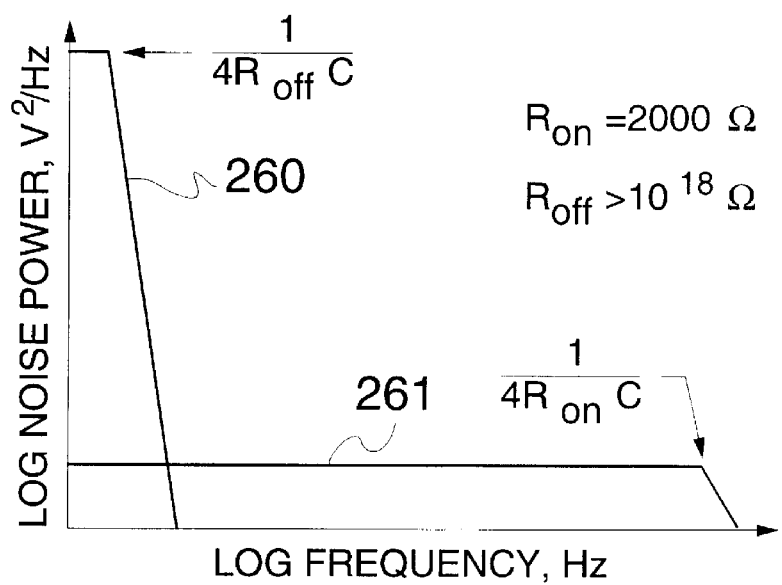

A graph of kTC noise power as a function of frequency is shown in FIG. 9B for a CCD output stage shown in FIG. 9A. The CCD output stage in FIG. 9A corresponds to that of FIG. 4, except that the reset MOSFET 154 in FIG. 4 is modelled by its internal resistances in an OFF state (i.e., $R_{off}$) and in an ON state (i.e., $R_{on}$). In FIG. 9B, one graph 260 shows kTC noise power when the reset MOSFET 154 is turned off and thus has a resistance of $R_{off}$, while another graph 261 shows kTC noise power when the reset MOSFET 154 is turned on and thus has a resistance of $R_{on}$.

A fourth source of noise results from the charge-to-voltage conversion process. The charge-to-voltage amplifier is subject to surface states (i.e., 1/f) and thermal noise of the FET, as well as thermal noise due to other resistances. This noise source dominates after the kTC noise and is not affected by exposure time. This noise source has only a weak temperature dependance.

Figure 8A:
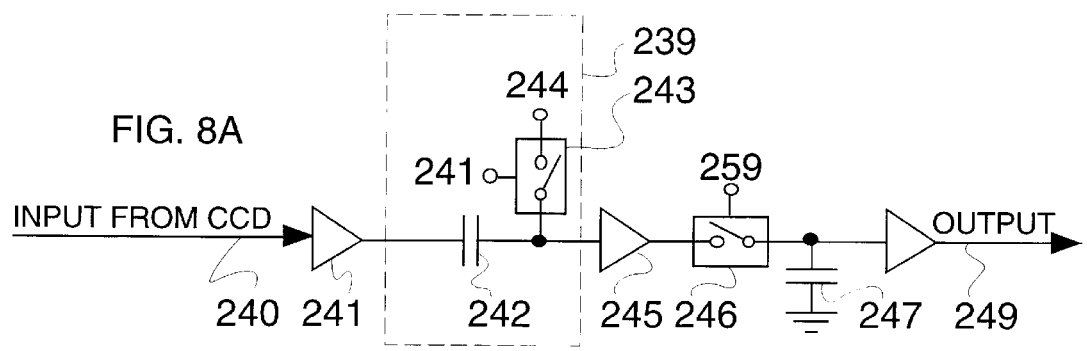
FIG. 8A is a block diagram of a correlated double sampling circuit.
Figure 8B:
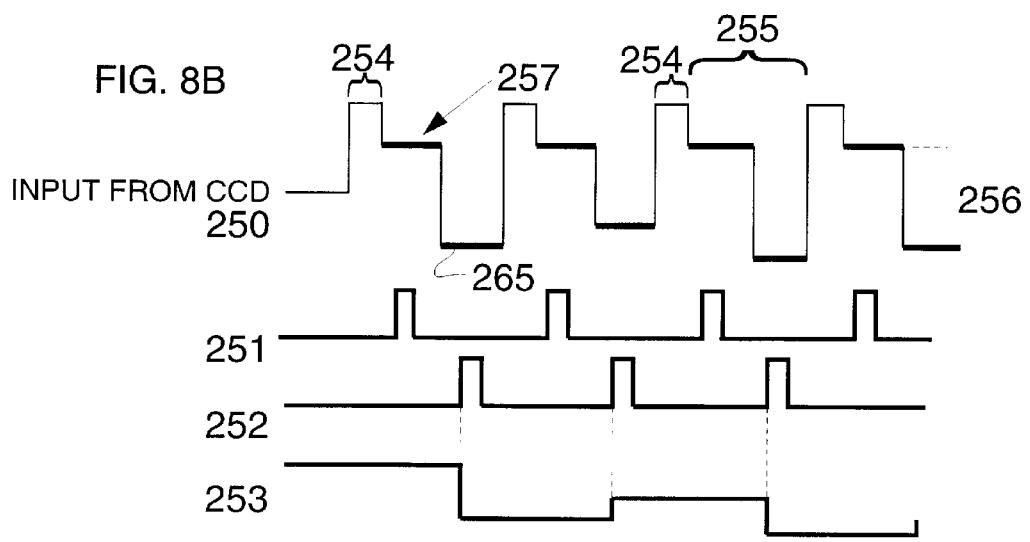
FIG. 8B is a graph of waveform diagrams associated with the sampling circuit of FIG. 8A.

FIG. 8A is a block diagram of a particular type of correlated double sampling circuit such as may be employed to reduce kTC noise. FIG. 8B is a diagram of waveforms illustrating some of the noise reduction properties of the circuit of FIG. 8A.

A correlated double sampling circuit such as shown in FIG. 8A may advantageously be employed to remove reset noise generated by the periodic resetting of the sense node by the reset MOSFET in the CCD output stage (shown, e.g., in FIG. 9A), thereby improving signal-to-noise ratio. In general, reset noise may be expressed in terms of the following relationship:

$$N_r(V) = \sqrt{(4kTBR)}$$

where k=Boltzmann's constant=$1.38 \times 10^{-23}$, T=absolute temperature (Kelvin), B=noise power bandwidth (Hertz), and R=resistance (Ohms). The correlated double sampling circuit generally operates by sampling the CCD output voltage once after the reset pulse has been switched off and once again after signal charge has been read out, thereby providing a direct measurement of charge. This charge measurement is generally independent of reset noise, since the reset noise will be "correlated" over the duration of a pixel period. In other words, the noise voltage due to the channel resistance will not change over the period when the two samples are taken, allowing the reset noise to be eliminated externally from the CCD chip.

As shown in FIG. 8A, an input signal 240 (such as output from CCD chip 204 of FIG. 6) is buffered by an amplifier 241. The output of the amplifier 241 is connected to a DC restoration circuit 239 comprising an analog switch 243, a capacitor 242, and a bias voltage 244 (which may be ground), configured as shown. A clamp signal 255 controls the analog switch 243. The DC restoration circuit 239 is connected to another buffer 245. Buffer 245 is connected to another analog switch 246. The analog switch 246 is controlled by a sample signal 259. The other end of the analog switch 246 is connected to a capacitor 247 and to another buffer 248. Buffer 248 outputs an output signal 249.

The input signal 240 may appear, for example, like the illustrative input waveform 250 of FIG. 8B. The waveforms of FIG. 8B have been idealized somewhat for purposes of explanation. The heavier shaded lines in the sample input waveform 250 illustrate relatively low frequency noise 257 appearing in the input signal 240. A feedthrough pulse 254 occurs in the input waveform 250 when the reset MOSFET is active. During the interval of the feedthrough pulse 254, relatively high bandwidth noise may occur. However, once the feedthrough pulse 254 is ended and the reset MOSFET is inactive, a generally low frequency, constant noise pattern will be expected. This low frequency noise 257 occurring in the interval 255 between feedthrough pulses 254 may be removed or substantially reduced by the correlation operation of the circuit of FIG. 8A.

In operation, the input signal 240 is applied to the input buffer 241. When the clamp signal 255 (shown as waveform 251 in FIG. 8B) is active, the capacitor 242 is coupled to the bias voltage 244 through the analog switch 243. The capacitor 242 is thereby charged to the reset voltage level 256, as shown in relation to waveform 250 of FIG. 8B. The clamp signal 255 is then deactivitated, releasing the clamp (i.e., opening the analog switch 243) but allowing the capacitor 242 to remain charged at the reset voltage level 256.

The input waveform 250 then switches to a level 265 determined by the amount of charge collected by a particular photodiode in the CCD detector. The output of the buffer 241 follows the input waveform 250, which forces the opposite end of the capacitor 242 to a new voltage level, since the capacitor 242 maintains the same voltage across it that it had prior to the changing levels in the input waveform 250. The voltage at the input of the buffer 245 therefore comprises the difference between the voltage level 265 of the input waveform and the reset voltage level 256. Because the reset voltage level 256 of the input waveform 250 contains noise 257 that is correlated over a pixel period, common mode noise is thereby removed from the output of the DC restoration circuit 239.

The voltage level of the capacitor 242 is sampled when the sample signal 259 (shown as waveform 252 in FIG. 8B) is activated. When the sample signal 259 is activated, capacitor 247 charges to a voltage level determined by the voltage of the capacitor 242. The sample signal 259 is then deactivated, causing switch 246 to open, while capacitor 247 holds the voltage level until the next sample period of sample signal 259.

An output waveform 253 associated with input waveform 250 is also shown in FIG. 8B. The output waveform 253, such as may appear at the output signal 249 of the correlated double sampling circuit of FIG. 8A, comprises a sequence of sampled voltage levels of the input waveform 250, and is offset by the bias voltage 244. As noted, the output waveform 253 generally has a significant reduction in common mode noise.

Figure 10A:
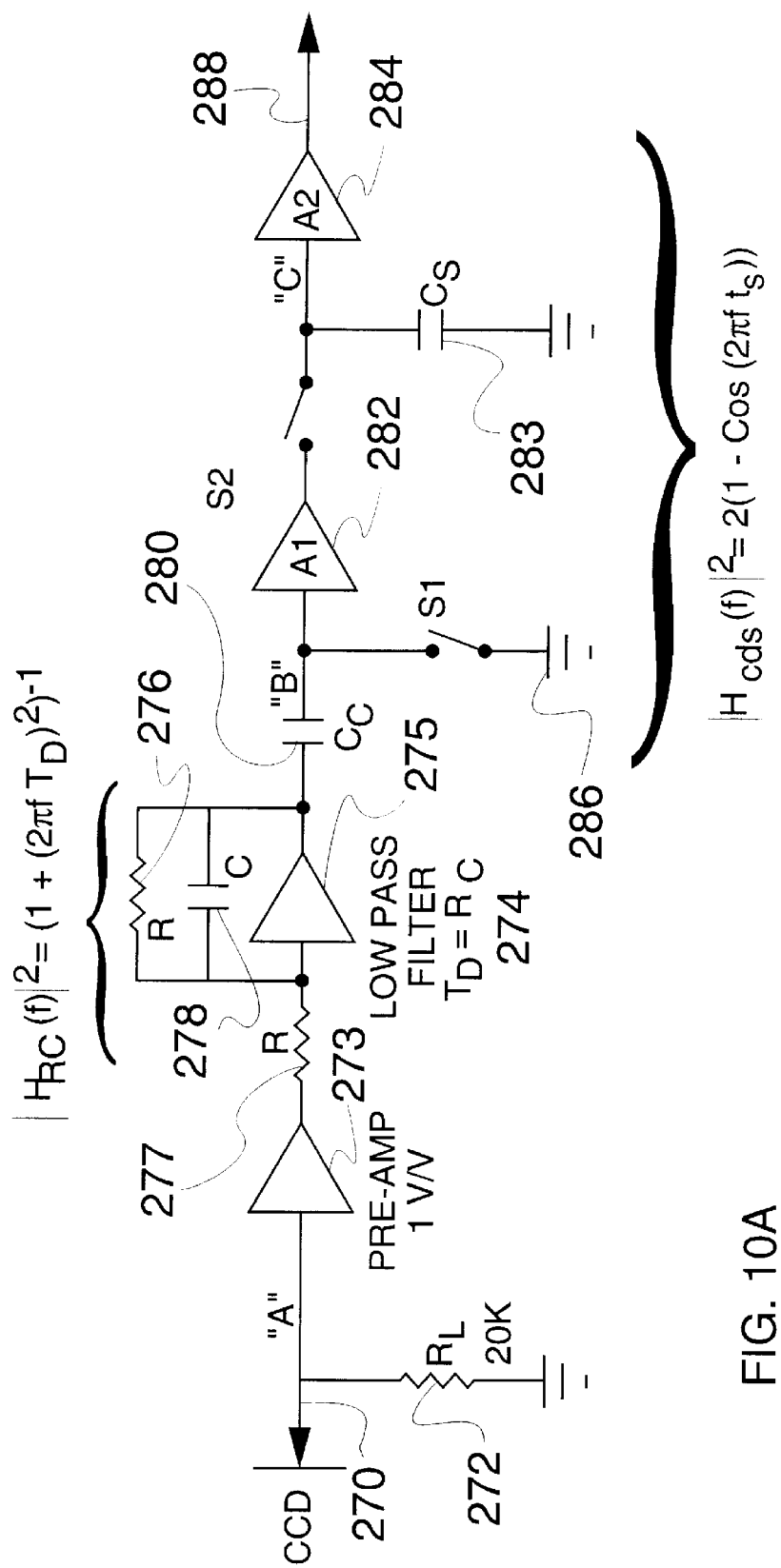
FIG. 10A is a block diagram of a dual sampler processor.
Figure 10B:
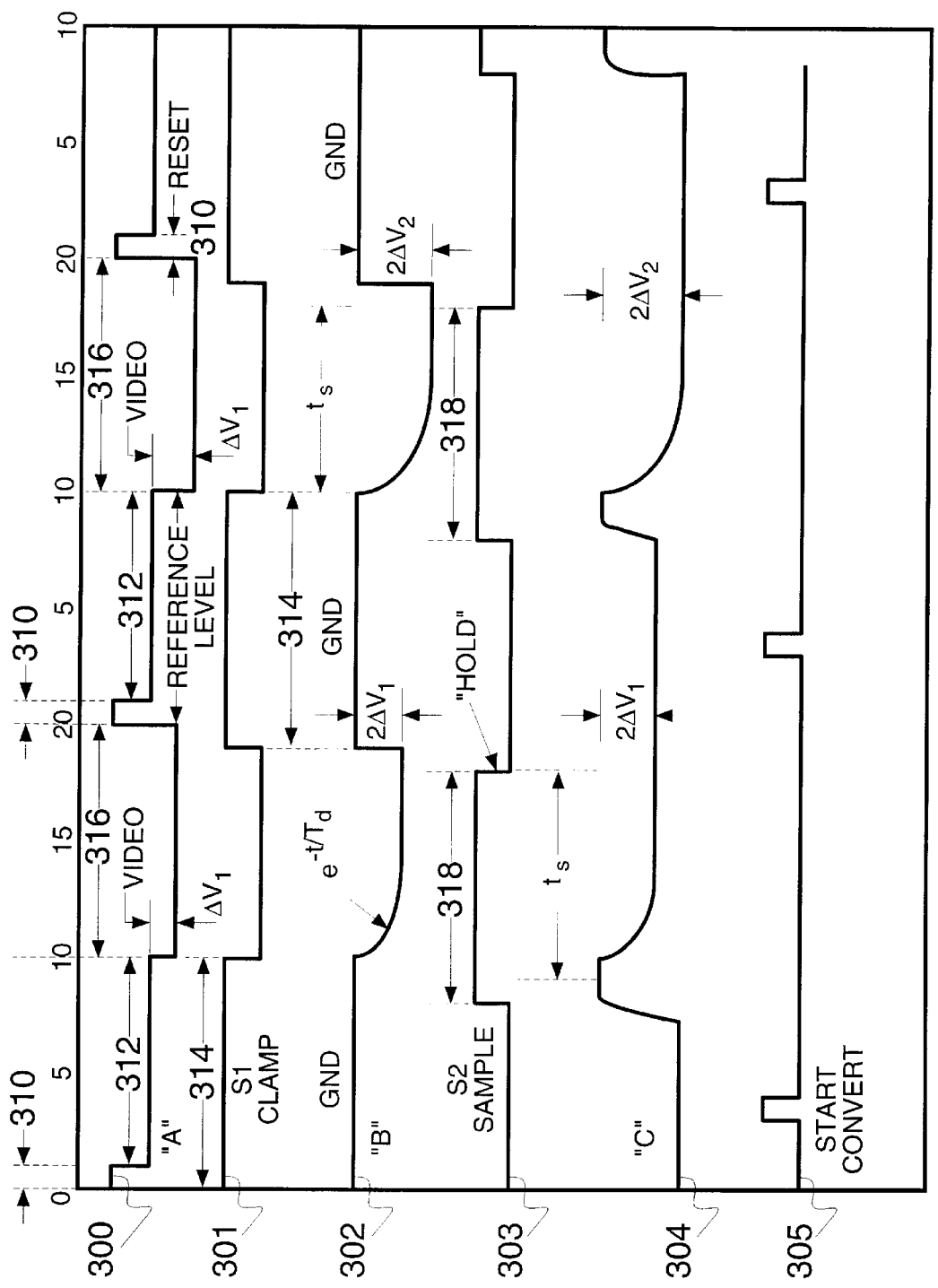
FIG. 10B is a graph showing timing diagrams for the dual sampler processor of FIG. 10A.

A more detailed diagram of a particular type of correlated double sampling circuit, known as a dual sampler processor, is shown in FIG. 10A. Timing diagrams for the correlated double sampling circuit of FIG. 10A are shown in FIG. 10B. In FIG. 10A, a CCD signal 270 is connected to a pre-amplification stage 273. A resistance $R_L$ represents the output resistance of the CCD detector. The pre-amplification stage 273 is connected to a low pass filter stage 274 comprising an amplifier 275, two resistors 276 and 277, and a capacitor 278, configured as shown. The transfer function of the low pass filter stage is:

$$|H_{RC}(f)|^2 = 1/(1+(2\pi T_D)^2)$$

where $T_D$=the RC time constant of resistor 276 and capacitor 278. The low pass filter stage 274 is connected to a capacitor 280. Capacitor 280 is connected to a buffer stage 282 and one end of a switch S1. The other end of the switch S1 is connected to ground 286. The buffer stage 282 is connected to a second switch S2. The other end of the switch S2 is connected to a capacitor 283 and is buffered by another buffer stage 284. Buffer stage 284 outputs a correlated signal 288.

Operation of the correlated double sampling circuit shown in FIG. 10A may be explained with reference to the timing diagrams of FIG. 10B. The CCD signal 270 may be divided into a plurality of pixel periods, each of which comprises input from a particular pixel, as noted. Timing of the dual sampling processor may be divided into five non-exclusive time intervals within a pixel period. These time periods may be referred to as (1) reset, (2) reference, (3) clamp, (4) video dump, and (5) sample. Each of these time periods are explained more fully below.

The reset period 310 shown with respect to waveform 300 in FIG. 10B is commenced when the reset switch (e.g., reset MOSFET as shown in FIG. 4) is turned on, which starts a pixel readout sequence. Waveform 300 in FIG. 10B is an example of a CCD video output signal starting from the time the reset switch is turned on. During the reset period 310, the sense capacitor 152 in the CCD output stage (e.g., as shown in FIG. 4) is set to the voltage level of the reference voltage source 156, thereby setting a positive charge packet in sense capacitor 152 to be eroded by signal electrons. The time constant associated with this operation is preferably very small. For example, the time constant may be 800 picoseconds, where the sense capacitor 152 has a value of 0.4 pF and an "on" resistance of 2 kΩ. As a consequence of the small time constant, the reset pulse width applied to the reset MOSFET 154 to control clearing the charge on the sense capacitor 152 can be made quite small if desired (e.g., a few nanoseconds).

Application of a reset pulse to the reset MOSFET 154 generates a feed-through pulse seen in the CCD signal 270. This feed-through pulse is caused by an effective capacitor divider network comprising the sense capacitor 152 and a gate-to-source capacitance $C_{gs}$ of the reset MOSFET 154.

After the reset period 310, a reference period 312 occurs after the reset switch (i.e., MOSFET 154) is turned off. The voltage level at the sense node (e.g., at the sense capacitor 152) quickly decays to the reference potential 156 during this time. The sense node retains the reference potential until signal charge is dumped onto the sense capacitor 152.

A clamp period 314 occurs during the reset period 312. During the clamp period 314, the clamp switch S1 is turned on, thereby forcing the voltage level at the input to the first buffer stage 282 to ground level or, alternatively, a non-zero reference level if desired. This action establishes a precise reference level for each pixel before video dump occurs. It also eliminates reset noise introduced during the time the reset switch 154 was on. The clamped level is considered the first "sample" taken by the dual sampler circuit. The clamp is released (i.e., switch S1 turned off) at the start of a following video dump period 316.

After the clamp period 314 follows the video dump period 316. During the video dump period 316, charge from the summing well is transferred onto the sense node (i.e., at the sense capacitor 156) when the output transfer gate becomes active. This causes the sense node to be discharged by an amount proportional to the signal level in that summing well of the CCD.

During the video-dump period 316 occurs a sample period 318. The video signal 300, after it has settled, is sampled and held by the action of switch S2. Switch S2 is turned on before video dump to assure that sampling begins when the clamp switch is "on" at ground potential. If sampling were not to start until after video dump, the response would exhibit a slight non-linearity resulting from the finite bandwidth and response time of the sample-and-hold circuit. Because switch S2 is turned on before video dump, sampling begins at the same potential for each pixel. The time period when the clamp is released to when the video is held is referred to as the clamp-to-sample time or sample-to-sample time $t_s$.

A preferred timing guideline is to position the reset clock far from the video dump edge due to its large amplitude. This positioning allows sufficient settling time of the reference level before the video signal is sampled. The reset clock feed-through pulse is eliminated as a result of the clamp switch, as the video signal is clamped over the entire pixel period except during the sample-to-sample time $t_s$.

The sample-to-sample time $t_s$ and electrical bandwidth $T_D$ are preferably selected to achieve low noise performance. The correlated double sampling processor acts as a band-pass filter in that low frequency noise is rejected when $t_s$ is made smaller (because these low frequencies become correlated), while high frequency noise is rejected when the bandwidth is made smaller. The center frequency of the effective band-pass filter is tuned by adjusting $t_s$ and $T_D$ while maintaining a high signal amplification. The optimum center frequency is selected when the noise is minimized for a given CCD noise input spectrum.

Preferably, the correlated double sampling circuit is configured so as to completely eliminate kTC noise and to optimally filter white and 1/f noise generated by the on-chip CCD amplifier, thereby improving overall signal-to-noise ratio.

Figure 11A:
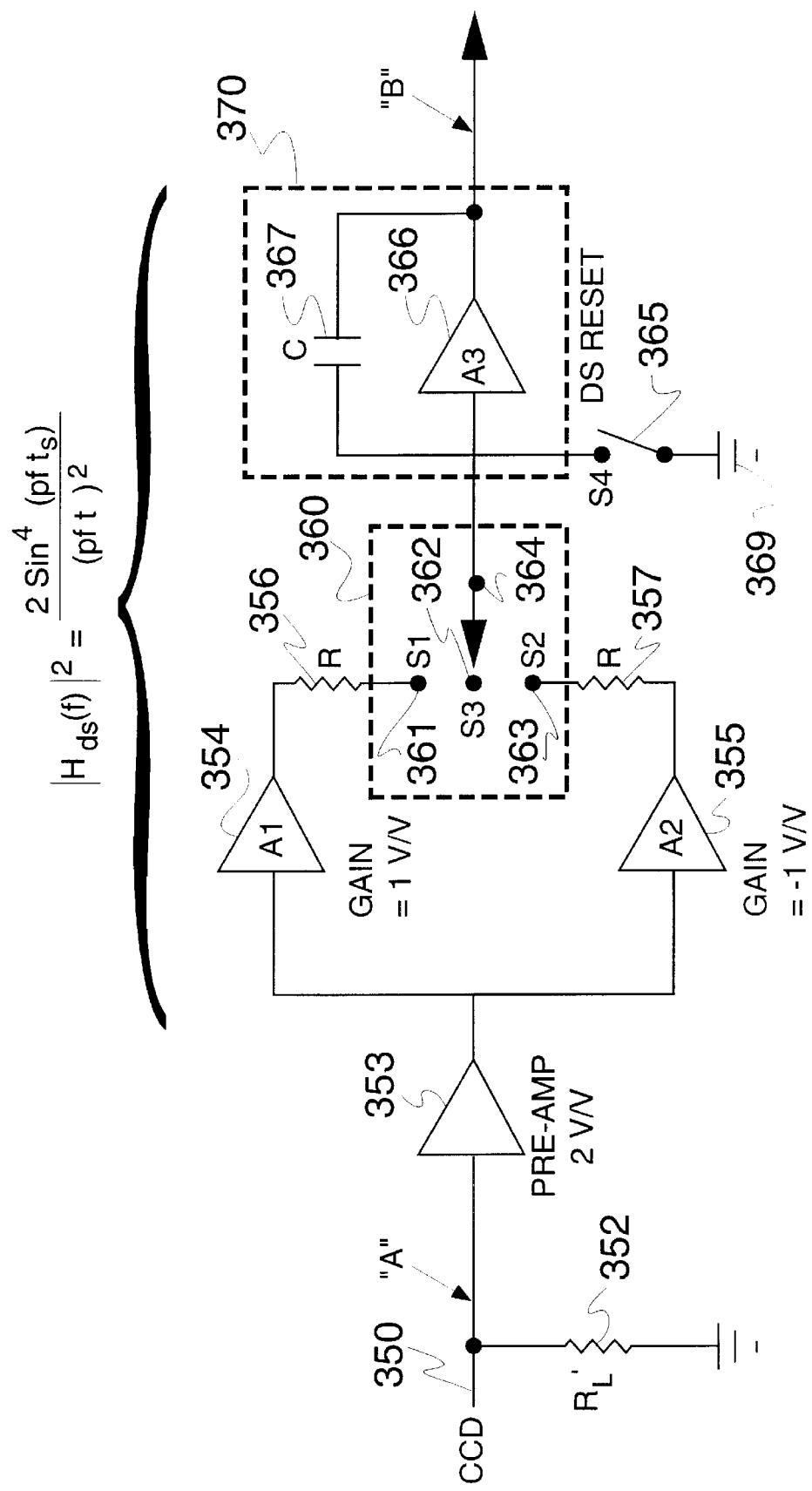
FIG. 11A is a circuit block diagram of a dual slope processor.
Figure 11B:
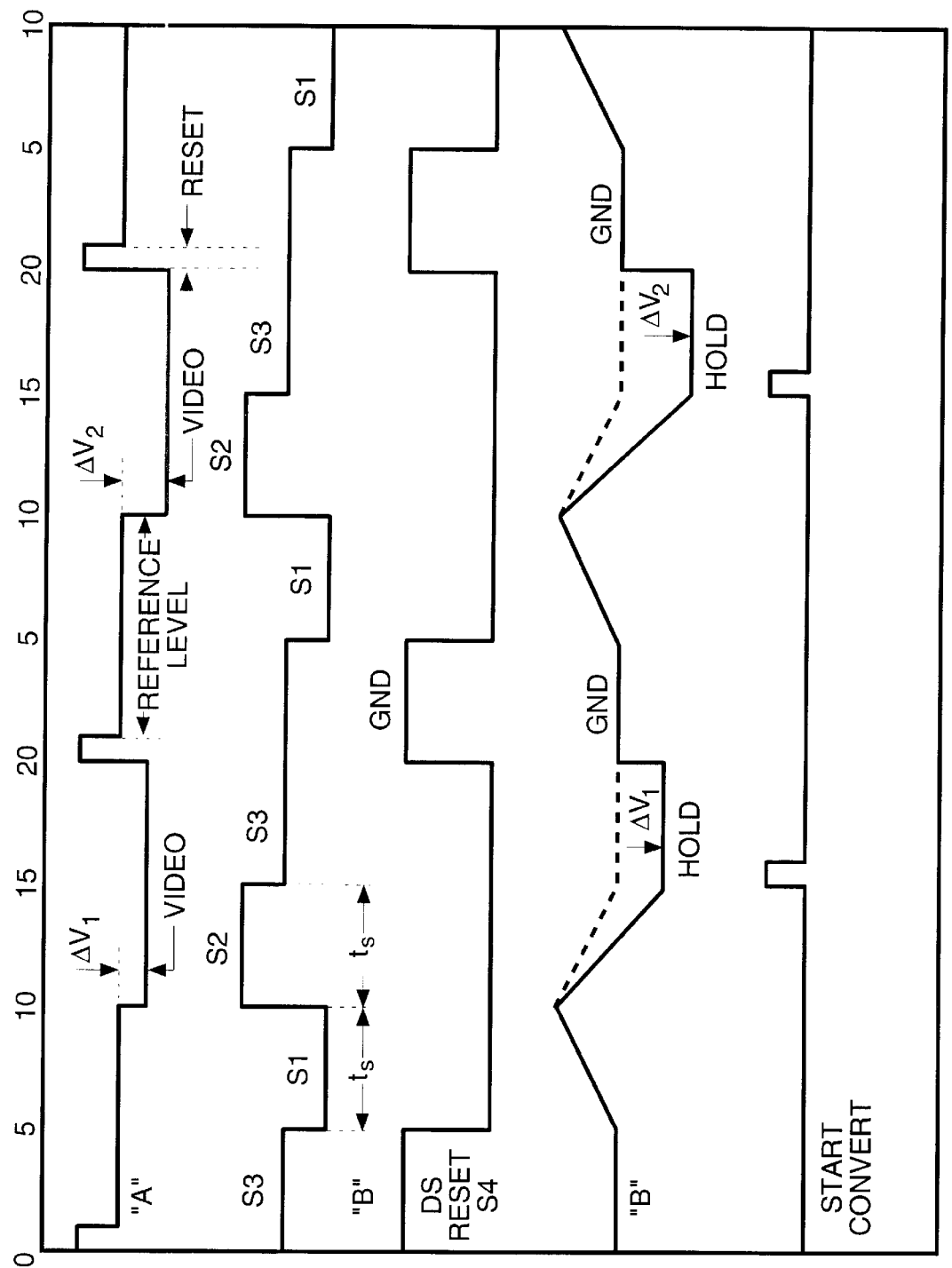
FIG. 11B is a graph showing timing diagrams for the dual slope processor of FIG. 11A.

Another type of correlated double sampling circuit that may be used is a dual slope processor. The performance of the dual slope processor when operating at a slow data rate is very similar to that of the dual sampler processor, but the dual sampler processor is preferred at high pixel rates. A diagram of a dual slope processor is shown in FIG. 11A. Timing diagrams for the dual slope processor of FIG. 11A are shown in FIG. 11B.

In the dual slope processor of FIG. 11A, a resistor 352 represents the output resistance of a CCD detector. A CCD output signal 350 is connected to a pre-amplifier 353. The output of the pre-amplifier 353 is connected to an inverting amplifier 355 and a non-inverting amplifier 354, each of which have a gain of unity. The output of the inverting amplifier 355 and the output of the non-inverting amplifier 354 are each connected to a three-position switch 360. The output of the non-inverting amplifier 354 is connected through a resistor 356 to one position 361 of the three-position switch, while the output of the inverting amplifier 355 is connected through a resistor 357 to another position 363 of the three-position switch 360. A third position 362 of the three-position switch 360 is left open. A common end 364 of the three-position switch 360 is connected to an integrator 370. The integrator 370 comprises an operational amplifier 366 and a capacitor 367. The input and the output of the operational amplifier 366 are connected to opposite ends of the capacitor 367 as shown in FIG. 11A. Another switch 365 is connected from the input of the integrating amplifier 366 to ground 369.

In operation, the CCD video signal 350 is amplified by the pre-amplifier 353. The pre-amplifier 353 may have a gain of, for example, 2 V/V. The output of the pre-amplifier 353 is fed into the integrator 370 by way of the three-position switch 360. Processing of the CCD video signal 350 begins by first resetting the integrator 370 to ground potential by turning on switch 365 and setting switch 364 to position 362. After resetting the integrator 370, switch 365 opens, and the three-way switch 360 switches to the first position 361 so as to allow the reference voltage level to be integrated onto the integrating capacitor 367 for a sample time $t_s$.

The effect of integrating is to subtract the reset potential and thereby eliminate common mode reset noise. After integrating for $t_s$ seconds, charge is dumped onto the sense node (e.g., the sense capacitor 152) of the CCD. Simultaneously the three-position switch 360 is switched to the second position 363 to connect the integrator 370 to the output of the inverting amplifier 355. The reference level plus the video level are integrated for $t_s$ seconds when the switch 360 opens to the third position 362. The signal is then held by the integrator 370.

Output signals from either the dual sampler or dual slope processors may be digitized by suitable means, such as and analog-to-digital converter, and processed digitally, or may be processed using some or all of the analog techniques described further herein.

Figure 12:
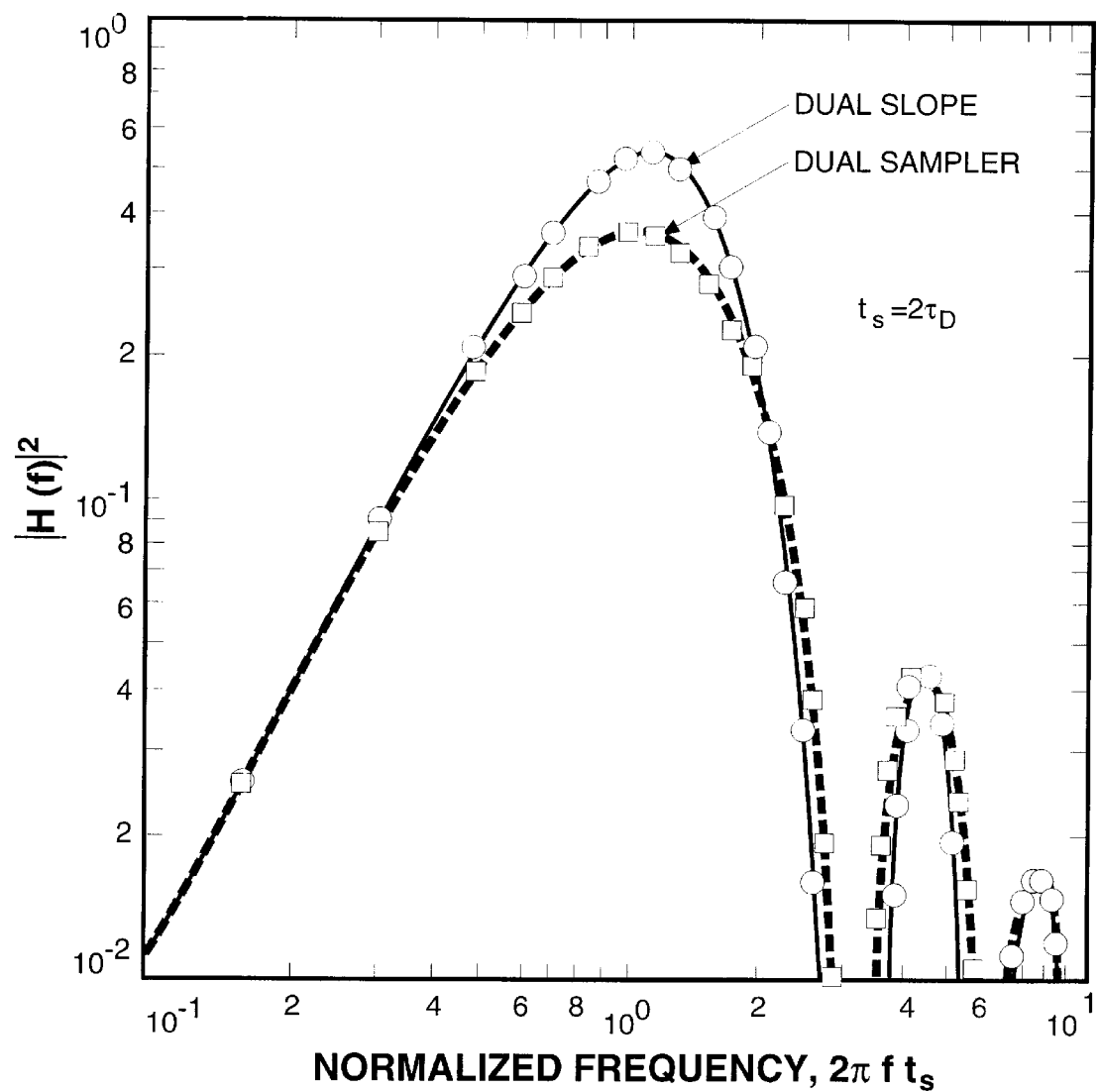
FIG. 12 is a graph of transfer functions for the dual sampler processor of FIG. 10A and the dual slope processor of FIG. 11A.

Transfer functions for the dual sampler and dual slope processors as a function of normalized frequency ($2\pi f t_s$) are compared in FIG. 12, assuming $t_s = 2T_D$ for the dual sampler processor. As shown in FIG. 12, the filtering action is very close between the two different types of processors, although the correlated dual sampler processor is preferred for higher data rates.

The particular characteristics of CCD detectors place special requirements on the optical system. For example, a CCD-based bar code reader designed to read fast moving bar code labels must have a relatively short exposure time. In order to read in ambient light conditions, with little or no self generated light, the optical system of such a bar code reader is thus preferably configured so as to gather the maximum light available.

The invention contemplates a number of different optical structures that are suitable for use in the preferred embodiments. These optical structures include, for example, poly-optic and multi-focus lenses, graded index elements, optical flats, prisms, and others. These structures may be used alone or in combination to increase the light gathering power and depth of field of the various embodiments described herein.

Figure 13A:
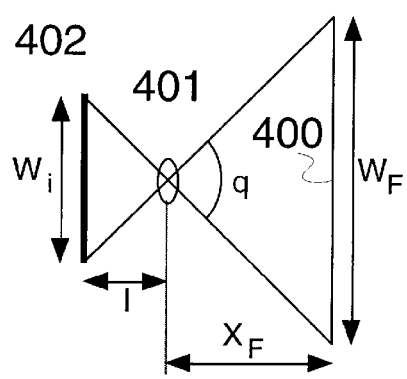
FIG. 13A is a diagram of an optical system based on a single lens model.

A simple optical system for a linear CCD is a single lens system. A single lens model is diagrammed in FIG. 13A, which shows some of the basic relationships between reading distance and length of scan line. The single lens model of FIG. 13A shows the gathering of light from a target 400 focused through a lens 401 and projected onto an imager (e.g., CCD detector) 402. As shown in FIG. 13A, the lens 401 can be thought of as projecting from the imager 402 a virtual scan line of length $W_F$ at a distance $X_F$ where the lens 401 is focused. The ratio of the virtual scan line length $W_F$ to the imager length $W_i$ is the ratio of the focal distance $X_F$ to the imager distance I:

$$W_F = W_i X_F / I$$

The imager distance I can similarly be calculated from the lens equation:

$$I = X_F f / (X_F - f)$$

Each pixel is "projected" along the length of the virtual scan line $W_F$. The image of the pixels by virtue of such projection is magnified by the $X_F/I$ ratio.

The width $W_F$ corresponds to the field of view of the imager 402 at a distance $X_F$. The imager 402 will have an angle of view $\theta$ as follows:

$$\theta = 2 \, \mathrm{Arctan} \, (W_i / 2 X_F)$$

Design of an optical system may involve considerations of focus blur, diffraction, aberrations, variable light intensity, light scattering, label reflectivity, and label print contrast ratio. These topics are discussed briefly below before a more complete description is provided of the preferred embodiments of optical structures in accordance with various aspects of the present invention.

Figure 13B:
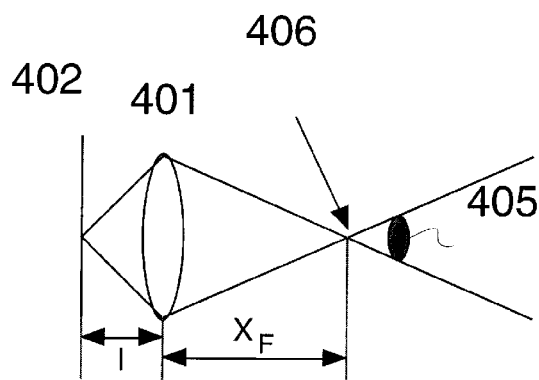
FIG. 13B is a diagram of a single lens model showing creation of a blur spot when the target image is moved away from the focal point.

The phenomenon of focus blur relates to the distance of the target image from the focal spot of the lens. If a bar code is located at a distance $X_F$ from the lens and within the field of view width $W_F$, then the bar code will be in focus on the imager 402. If, as shown in FIG. 13B, the bar code is moved closer to or farther away from the lens 401, the image will become blurry. This blurriness results from the bar code being imaged by a "virtual spot" 405 or blur spot that is larger than the focal spot at the optimum focal point 406. The size of the blur spot 405 is a linear function of distance from the focal point 406, as can be seen in FIG. 13B. The blur spot 405 grows more rapidly with distance for a wider lens aperture (opening) than for a narrower lens aperture. The ratio of the aperture size to the focal length is called the f-number or f-stop and is written as f/#. Thus, for example, an f/4 lens will have half the depth of field of a f/8 lens, because the diameter of the aperture of the f/8 lens is half the aperture diameter of the f/4 lens.

An analogy can be drawn between a CCD imaging system and a laser optic system, where the waist of the laser beam corresponds to the focal point of the imaging system, and the size of the laser spot corresponds to the image of the point spread function at the target (e.g., bar code). In practice, the spot at the focal point 406 (or "waist") may not be of negligibly small size, but rather may be somewhat larger due to the effects of diffraction and lens aberrations. The size of the lens aperture affects the spot size resulting from diffraction, which may occur when only a portion of a wavefront of light is allowed through the aperture. Larger apertures generally result in a smaller spot size, while smaller apertures result in a larger spot size. The effects of diffraction also depend on the wavelength of the light, whether ambient or self-generated. For example, blue light tends to create a smaller spot size than red light.

In an optical model for CCD-based image reading systems, the effects of focus blur and diffraction spot size may estimated as a root mean square (i.e., the square root of the sum of the squares of both spot sizes).

In addition to diffraction, lens aberrations (i.e., deviations from ideal lens shape) may lead to larger waist spot sizes. The resulting waist spot size may be expressed as $D(1+K)$, where D is the diffraction limited spot size and K is an aberration factor. For an aberration free lens, K=0.

There are several types of aberrations, including spherical aberration and chromatic aberration. Spherical aberration is the primary type of aberration with large focal length lenses (larger than f/3). Spherical aberration arises from the difference between a perfect shaped lens and a spherical shaped lens. To form a perfect (diffraction limited) image, a spherical wavefront is required. However, a spherical lens shape is not the correct shape to create a spherical wavefront. The correct lens shape depends on the object-to-image distance ratio (referred to as the magnification ratio or conjugate ratio). The difference between this perfect shaped lens and a spherical shaped lens causes spherical aberration.

The effect of spherical aberration, as shown in FIG. 14A, is an effective shift in focal length depending on where radially on the lens the light passes (i.e., ray height). The region of the lens near the center has one focus, while concentric rings of the lens radiating outward from the center will have differing focal lengths depending on their distance from the center. Spherical aberration can be minimized or eliminated by using a properly shaped spherical lens (e.g., plano-convex, double-convex, meniscus), shaping the lens correctly (such as with aspheric lenses), or by using multiple lenses (e.g., doublets or triplets).

Chromatic aberration relates to the variation of focal length as a function of wavelength. The focal length variation occurs because the index of refraction of an optical substance varies with wavelength (an effect called dispersion). Chromatic aberration is the primary type of aberration with apertures smaller than f/2, when astigmatism is not present. Chromatic aberration can be corrected by using two different lenses with different dispersion properties.

Coma relates to a variation in magnification as a function of ray height when imaging objects not on the optical axis. The effect of coma, illustrated in FIG. 14B, for example, is typically overshadowed by the effect of astigmatism, but can nevertheless be corrected by proper placement of the aperture.

Astigmatism is the difference in focus between the horizontal and vertical axis. The effect of astigmatism, illustrated in FIG. 14C, for example, is to cause the image of tangential lines to appear at one distance and radial lines to appear at a different distance. Lenses with or without astigmatism will generally exhibit field curvature, which is the bending of the image plane. Field curvature is characterized by different tangential or sagittal lines, as shown in the comparative diagram of FIG. 14D. In a non-astigmatic system, the tangential field curvature and sagittal field curvature are the same and lie on the Petzval surface, while in an astigmatic system they are different.

Figure 15:
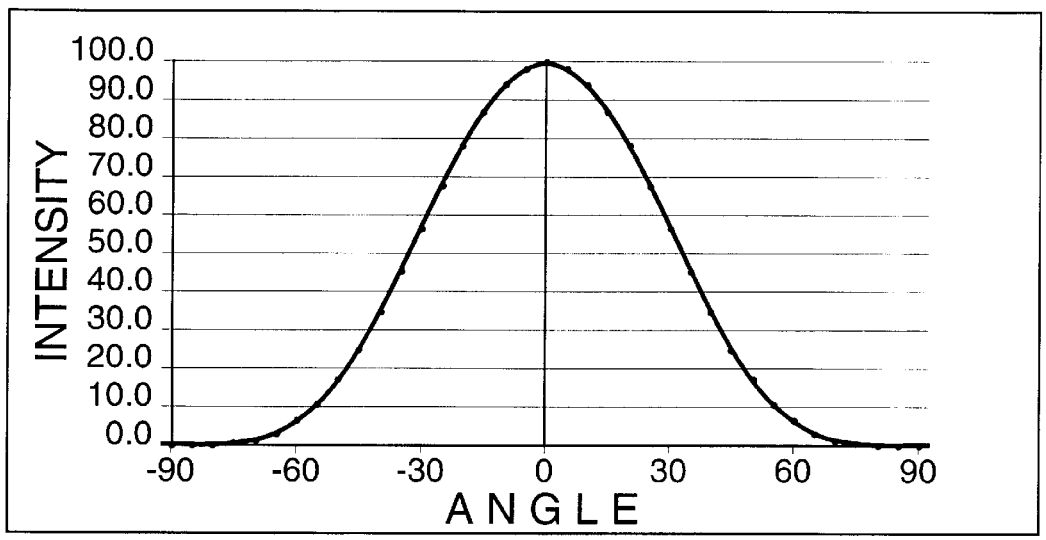
FIG. 15 is a graph illustrating a cosine law effect.

Another consideration is cosine law effect, a term which describes the variation of light intensity across an imager. Cosine law effect is most pronounced with a wide angle field of view. Several factors each having a "cosine" component combine to form an intensity distribution that varies as the cosine to the fourth power as a function of field angle. Wider field angles thus produce larger variations in signal intensity over the imager, while narrower field angles produce smaller signal intensity variations. Cosine law effect should be taken into account so as to collect enough light (i.e., obtain a sufficient signal level) at the edges of a virtual scan line. A graph of the cosine law effect is shown in FIG. 15.

Figure 16:
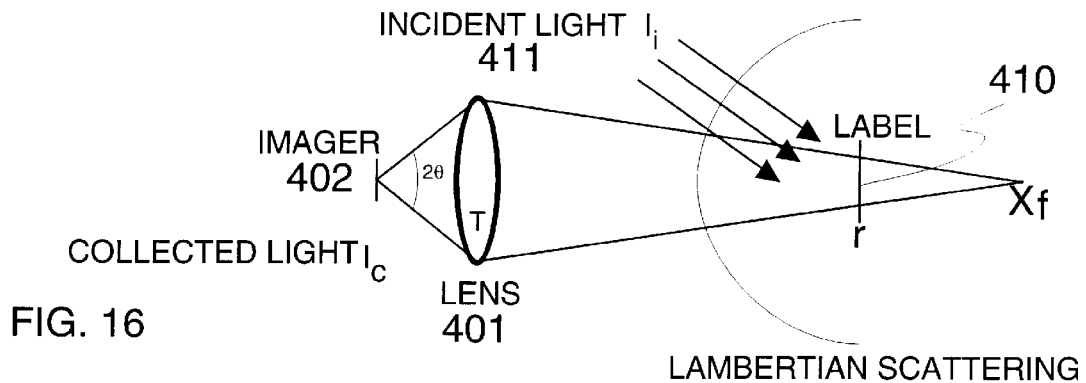
FIG. 16 is a diagram illustrating light collection.

The amount of light collected by the imager 402 depends in part on the intensity of the light (whether ambient or not)

and the reflectivity of the bar code label. A light collection model is illustrated in FIG. 16. If a target label 410 with reflectivity r is illuminated with light 411 having an irradiance $I_i$ lumens/m², then $I_i \cdot r$ lumens/m² will generally be re-radiated from the label. A Lambertian (perfectly diffuse) source that emits N lumens/m² into a hemisphere emits N/π lumens/steradian·m² at normal incidence to the source. Therefore, the radiance of the target label (at normal incidence) having irradiance $I_i \cdot r$ may be expressed as $I_i \cdot r/\pi$ lumens/steradian·m². An imaging system will receive an irradiance at the imager 402 equal to πTN'sin²θ, where N' is the object radiance in lumens/steradian·m², T is the transmission of the system, and θ is the half angle from the center of the imager to the edge of the lens. Recalling that the imager distance I can be expressed as $I = X_F f/(X_F - f)$, where f is the local length and $X_F$ is the distance to focus, the amount of collected light $I_c$ in lumens/m² is therefore given as follows:

$$I_c = I_i \cdot rT \sin^2\theta$$

and $$\theta = \text{Arctan}\{(X_F - f)/2AX_F\}$$

For small aperture size:

$$I_c = I_i \cdot (rT/4A^2) \cdot (X_F - f)^2 / X_F^2$$

Where
 $I_i$ = Incident Light (lumens/m²)
 $I_c$ = Collected Light (lumens/m²)
 r = Label Reflectance (percentage)
 T = Lens Transmission (percentage)
 θ = Aperture Half Angle (degrees)
 A = f/# of Aperture (unitless)
 f = Focal Length of Lens (meters)
 $X_F$ = Distance to Focus (meters)

Thus, the amount of light collected at the imager 402 is independent of distance of the target label from the lens 401. The collected light is, however, proportionally affected by the intensity of the light (ambient or otherwise) illuminating the label, the reflectance of the label, and the lens transmission. The collected light is inversely proportional to the f-number (f/#) squared, and depends to some degree on the position of focus ($X_F$) relative to the focal length.

To determine the modulation level of the CCD video output signal, the collected light $I_c$ may be multiplied by the print contrast ratio of the target label. It should be noted that the above calculations do not take into account any signal modulation reduction resulting from modulation transfer function (MTF) effects or cosine law effects.

Further information relating to optics and optical systems may be found in W. J. Smith, *Modern Optical Engineering—The Design of Optical Systems*, 2nd Edition (McGraw-Hill 1990).

A convenient model for estimating optical system performance and determining parameters for optimum lens design is given as follows:

$$\text{Focus Blur (mils)} = \sqrt{[(\text{Foc})^2 + (\text{Diff})^2]}$$

where Foc is geometric focus blur, and Diff is diffraction limited minimum spot size;

$$\text{Foc (mils)} = 1000 \cdot [f/(f/\#)] \cdot [(R - R_o)/R_o]$$

where R is distance from lens (inches), $R_o$ is focal point (inches), f is focal length of lens (inches), and f/# is relative aperture (f-stop);

$$\text{Diff (mils)} = 9.61 \times 10^{-5} \lambda R \cdot (f/\#)/f$$

where R is distance from the lens (inches), λ is nominal wavelength (nanometers); f is focal length of the lens (inches), and f/# is relative aperture (f-stop);

$$\text{Resolution (mils)} = 1000 WR/[I(f, R_o)N] \approx 1000 WR/(fN)$$

where R is distance from the lens (inches), W is width of the CCD array (inches), $I(f, R_o)$ is CCD image plane (inches), and N is the number of pixels in CCD array;

$$\text{Field of View (mils)} = 8.333 \, WR/[I(f, R_o)] \approx 8.333 \, WR/f$$

where R is distance from the lens (inches), W is width of the CCD array (inches), and $I(f, R_o)$ is CCD image plane (inches). Based on the above model, other optical parameters may be determined as follows:

$$\text{Diffraction} = 2.44 \lambda A X/i$$

$$\text{Minimum Spherical} = 0.067 X/A^3$$

$$\text{Chromatic} = X/(2 \cdot V \cdot A)$$

$$\text{Coma} = \theta \cdot X/(56A^2)$$

$$\text{Astigmatism} = \theta^2 \cdot X/(2A)$$

where λ is the wavelength in meters, A is the relative aperture (f/# or f-stop), V is the Abbe number, and θ is the half field angle in radians.

Typically, at least 2.5 pixels per minimum element width are needed to resolve bar codes. Focus blur can frequently be 1.9 times bigger than the minimum element width. Spots as big as 2.4 times the minimum element width may still provide workable results in low noise systems.

Certain of the preferred embodiments make use of shaped apertures and specialized lenses in order to increase light gathering capability and allow operation in reduced light, such as in ambient light conditions. Since in many applications a bar code reader images only bars/spaces and not necessarily true two dimensional images, some optimization of the lens aperture is possible. Increasing the size of the aperture in the direction of the bars generally provides greater collection with minimal effect on the depth of field characteristics. While this is strictly true when the bars are parallel with respect to the aperture, as the bars are rotated when reading the bar code at an angle the elliptical point spread "spot" shape grows with respect to the bar code.

Figure 17:
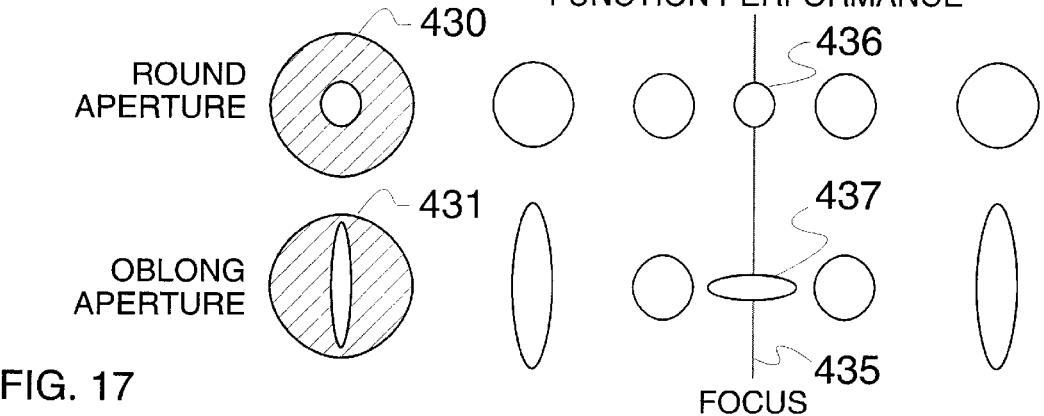
FIG. 17 is a diagram comparing the point spread function shapes through focus for a round aperture and an oblong/elliptical aperture.

This phenomenon is illustrated in FIG. 17. FIG. 17 is a diagram comparing the point spread function shapes through focus for a round aperture 430 and an oblong or elliptical aperture 431, both having the same light collection. As shown in FIG. 17, at a focal point 435, the round aperture through focus point spread spot 436 and the elliptical aperture through focus point spread spot 437 are each at a minimum. However, the elliptical aperture through focus point spread spot 437 is larger in the lateral direction than the round aperture through focus point spread spot 436.

Figure 18:
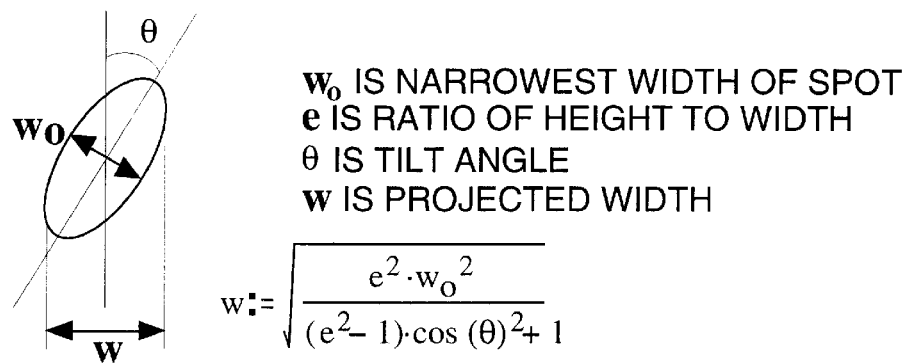
FIG. 18 is a diagram illustrating change in elliptical spot size with respect to tilt angle.

The elliptical spot size changes with respect to the tilt angle, as illustrated in FIG. 18. In FIG. 18, $w_o$ represents the narrowest width of the spot, θ represents the tilt angle (e.g., with respect to the vertical bars of a bar code), and w represents the projected width. The projected width may be characterized by the following equation:

$$w = \{(e^2 \cdot w_o^2)/[(e^2 - 1) \cdot (\cos \theta)^2 + 1]\}^{1/2}$$

where e represents the ratio of height to width. The area of the elliptical spot is given by the following equation:

$$\text{Area} = \pi \cdot e \cdot w_o^2$$

The above equation indicates that the increase in area of the elliptical spot is directly proportional to the height to width ratio.

Figure 19:
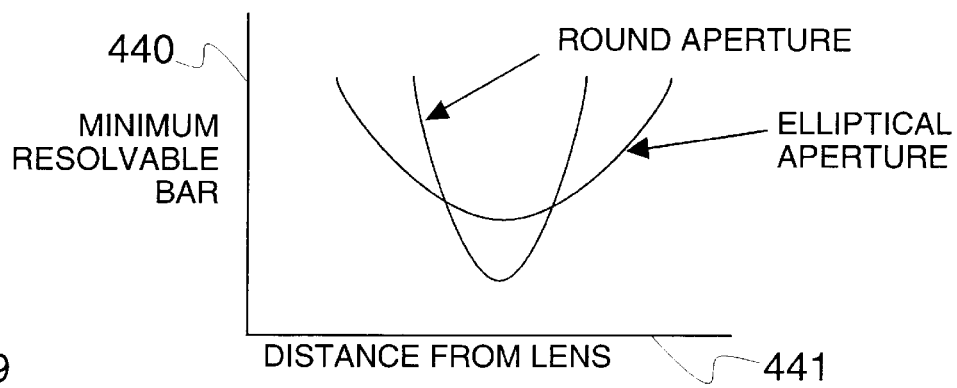
FIG. 19 is a graph showing illustrative depth of field plots for a round aperture and for an elliptical aperture collecting the same amount of light.

A narrower aperture, such as the elliptical aperture 431 (or other oblong aperture, such as a rectangular aperture) shown in FIG. 17, generally tends to increase the depth of field. The height of the aperture 431 in the direction parallel to the bars is enlarged to equalize the collection. FIG. 19 is a graph showing illustrative depth of field plots for a round aperture 430 and for an elliptical aperture 431 collecting the same amount of light. The graph of FIG. 19 plots the minimum resolvable bar width on one axis 440 against the distance from the lens on the other axis 441. As shown in FIG. 19, the narrower aperture creates a larger depth of field than the wider aperture, but has a larger minimum spot size due to diffraction.

Figure 20A:
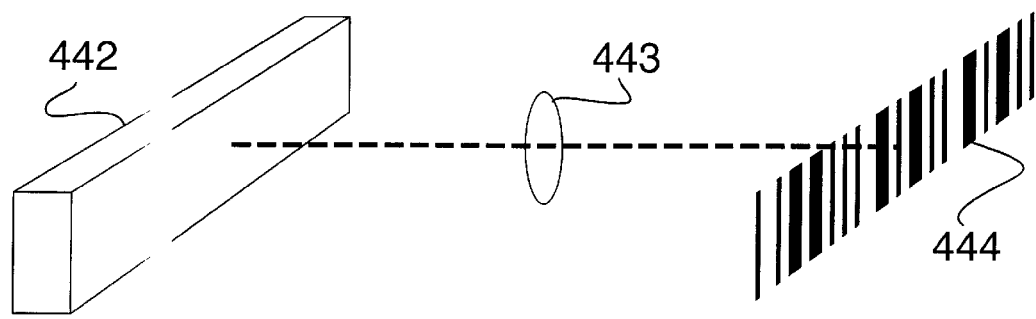
FIG. 20A is a diagram of an unapertured lens interposed between a target and an imager.

An optical system employing a small, round aperture (e.g., aperture 430) generally has a relatively good depth of field but suffers from the need for a long exposure time. Such a system is shown, for example, in FIG. 20A. In FIG. 20A, light is reflected from a target 444 (e.g., a bar code, shown from a back view) and focused through a round lens 443 (or lens having a round aperture) onto a CCD detector 442. In the optical system of FIG. 20A, as little as 0.02% of the reflected light may reach the CCD detector 442.

Figure 20B:
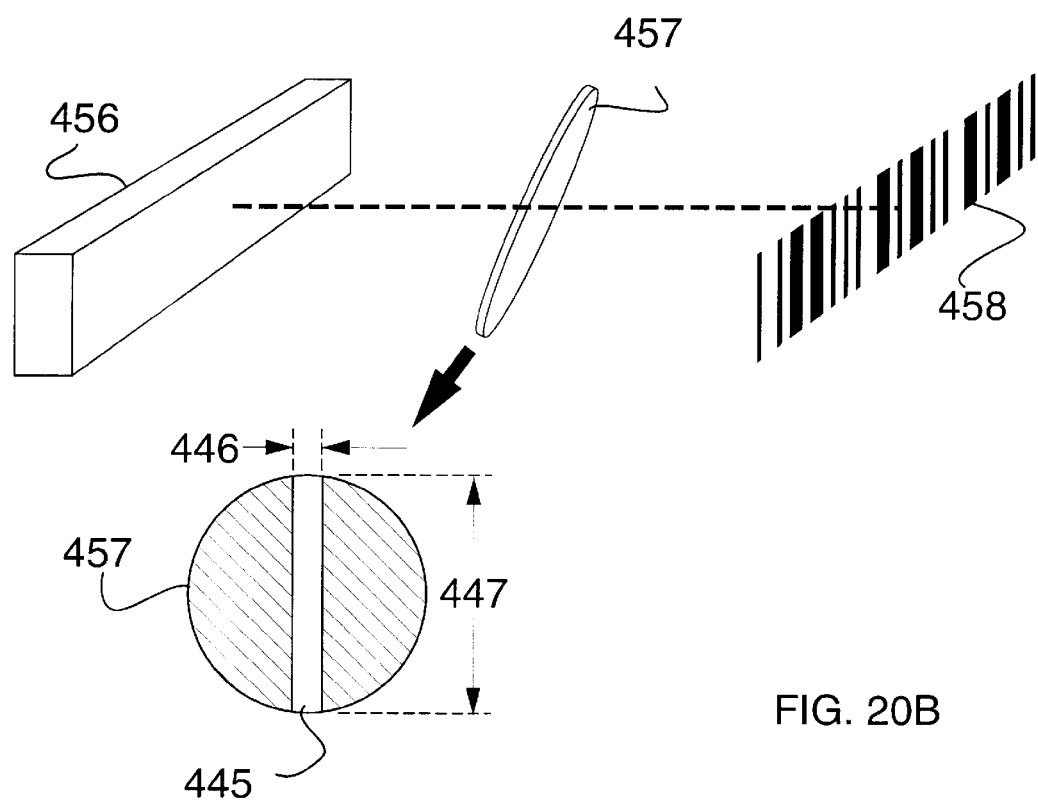
FIG. 20B is a diagram of an apertured lens in a similar relative position.

An oblong aperture (e.g., aperture 431) speeds up exposure time by allowing more light collection. A system comprising and oblong aperture is shown, for example, in FIG. 20B. In the optical system of FIG. 20B, light is reflected from a target 458 (e.g., a bar code, shown from a back view) through an apertured lens 457 (or an oblong or similarly shaped lens) onto a CCD detector 456. In one embodiment using a rectangular-shaped shaped aperture 445, a narrow axis 446 of the aperture 445 corresponds to an f-stop for the desired depth of field (e.g., f/20), while a long axis 447 of the aperture 445 has a larger f-stop (e.g., f/5) and therefore gathers more light. Although the range of angles of bar codes that the optical system of FIG. 20B will detect may be reduced in comparison to the FIG. 20A system by use of a oblong aperture, the collected light can be substantially increased (e.g., by as much as ten times or more).

A preferred embodiment of the present invention also makes use of a multi-focus lens system (e.g., a poly-optic system). Generally, use of a multi-focus lens allows an increase in depth of field without sacrificing the ability to collect light. Each lens element (called a zone) of a multi-focal lens is focused at a different distance. In one embodiment, further described herein, the field from each zone is simultaneously imaged on the CCD detector. In another embodiment, also described further herein, each zone is multiplexed (with an LCD shutter, for example) on the CCD detector instead of simultaneously superimposing all zones.

Figure 21A:
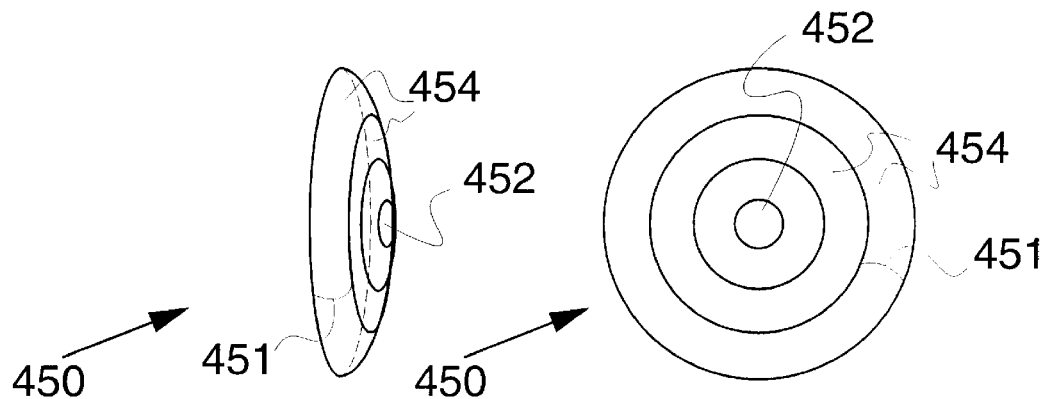
Figure 22A:
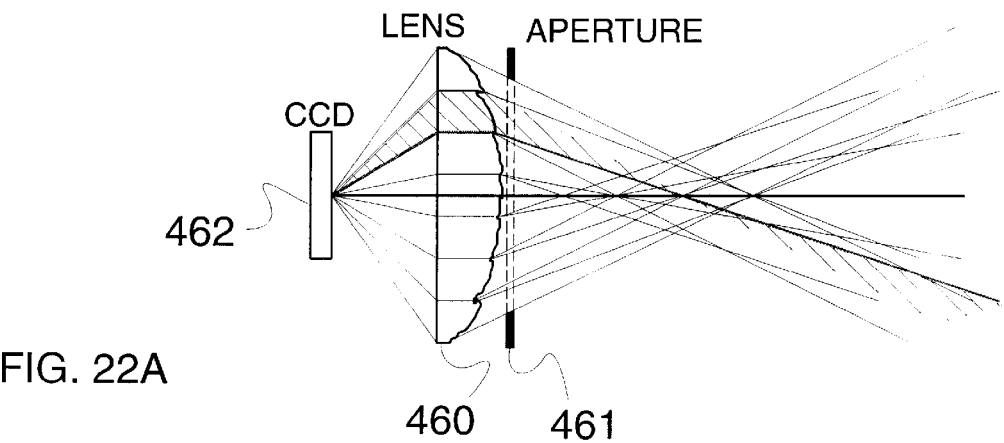
FIGS. 22A–22C are diagrams showing various views of a multi-focal lens system combined with an elliptical aperture.
Figure 22B:
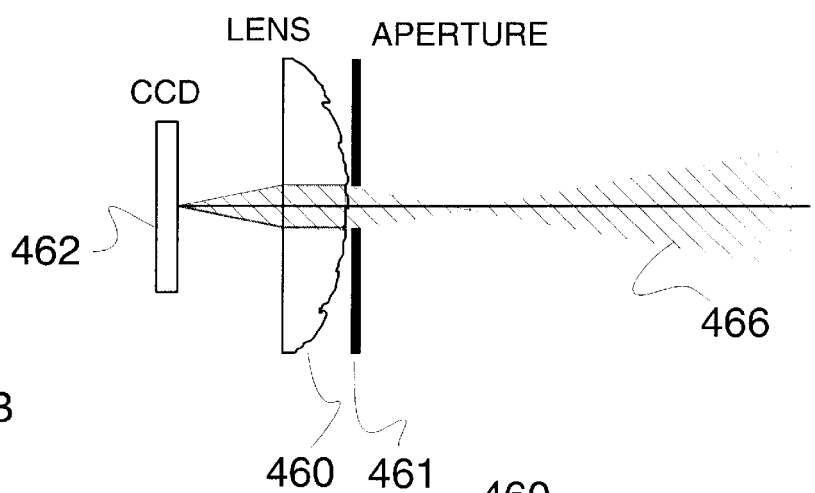
Figure 22C:
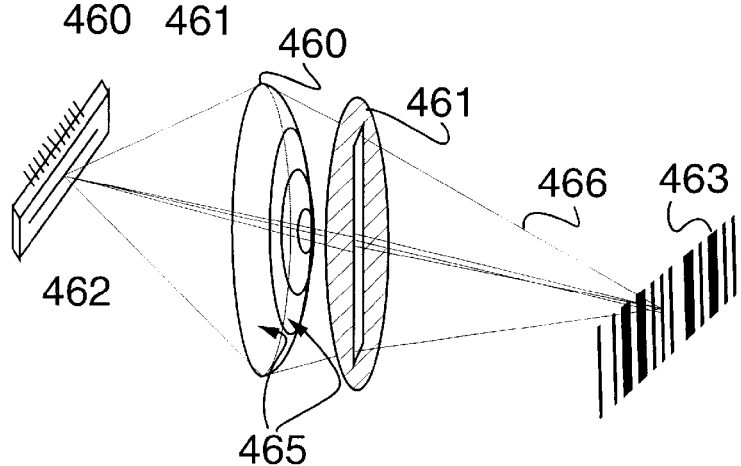

An exemplary embodiment of a multi-focus lens system combined with an elliptical aperture is shown in various views in FIGS. 22A–22C. The symmetric multi-focal lens 450 has concentric zones and is depicted by itself in FIGS. 21A and 21B. FIG. 21A shows the multi-focus lens 450 from an oblique view, while FIG. 21B shows the same lens 450 from front view. As shown, the lens 450 is divided into a plurality of concentric zones 451. Such a lens 450 has a symmetric configuration and may be suitable for machining with a diamond turned lathe.

The lens and aperture system of FIGS. 22A–22C are shown from three different views. FIG. 22A shows a side view, FIG. 22B shows a top view, and FIG. 22C shows an oblique view. The lens and aperture system of FIGS. 22A–22C comprises an elliptical (or rectangular) aperture 461 located in front of a multi-focus lens 460. The elliptical aperture 461 preferably has a high aspect ratio. The elliptical aperture 461 and multi-focus lens 460 are placed before an imager 462, such as the CCD detector described earlier herein. In operation, light reflected from a bar code 463 passes through the elliptical aperture 461 and is focused by the multi-focus lens 460. Each zone 465 of the multi-focus lens 460 focuses the reflected light 466 in a different manner on the imager 462, because each zone 465 focuses at a different distance. The depth of field is thereby expanded over that of a single-focus lens.

The response of a multi-focus lens (such as lens 450) may be determined under principles of superposition by summing the responses of each lens zone 451 by itself. If a shutter is used to screen out zones 451 of the multi-focus lens 450 (e.g. by use of an LCD), only one zone 451 (or however many zones are unscreened) at a time need be analyzed, and the result of each individual zone superimposed to obtain a composite response for the lens 450.

Figure 23A:
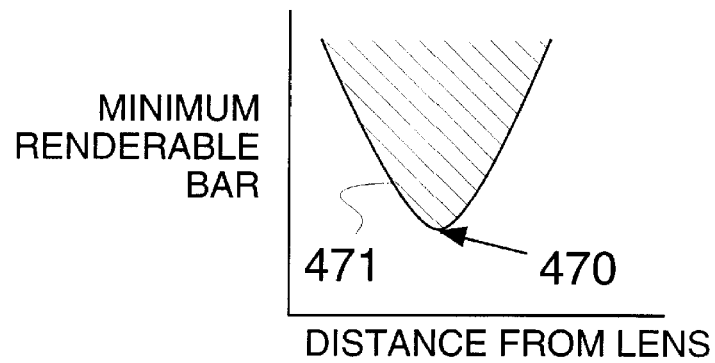
FIGS. 23A, 23B and 23C are graphs showing a minimum renderable bar width as a function of distance from a single-lens, a poly-optic lens with no interference, and a poly-optic lens with inter-zonal interference, respectively.
Figure 23B:
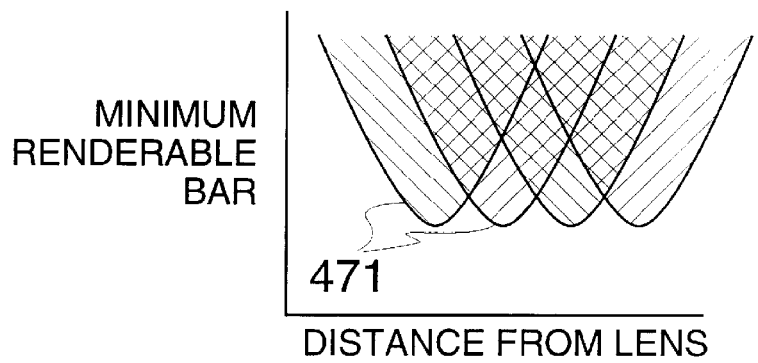

FIG. 23A is a graph showing the minimum renderable (i.e., resolvable) element width as a function of distance from the lens in a single-lens system. FIG. 23B is a graph showing minimum renderable bar width as a function of distance from the lens for a poly-optic (i.e., multi-focus) lens system, assuming no interference. Each parabolic-shaped plot 471 represents a particular zone 451 of the poly-optic lens 450. A focal point 470 corresponds to the minimum point of the parabola. The plots 471 are superimposed on one another to graphically show the creation of an enlarged depth of field for the poly-optic system. However, it is also possible that the different zones 451 may interfere with one another, causing "dead zones" in the depth of field plot. These dead zones 472 are depicted graphically in FIG. 23C, which is a similar plot to FIG. 23B but assumes that there is intra-lens interference from the poly-optic lens 450.

Interference between zones 451 may be caused by lobes in the point spread function of the lens 450, by misalignment of the optical centers of the zones 451, or a difference in the field of view of each zone 451. Different lens configurations generate different lobe patterns. Some point spread functions for a few common poly-optic lenses are shown in the FIGS. 24A through 30C and described below.

Figure 24A:
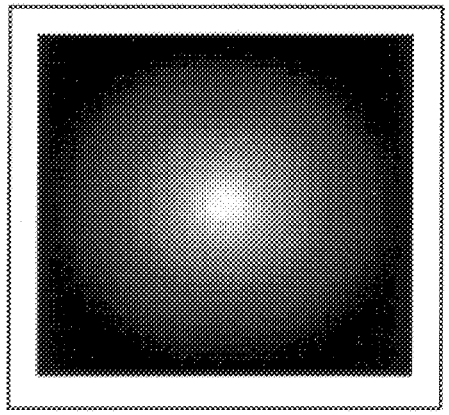
FIGS. 24A and 24B are diagrams of point spread functions for a center zone of the FIG. 21A–21B lens through focus and away from focus, respectively.
Figure 24B:
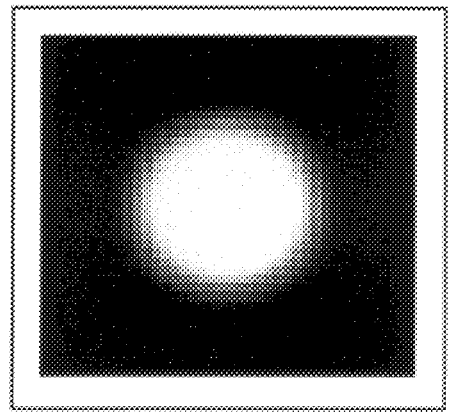
Figure 25A:
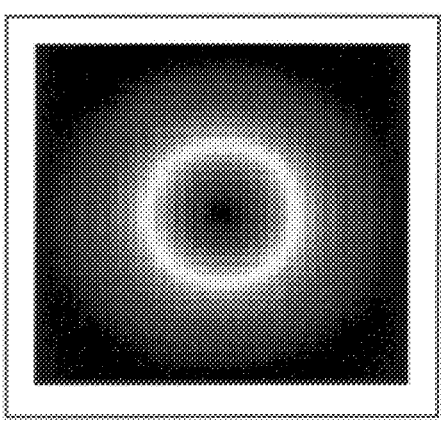
FIGS. 25A and 25B are diagrams of point spread functions for a ring zone of the FIG. 21A–21B lens through focus and away from focus, respectively.
Figure 25B:
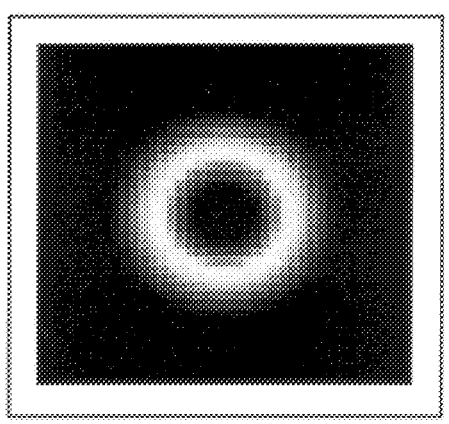

A simple multi-focus lens 450 configuration comprises a set of concentric zones 451, each with its own focal length, as shown previously in FIGS. 21A–21B. The point spread function through focus for the center zone 452 of the FIG. 21A lens is shown in FIG. 24A at focus and FIG. 24B away from focus. The point spread function through focus for a particular ring zone 454 (e.g., any other zone 451 besides the center zone 452) is shown in FIG. 25A at focus and FIG. 25B away from focus. The diagrams of FIGS. 24A and 25A are full scale, while the diagrams of FIGS. 24B and 25B are reduced relative thereto by a factor of 10:1.

FIGS. 26A through 30C depict point spread function plots of various combinations of center and ring zones of various focal lengths. The optical point spread function images appearing in FIGS. 26A through 30C have been approximated for simplicity. In general, the point spread function far from focus can be well approximated by geometric optics. For a circular aperture, the shape of the point spread function far from focus is similar to a cylinder. At or near focus, the point spread function's shape is determined by aberrations (if they are large) or by diffraction (if the aberrations are small). The point spread functions depicted in FIGS. 26A through 30C are primarily diffraction limited (i.e., they assume only small aberrations) at or near focus. For a circular aperture, the shape of the point spread function at or near focus should be close to the shape of an Airy disk.

Figure 26A:
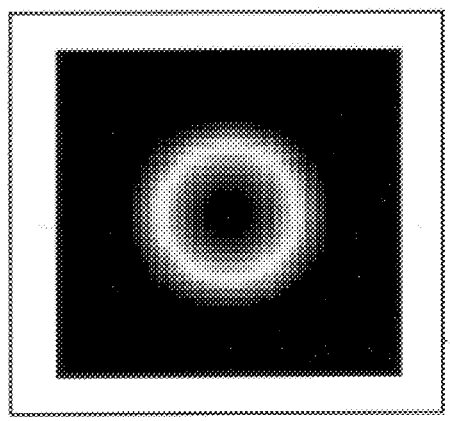
Figure 26B:
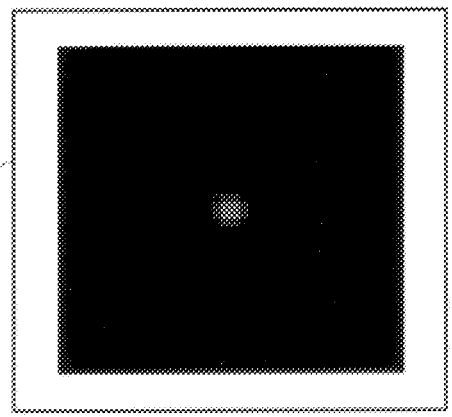
Figure 26C:
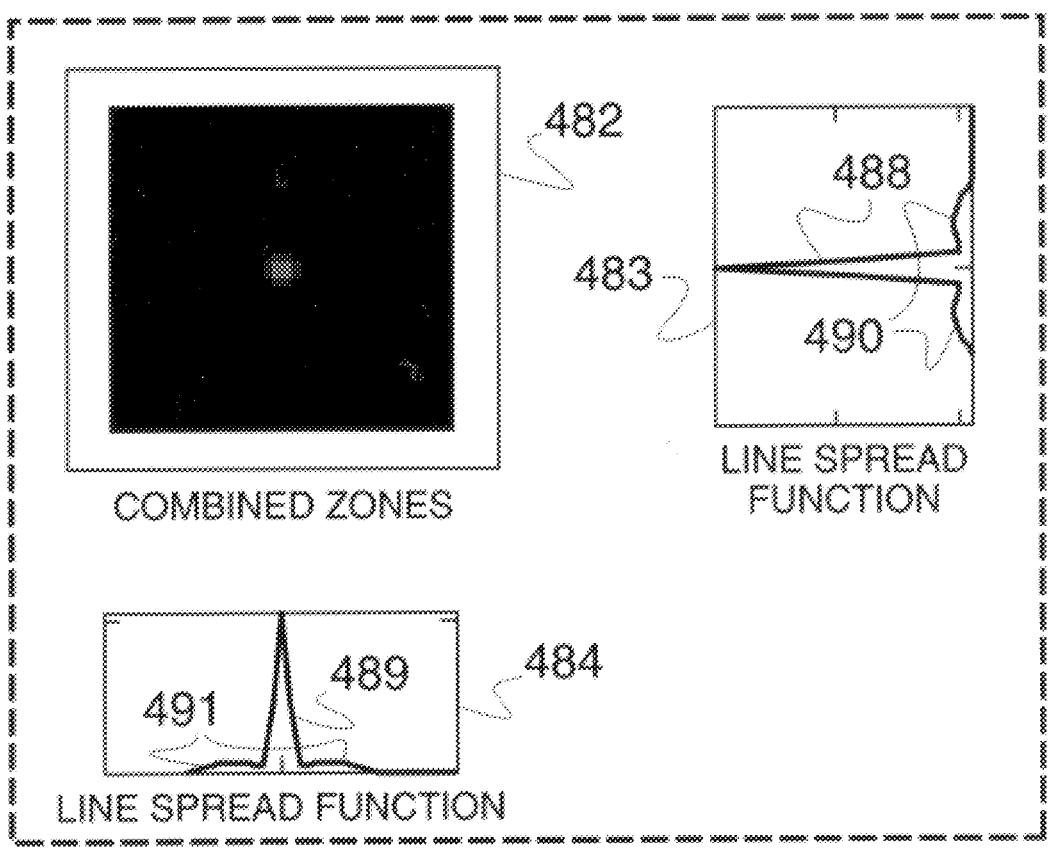

FIG. 26B is a diagram of one image 480 created from a center zone 452, while FIG. 26A is a diagram of another image 481 created from a ring zone 454, where the center zone 452 and ring zone 454 have differing focal lengths. FIG. 26C is a diagram showing a combined image 482 created from the combination of the center zone 452 with the ring zone 454 with only the center zone 452 in focus. In FIG. 26C, the image from the ring zone 454 is not readily visible mainly due to its low flux density, since it is out of focus. However, the plots of the line spread functions 483 and 484 clearly show the effect of the ring zone 454. The line spread functions 483, 484 each have a main peak 488 and 489, respectively, corresponding to the center zone 452 and a pair of much lower peaks 490 and 491, respectively, corresponding to the ring zone 454. As the center zone 452 goes out of focus, the effect of the ring zone 454 will become considerably more pronounced.

Figure 27A:
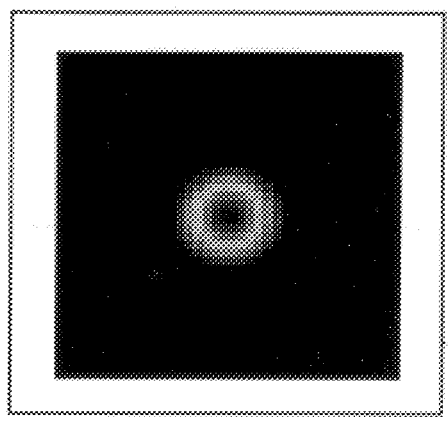
Figure 27B:
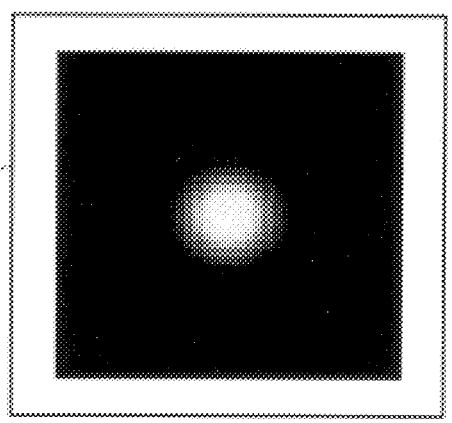
Figure 27C:
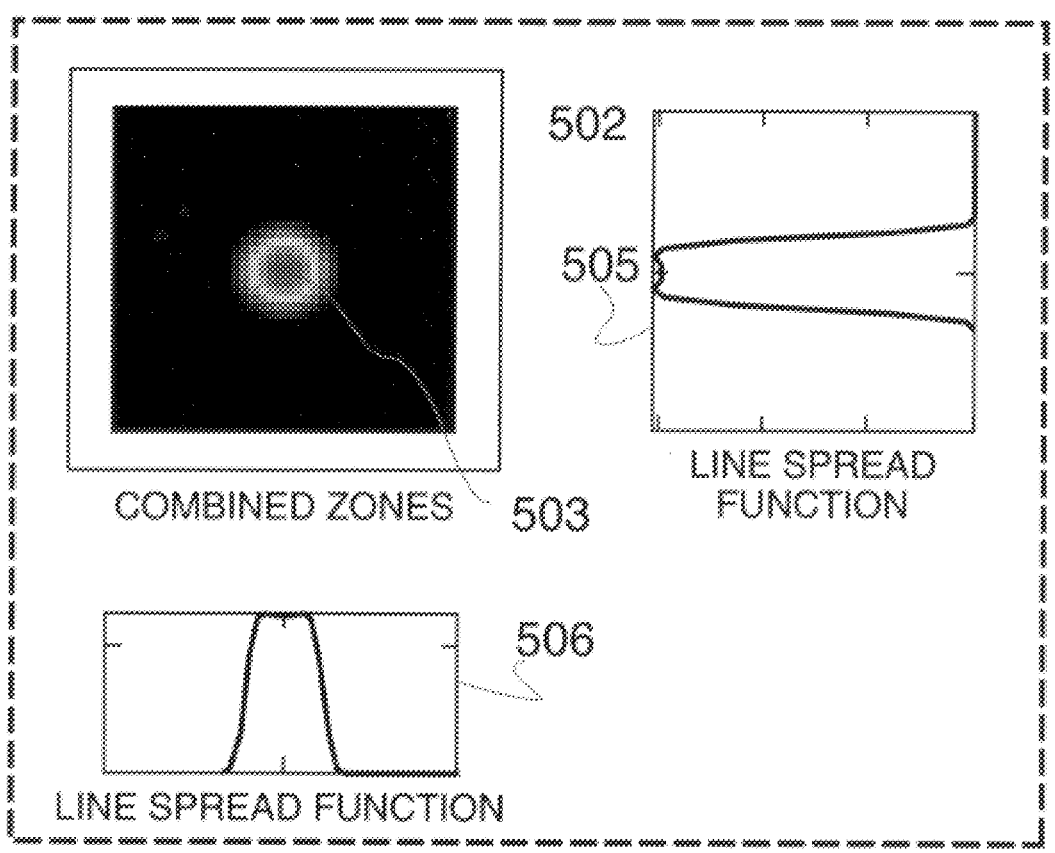

FIGS. 27A–27C illustrate point spread functions in between the focus of both zones. FIG. 27B is a diagram of an image 500 created by the center zone 452, while FIG. 27A is a diagram of an image 501 created by a ring zone 454, assuming differing focal lengths. FIG. 27C is a diagram of a combined image 502 created from both the two zones 452, 454, while in between the focus of both. It may be noted that, while there is a "dip" 503 or dead spot in the center of the combined image 502, the line spread functions 505, 506 are relatively free of the effect of this dip 503.

FIGS. 28A–28C illustrate point spread functions when the ring zone 454 is in focus. FIG. 28B is a diagram of an image 510 created by the center zone 452, while FIG. 28A is a diagram of an image 511 created by a ring zone 454, assuming differing focal lengths. FIG. 28C is a diagram of a combined image 512 created from both the two zones 452, 454. The combined image 512 of FIG. 28C is very similar to that of FIG. 26C, wherein only the center zone 452 was in focus. The line spread functions 515, 516 in FIG. 28C, however, show the effect of the out-of-focus center zone 452.

Figure 29A:
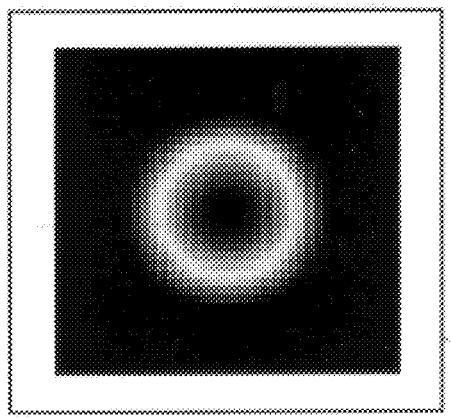
Figure 29B:
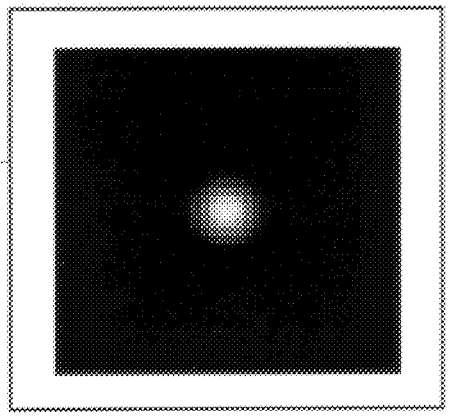
Figure 29C:
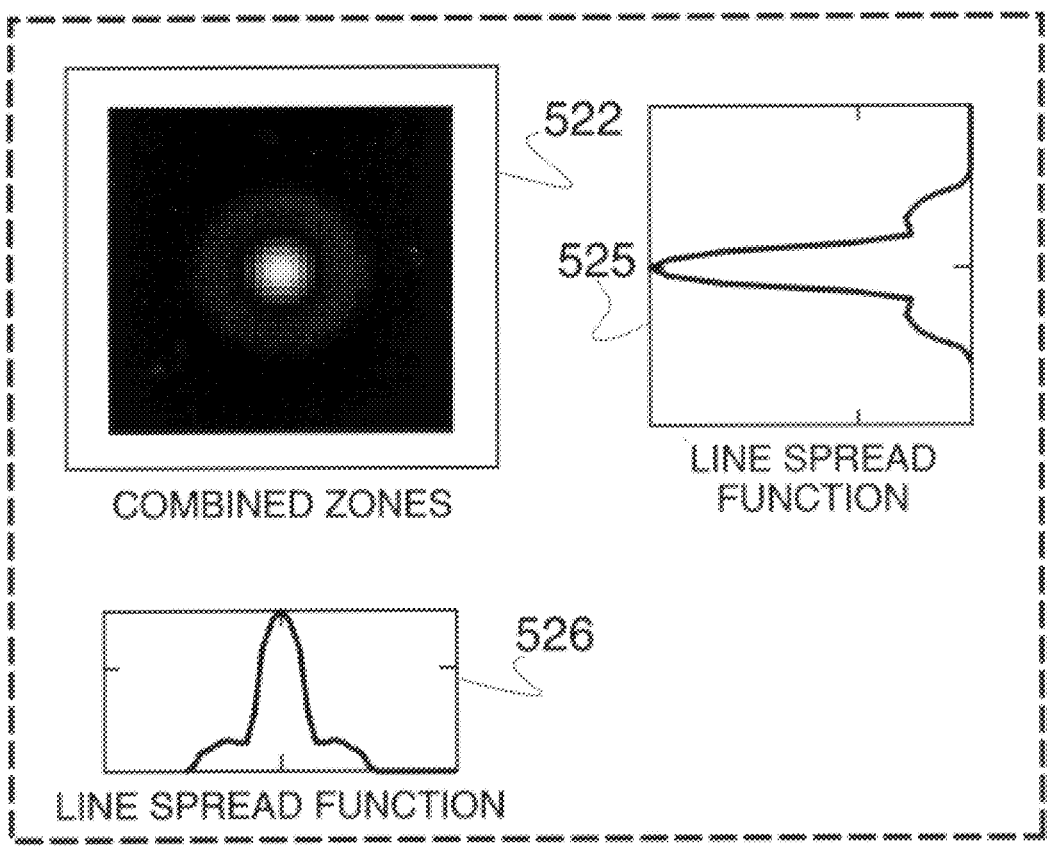

FIGS. 29A–29C illustrate a more severe effect, wherein a ring zone 454 is not blurred enough with respect to the center zone 452. The result is an image 522 having a ring structure. FIG. 29B is a diagram of an image 520 created by the center zone 452, while FIG. 29A is a diagram of an image 521 created by the ring zone 454. FIG. 29C is a diagram of a combined image 522 created from both the two zones 452, 454 contains the ring structure, as mentioned, which appears as diffuse light in a ring pattern around the center focal point. The line spread functions 525, 526 indicate the effect of this ring structure. The ring structure may cause excessive inter-symbol interference (ISI) when attempting to read bar codes.

Figure 30A:
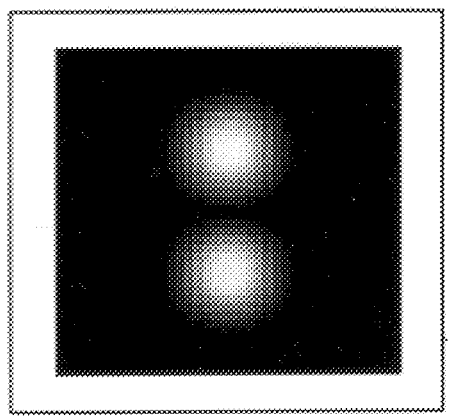
Figure 30B:
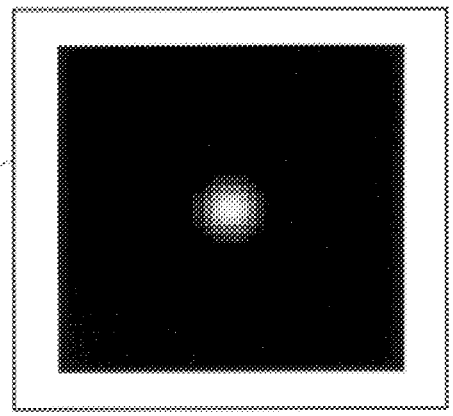
Figure 30C:
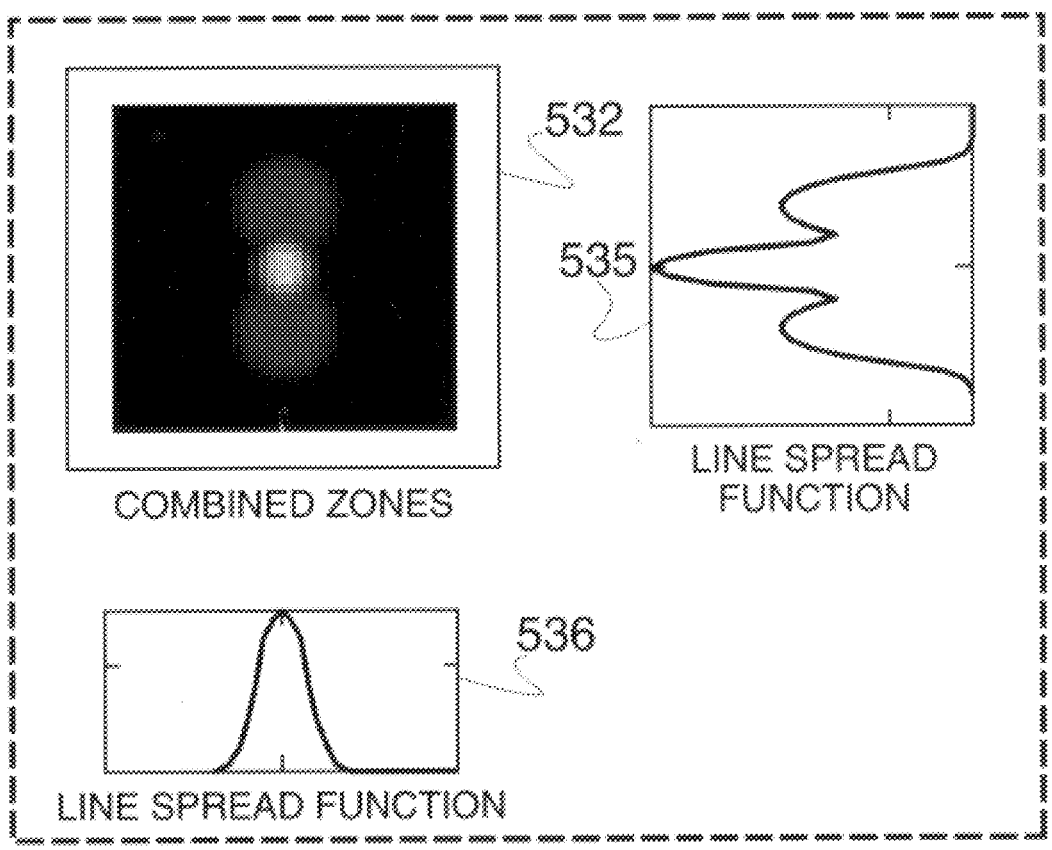

Because of the ISI that may be caused by a ring zone such as shown in FIG. 29C, an apertured ring zone (a sector) is preferred for reading bar codes. FIGS. 30A–30C are diagrams of images created under the same conditions as FIGS. 29A–29C, but for a system where the ringed zone is apertured with two circular apertures. FIG. 30B is a diagram of an image 530 created by the center zone 452, while FIG. 30A is a diagram of an image 531 created by the apertured ring zone 454. FIG. 30C is a diagram of a combined image 532 created from both the two zones 452, 454. The use of two circular apertures as shown in the horizontal line spread function 536 of FIG. 30C successfully removes the side lobes in the horizontal pattern. This form of aperturing can thus be used to read bar codes whose bars are vertically oriented without creating an undue amount of inter-symbol interference from the multi-focus lens.

FIG. 31A–31C are diagrams illustrating a particular apertured multi-zone lens configuration providing a line spread function similar to that in FIG. 30C. In FIGS. 31A–31C, a symmetric multi-focus lens 601 is shown from several viewpoints with a plurality of apertures 602, one aperture 602 located in front of each one of a plurality of zones 603 the lens 601. While FIG. 30C shows an image resulting from two circular apertures, the apertured multi-focus lens 601 of FIGS. 31A–31C provides a plurality of images from the multiple ring zones and a corresponding plurality of peaks in the vertical line spread function 535. However, the apertured multi-focus lens 601 of FIGS. 31A–31C would, like the configuration of FIG. 30C, also have a horizontal line spread function 536 relatively free from intersymbol interference.

It is preferable for each of the apertured zones 603 to have a different focal length. This may be achieved in at least two different ways. In a first technique, a symmetric lens 610 is physically cut immediately below the center zone 611, as shown in FIG. 32. The cut lens 612 will have the characteristics of an asymmetric multi-focus lens. In a second technique, the lens 620 may be molded in an asymmetric fashion, as shown in FIG. 33, such that the lower portions 621 of each ring zone have a different focal length than the upper portions 622 of each ring zone. An advantage of the latter technique is that the lens could be constructed so as to have its optical axis 625 in the center of the lens 620, as shown in FIG. 33.

Figure 34A:
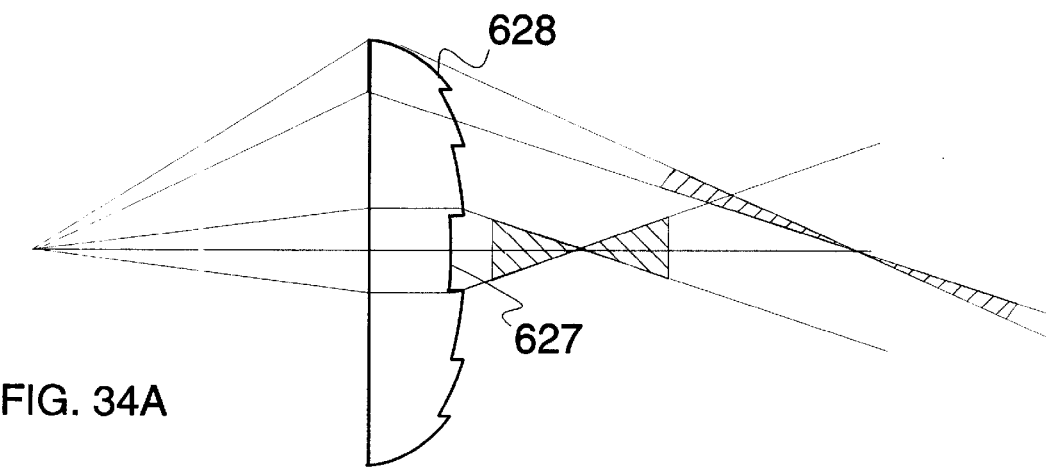
FIGS. 34A is a diagram showing off-axis tilt when the center zone focuses to the closest depth and the outside ring zone focuses to the farthest depth.
Figure 34B:
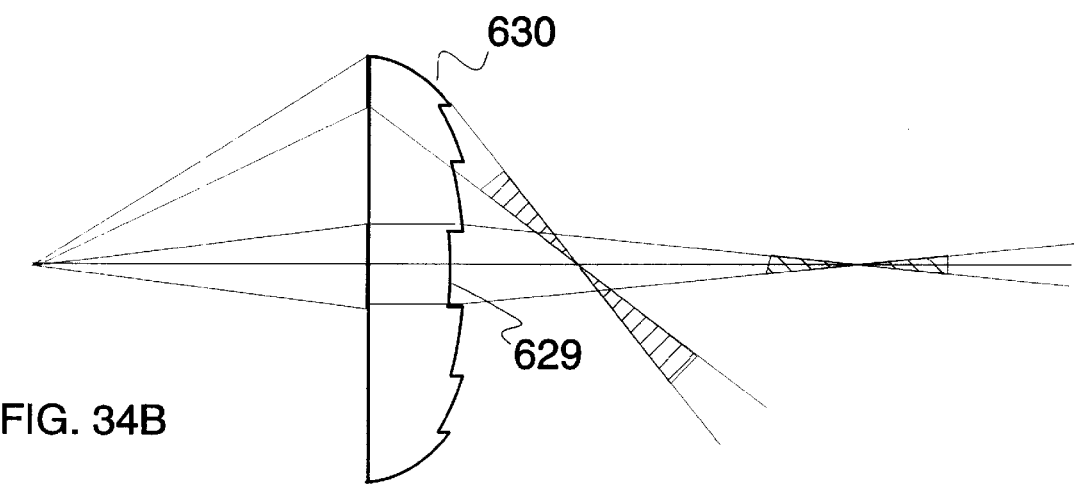
FIG. 34B is a diagram showing the reverse situation.

For the above asymmetric lens configurations, the off-axis tilt is typically smallest when the center zone 627 focuses to the closest depth and the outside ring zone 628 focuses to the farthest depth, as shown in FIG. 34A. FIG. 34B illustrates the reverse situation, which may lead to greater pointing problems.

Another method for constructing a multi-focus lens having the desired properties is to combine a plurality of individual lenses, one for each zone. Each individual lens has an off-center circular aperture and is optimized for the desired focus condition of the corresponding zone. Each lens zone in turn is optimized. The final lens essentially comprises a piecewise continuous combination of each individual lens zone.

It may, on the other hand, be possible to make a multi-focus lens with just one continuous lens curvature. In such a case, the lens can be optimized in at least two ways. First, a global merit function can be made that takes into account the focal properties of each zone. The entire aspheric deformation coefficients can then be solved at once. The second method is to allow each zone a few deformation coefficients, giving the center zone the lowest order coefficients and the edge zone the highest order coefficients. The system is optimized in order, from the center zone to the edge. This method involves an iterative process, as the edge zones may need to cause slight modifications to the lower order coefficients so as to minimize aberrations.

Several particular optical structures are discussed below, many or all of which exemplify the advantages of poly-optic design thus far described.

Figure 35A:
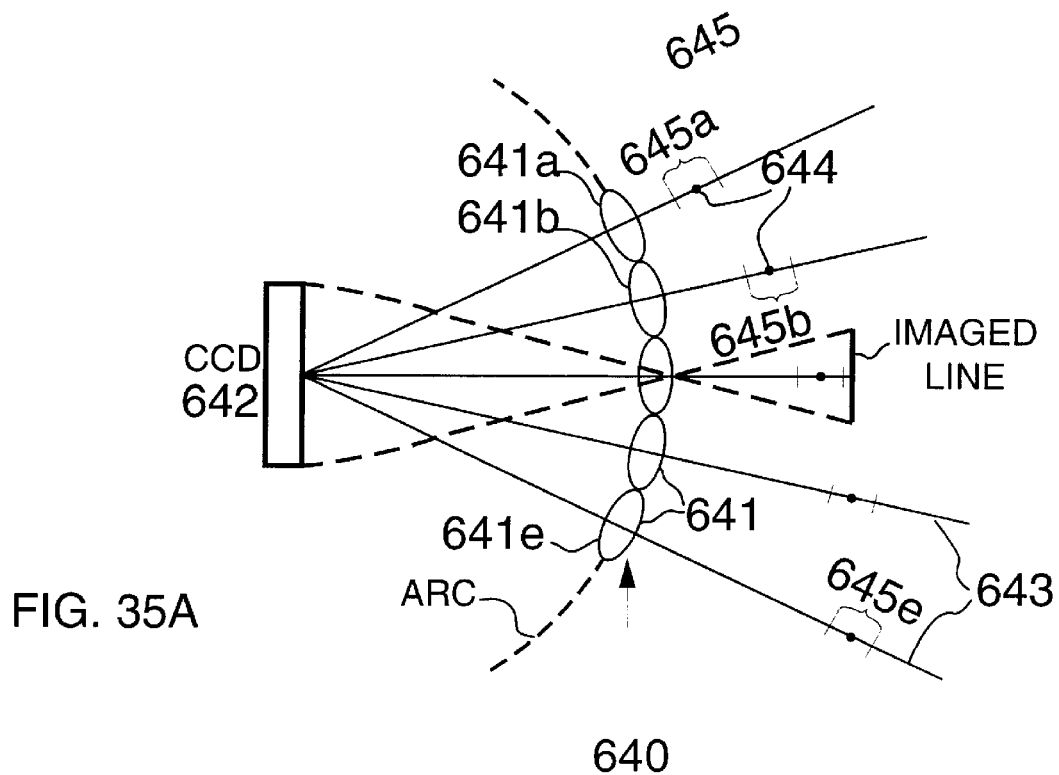
FIGS. 35A and 35B are diagrams showing different embodiments of a lens system having an array of lenses arranged in a pattern around an imaging device.

One particular optical lens structure is shown in FIG. 35A. In FIG. 35A, which is drawn from a top view, an array 640 of single-focus lenses 641 are arranged in an arc-like pattern around an imager (e.g., a CCD detector 642). Each lens 641 is a slightly different distance away from the CCD detector 642, so the pattern formed by the lens array is not a perfect arc. Alternatively, a set of different focal length lenses could be aligned in an arc to achieve the same result. The centers of the scan lines 643 associated with each of the lenses 641 fan out in a radial fashion from the CCD detector 642. The focal points 644 of the lenses 641 are staggered, so that the top lens 641a has the closest field depth 645a, the next lens 641b has the next closest field depth 645b, and so on, until the last lens 641e which has the farthest depth of field 645e.

An advantage of the optical structure shown in FIG. 35A is that the structure may provide for a seamless depth of field without using shutters, so long as the lenses 641 are arranged so as not to cause interference with one another. Another advantage is that the structure mitigates the effect of coma, due to the radial fanning of the centers of the scan lines 643.

Figure 35B:
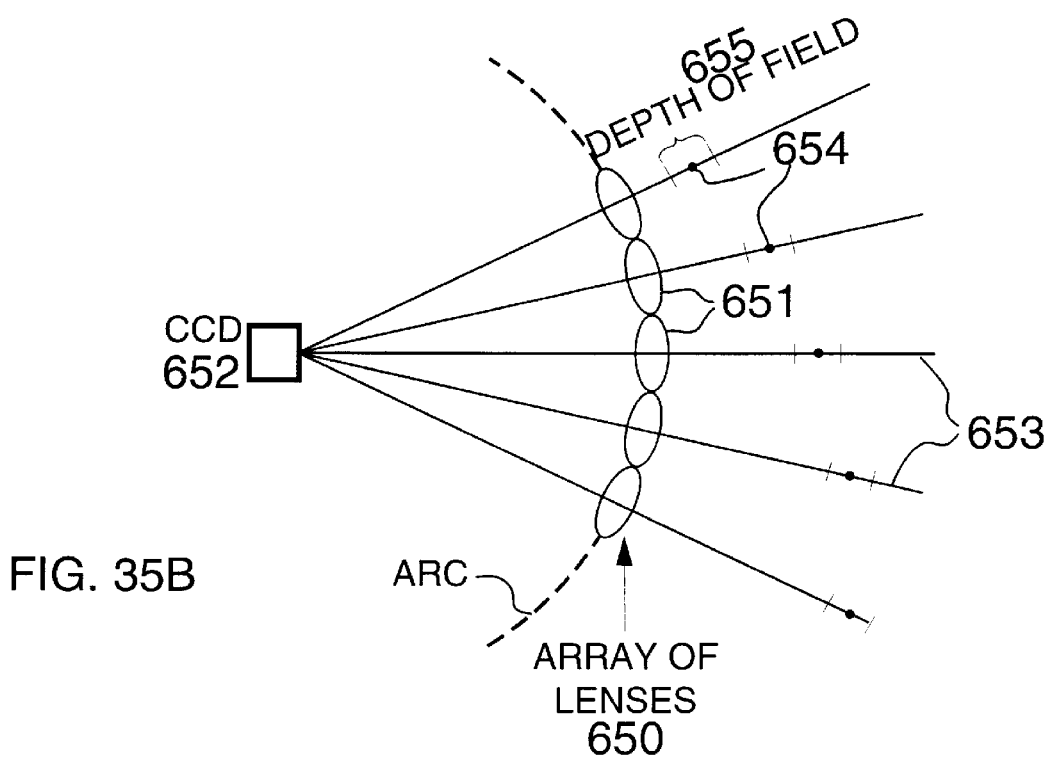

A related embodiment of an optical structure is shown in FIG. 35B. The FIG. 35B structure is similar to the FIG. 35A structure, except that the FIG. 35B embodiment is shown from a side view instead of a top view, so that the array 650 of lenses 651 expands the depth of field vertically rather than horizontally. The FIG. 35B structure has similar properties of an arc-like pattern of lenses 651, radially fanning scan lines 653, staggered depth of fields 655, and a corresponding mitigation of the effect of coma and aggregate expansion of depth of field for the system.

Figure 36A:
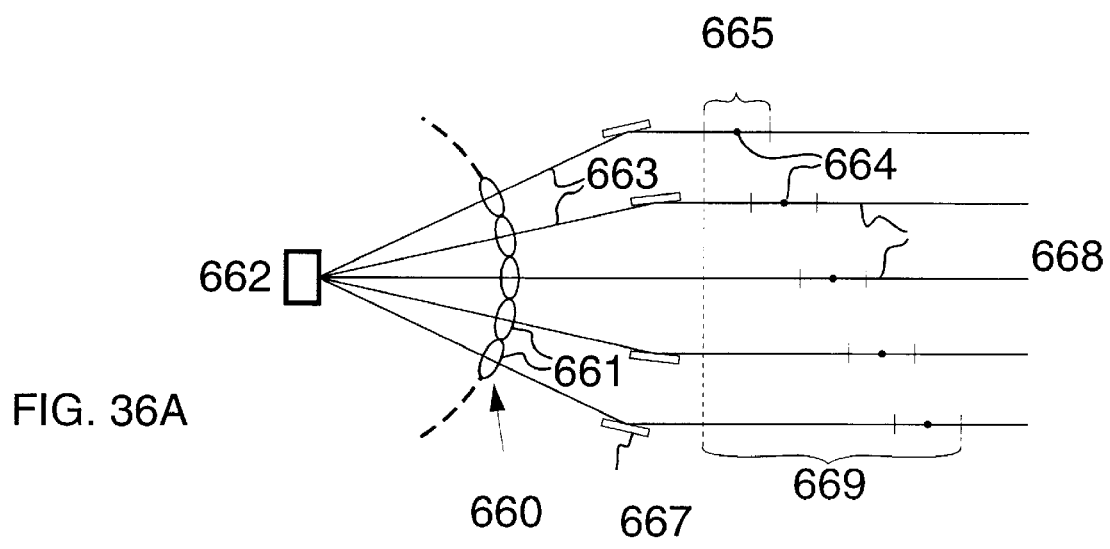
FIGS. 36A–36C are diagrams of various embodiments of a lens system for planar coverage having an array of lenses arranged in a pattern around an imaging device.

Another embodiment of an optical structure is shown in FIG. 36A, which is a modification of the system of FIG. 35B. Like FIG. 35B, the FIG. 36A embodiment depicts an array 660 of lenses 661 arranged in an arc-like pattern around a CCD detector 662. Scan lines 663 fan out radially from the CCD detector 662. The FIG. 36A embodiment further adds a set of mirrors 667 arranged to form the radial scan lines 663 into a collimated set of scan lines 668. The individual depths of field 665 are staggered for each lens 661 along the collimated scan lines 668. A composite depth of field 669 is shown adjacent to the collimated scan lines 668.

Figure 36B:
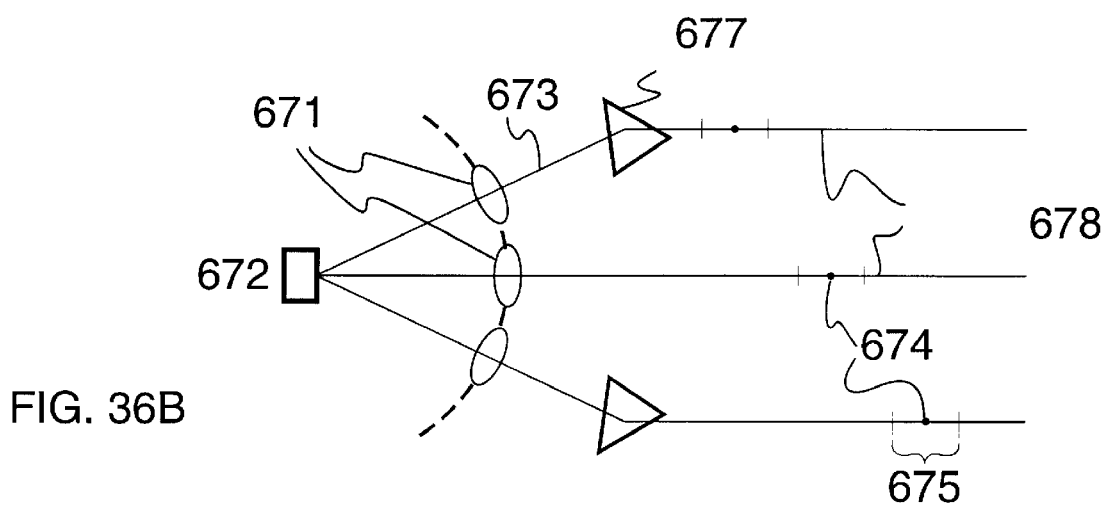
Figure 36C:
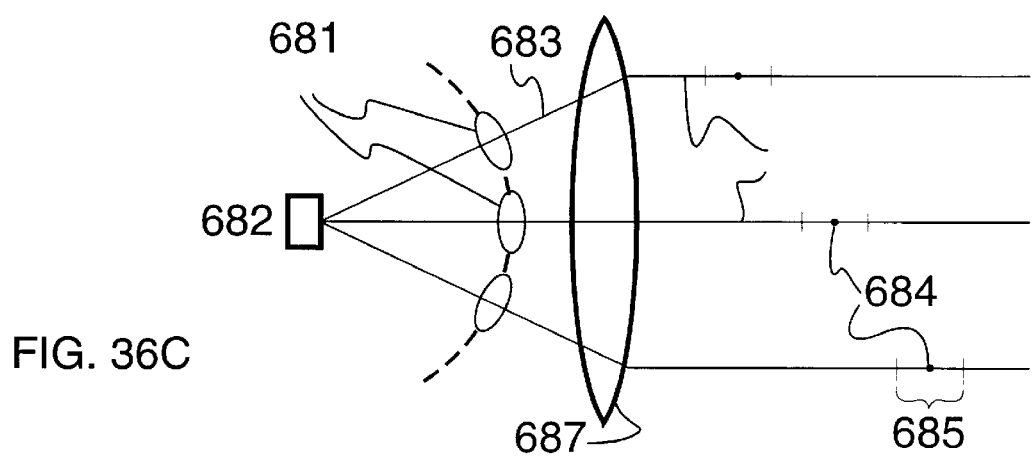

An advantage of the FIG. 36A embodiment is that it provides a more dense coverage of a plane. In place of mirrors 667, prisms or light-directing lenses may be used instead, or any combination of mirrors, prisms and/or light directing lenses. FIG. 36B shows the FIG. 36A embodiment implemented using prisms 677 instead of mirrors. FIG. 36C shows the FIG. 36A embodiment implemented using a single collimating lens 687 to perform a similar function.

Figure 37A:
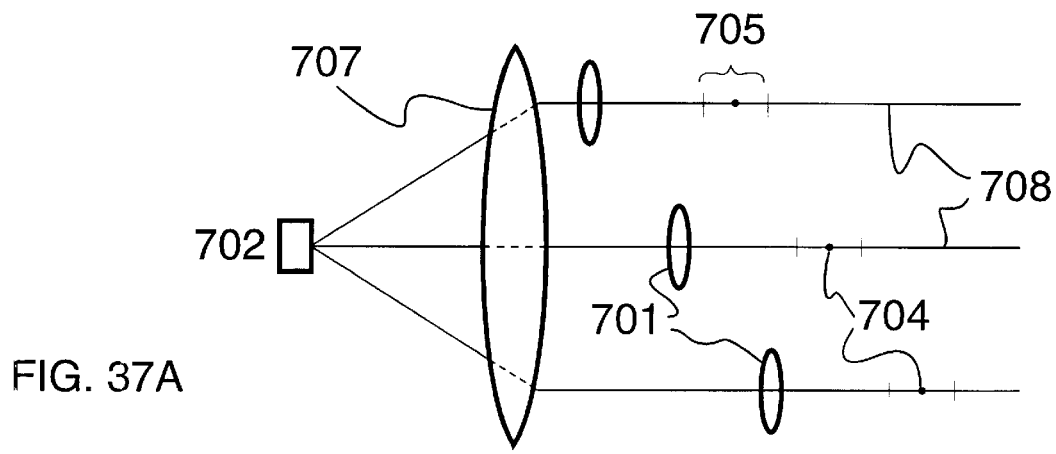
FIGS. 37A–37C are diagrams showing other embodiments of a lens system for planar coverage having an array of lenses arranged in a pattern around an imaging device and including a collimating lens.

Another embodiment of an optical structure is shown in FIG. 37A. The FIG. 37A structure is similar to that of FIG. 36C, but reverses positions of the large single lens 707 and the array of lenses 701. A large single collimating lens 707 is located in front of an imager (e.g., a CCD detector 702). A plurality of smaller lenses 701 are positioned in front of the larger lens 707, and are staggered slightly in distance from the larger lens 707. Scan lines 708 from the smaller lenses 701 are directed in a collimated pattern to provide dense coverage of a plane. The scan lines 708 are directed by the larger lens 707 to the CCD detector 702. Each of the smaller lenses 701 has a different depth of field 705, so that a larger composite depth of field is created.

Figure 37B:
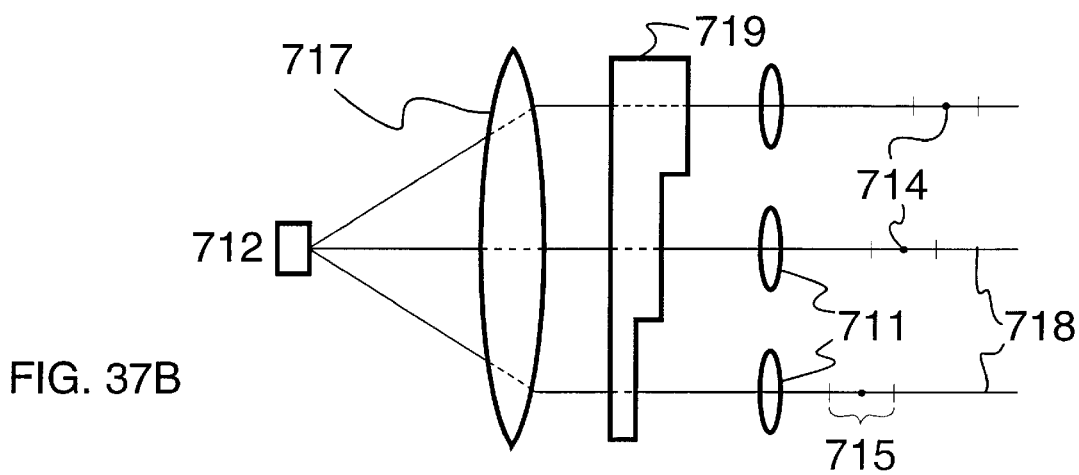

Another embodiment of an optical structure is shown in FIG. 37B. The structure of FIG. 37B is conceptually similar to that of FIG. 37A. FIG. 37B, like the structure of FIG. 37A, comprises a large collimating lens 717, convex in shape, positioned in front of a CCD detector 712. The FIG. 37B structure also comprises an array of smaller lenses 711. Rather than staggering the distance of the smaller lenses 711 from the larger lens 717, however, in FIG. 37B is added a set of staggered optical flats 719 positioned between the larger lens 717 and the array of smaller lenses 711. The staggered optical flats 719 shift the focal point of the smaller lenses 711 and provide staggered of depths of field 715 along the collimated scan lines 718 associated with the array of lenses 711.

An advantage of the FIG. 37B system is that the smaller lenses 711 need not be staggered, and therefore may facilitate manufacture of the optical system.

Figure 37C:
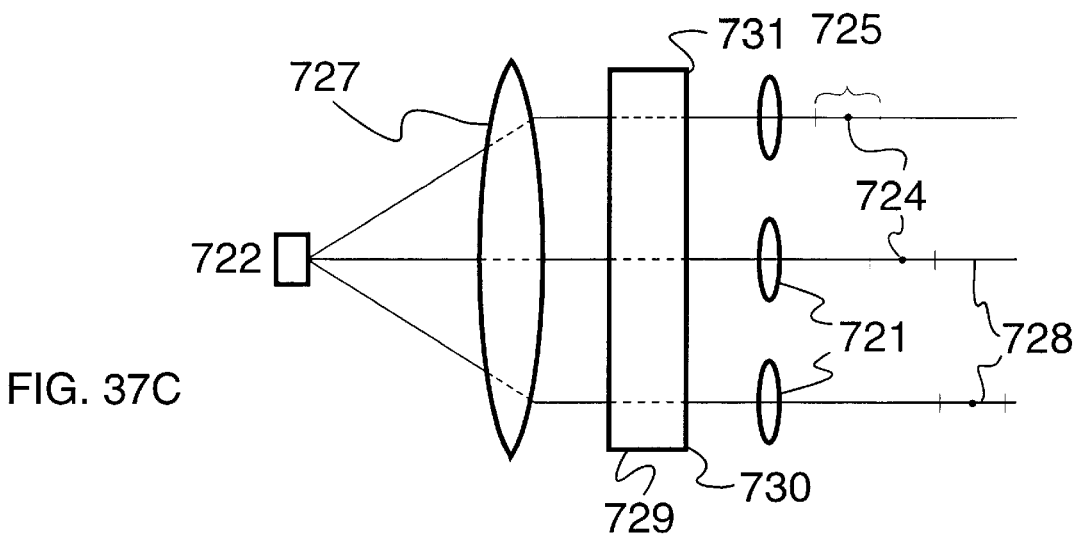

Another embodiment of an optical structure is shown in FIG. 37C. The structure of FIG. 37C is similar to that of FIG. 37B, except that a graded index element (also called a "GRIN" element) 729 is used in place of the staggered optical flats 719. An array of smaller lenses 721, as in FIG. 37B, is non-staggered. The smaller lenses 721 are positioned in front of the GRIN element 729, which is positioned in front of a large collimating lens 727 set before the CCD detector 722. Scan lines 728 form a collimated pattern, providing dense coverage of a plane. The GRIN element 729 is formed of a material having a graded index, so that the path length differs along its axis. Thus, towards one end 730 of the GRIN element 729, the path is long, while towards the other end 731 of the GRIN element 729, the path is short. Accordingly, the field depths 725 are staggered along the collimated scan lines 728, as shown.

FIG. 38A shows another embodiment of an optical structure. The FIG. 38A structure is similar to that of FIG. 37B, except that some of the individual elements of FIG. 37B have been incorporated into a single element. A poly-optic lens 751 incorporates aspects of the large collimating lens 717, the staggered optical flats 719, and the array of smaller lenses 711 shown in FIG. 37B into a single structure. The back portion 753 of the poly-optic lens 751 is curved in the shape of the collimating lens 717 of FIG. 37B. The array of smaller lenses 711 from FIG. 37B appear as individual lens elements 752 in FIG. 38A. The individual lens elements 752 are staggered, so that varying amounts of optical material are located between each individual lens element 752 and the collimated lens backing 753. This varying amount of optical material acts in a fashion similar to the staggered optical flats 719 of FIG. 37B, thereby providing for differing focal lengths and staggered field depths 755 along collimated scan lines 758. The poly-optic lens 751 of FIG. 38A therefore has a composite depth of field similar to that of FIG. 37B.

Another embodiment of an optical structure is shown in FIG. 38B. The FIG. 38B structure is similar to that of FIG. 37C, except that some of the individual elements of FIG. 37C have been incorporated into a single element. A poly-optic lens 761 incorporates aspects of the large collimating lens 727, the GRIN element 729, and the array of smaller lenses 721 shown in FIG. 37C into a single structure. The back portion of the poly-optic lens 761 is curved in the shape of the collimating lens 727 of FIG. 37C. The array of smaller lenses 721 from FIG. 37C appear as individual lens elements 762 in FIG. 38B. A GRIN element 764 is embedded between the individual lens elements 762 and the collimated lens backing 763, thereby providing for differing focal lengths and staggered field depths 765 along collimated scan lines 768. The poly-optic lens 761 of FIG. 38B therefore has a composite depth of field similar to that of FIG. 37C.

While FIGS. 36A through 39B are shown from a side view of the CCD detector, the CCD detector may also be rotated 90 degrees so that the lenses or other light collection elements are horizontally rather than vertically stacked, and so that the photodiodes receive the collected light in a manner similar to that shown in FIG. 35A. In general, horizontal stacking results in greater light collection, but vertical stacking results in less interference between lenses or lens elements.

FIGS. 39A and 39B are alternative embodiments of optical structures using curved mirrors or similar elements. The optical system of FIG. 39A comprises an array of curved mirrors 790 positioned in a diagonal line 791 at an angle θ with respect to a CCD detector 792. The array of curved mirrors with different focal lengths or different optical path lengths provide staggered field depths 793 along collimated scan lines 794 as shown. The structure of FIG. 39A minimizes the effects of chromatic aberration.

FIG. 39B shows a similar optical structure to FIG. 39A, but utilizes a single multi-faceted curved surface 796 rather than array of curved mirrors 790. The single multi-faceted curved surface 796 is positioned at a diagonal angle with respect to the CCD detector 792, and thereby provides staggered field depths 797 in a manner similar to the FIG. 39A structure along collimated scan lines 798 as shown. The FIG. 39B structure also minimizes the effects of chromatic aberration.

Another embodiment of a poly-optic lens system is shown in FIGS. 40A–40D. FIG. 40A is a diagram of a side view of a poly-optic lens 780 positioned in front of a CCD detector 782. As shown, light from a distant point is collected by the poly-optic lens 780 and focused on the CCD detector 782.

FIG. 40B is a diagram showing a top view of the same poly-optic system. Light from distant points on each of the collimated scan lines is collected by each individual lens element 783, and focused on the CCD detector 782. Preferably, each of the lens elements 783 has a different focal length. FIG. 40C is a diagram showing a top view of the same poly-optic system of FIG. 40B, but shows a target scan line 784 for several of the individual lens elements 783. Light reflected from a target scan line 784 passes through an axial point 785 in an individual lens element 783, as shown, and is projected onto the CCD detector 782. The target scan line 784 for each individual lens element 783 is slightly offset from the other target scan lines 784, due to the relative positions of the lens elements 783. FIG. 40D shows an oblique view of the same target scan line capture as FIG. 40C.

Figure 41A:
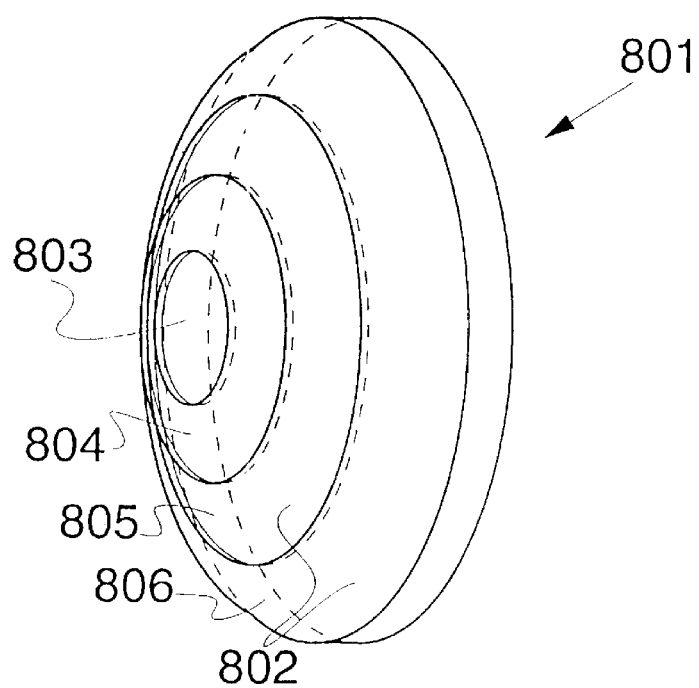
FIGS. 41A–41C are diagrams of a preferred poly-optic lens.
Figure 41B:
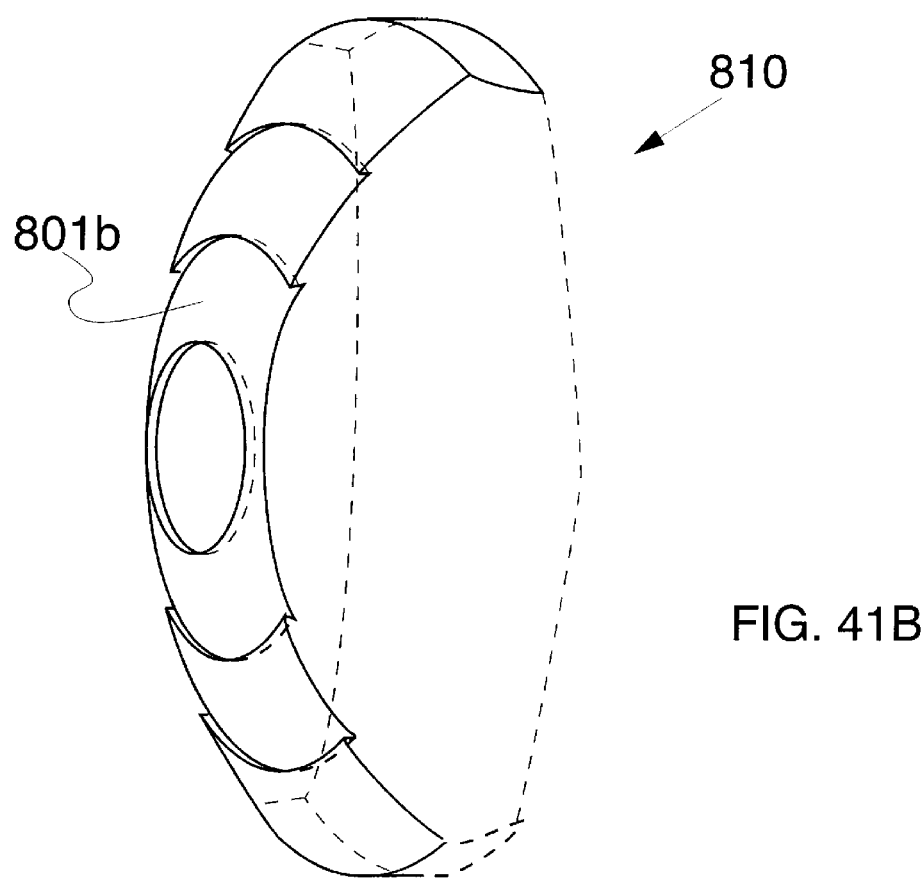
Figure 41C:
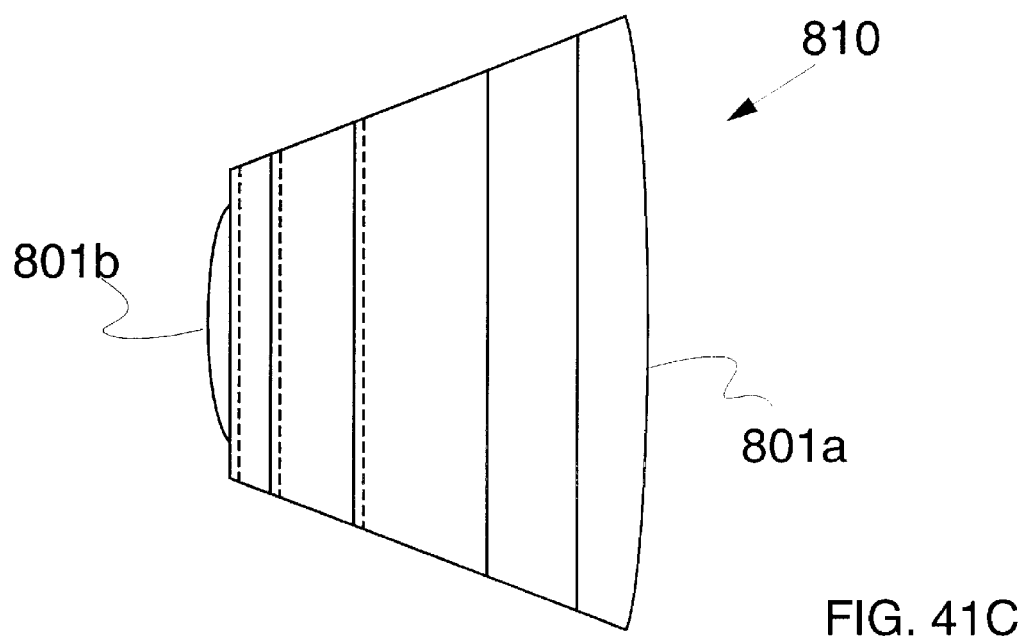

A preferred multi-focal lens is depicted in FIGS. 41A–41C. An oblique view of a preferred unapertured lens 801 is shown in FIG. 41A. The lens 801 may be circularly symmetric, as shown. The back surface of the lens 801 is preferably spherical, while the front surface has four different aspheric curvatures as described below. The lens 801 of FIG. 41A may be apertured with an opaque mask. The lens can also be apertured by cutting the lens 801 to obtain a cut-away lens 810, as shown in FIGS. 41B and 41C. FIG. 41B shows an oblique view of the cut-away lens 810, while the same cut-away portion is shown from a top view in FIG. 41C. The cut-away angle is selected so as to preferably allow for a 45-degree field angle.

The lens 801 comprises four zones 802, including a center zone 803 (Zone 1) and three outer ring-shaped zones 804, 805 and 806 (Zones 2 through 4, respectively). Zone 1 is preferably 0.426 inches wide, while Zones 2 through 4 are preferably 0.213 inches wide. The base radius (i.e., radius of the back spherical portion of the lens) is preferably 84.967 millimeters. The distance from the lens 801 to an imager (such as a CCD detector) is preferably 34.85272 millimeters. Preferred focus distances appear in Table 41-1.

TABLE 41-1

| Zone | Focus Distance (mm) |
|---|---|
| 1 | 48.3 |
| 2 | 76.2 |
| 3 | 122.0 |
| 4 | 191.0 |

The material of the lens 801 preferably comprises a plastic such as polystyrene, with an index of refraction of 1.59453059. Following are preferred dimensions and other characteristics according to lens zone 802.

| Zone 1: | |
|---|---|
| Effective Focal Length | 23.4508 mm |
| Base Radius | 16.80842 mm |
| Conic | −0.8092686 |
| Aspheric Coefficients | |
| $r^2$ | $2.57577 \times 10^{-3}$ |
| $r^4$ | $-1.923724 \times 10^{-5}$ |
| $r^6$ | $5.448919 \times 10^{-7}$ |
| $r^8$ | $-1.765304 \times 10^{-8}$ |
| $r^{10}$ | $-2.931042 \times 10^{-10}$ |
| $r^{12}$ | $-5.210294 \times 10^{-13}$ |
| $r^{14}$ | $1.652903 \times 10^{-13}$ |
| $r^{16}$ | $8.778694 \times 10^{-15}$ |

| Zone 2: | |
|---|---|
| Effective Focal Length | 28.087 mm |
| Base Radius | 19.64043 mm |
| Conic | −1.212117 |
| Aspheric Coefficients | |
| $r^2$ | $4.823852 \times 10^{-4}$ |
| $r^4$ | $-4.101818 \times 10^{-7}$ |
| $r^6$ | $3.891872 \times 10^{-9}$ |
| $r^8$ | $-1.945451 \times 10^{-11}$ |
| $r^{10}$ | $-5.040134 \times 10^{-14}$ |
| $r^{12}$ | $-6.846745 \times 10^{-17}$ |
| $r^{14}$ | $4.655883 \times 10^{-19}$ |
| $r^{16}$ | $7.854166 \times 10^{-21}$ |

| Zone 3: | |
|---|---|
| Effective Focal Length | 32.0515 mm |
| Base Radius | 26.37444 mm |
| Conic | 0.1965319 |
| Aspheric Coefficients | |
| $r^2$ | $2.988976 \times 10^{-3}$ |
| $r^4$ | $-1.127446 \times 10^{-5}$ |
| $r^6$ | $-5.863206 \times 10^{-9}$ |
| $r^8$ | $8.905697 \times 10^{-13}$ |
| $r^{10}$ | $-1.472282 \times 10^{-14}$ |
| $r^{12}$ | $-7.391061 \times 10^{-17}$ |

| Zone 4: | |
|---|---|
| Effective Focal Length | 35.2546 mm |
| Base Radius | 27.69962 mm |
| Conic | 0.1344306 |
| Aspheric Coefficients | |
| $r^2$ | $1.1298197 \times 10^{-3}$ |
| $r^4$ | $-8.30275 \times 10^{-6}$ |
| $r^6$ | $-4.769432 \times 10^{-9}$ |
| $r^8$ | $-6.74277 \times 10^{-12}$ |
| $r^{10}$ | $-1.675321 \times 10^{-15}$ |
| $r^{12}$ | $-1.827999 \times 10^{-17}$ |
| $r^{14}$ | $-4.208912 \times 10^{-21}$ |

A preferred aperture width is 0.043 inches.

Figure 42A:
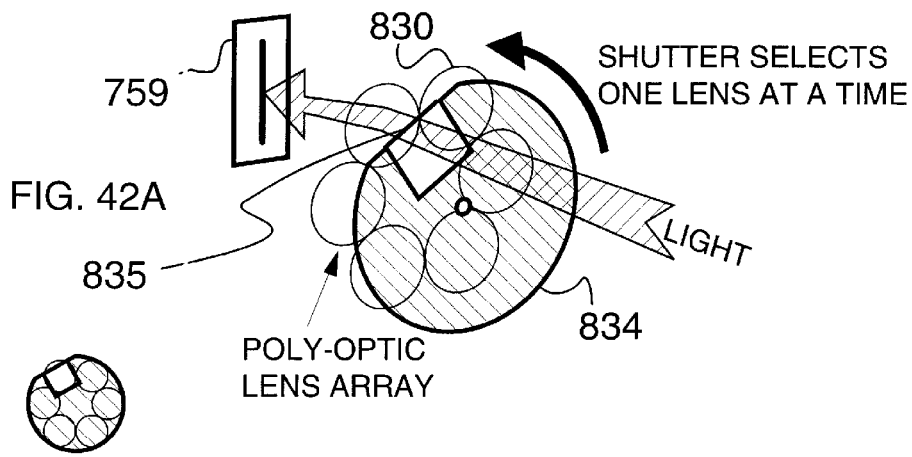
FIGS. 42A–42C are diagrams of other embodiments of optical systems using shutters to reduce inter-zonal interference.
Figure 42B:
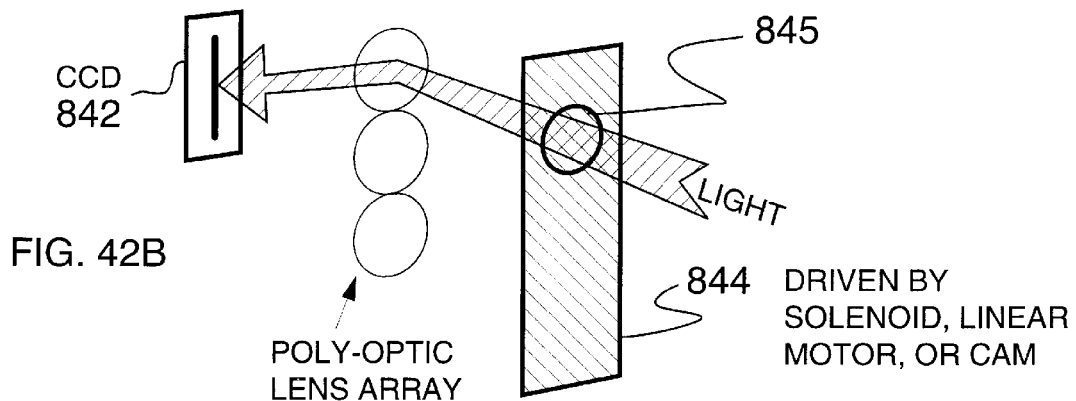
Figure 42C:
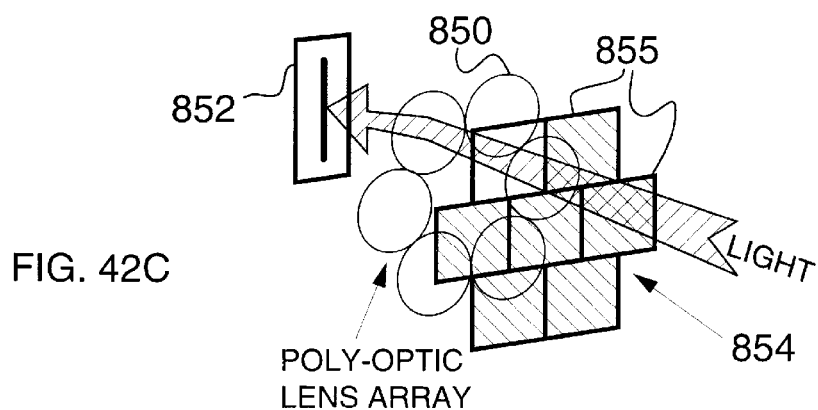

FIGS. 42A–42C are alternative embodiments of optical structures using shutters to reduce or eliminate inter-zonal interference. These embodiments use either mechanical or electro-optic shutters so that only one (or several) lenses are active simultaneously.

FIG. 42A shows an arrangement of lenses 830 in a circular pattern, forming a poly-optic array. The lenses 830 are positioned in front of a CCD detector 832. A mechanical shutter 834 is positioned in front of the lens array 830. The shutter 834 may be rotated mechanically around a motor shaft (not shown). The shutter 834 has an opening 835 (or aperture) which revolves in a circular fashion in response to a motive force applied to the motor shaft. In operation, the shutter 834 screens out all of the lenses 830 except one lens 830 (or several lenses 830, if desired) which collects light through the opening 835 in the shutter 834. The shutter 834 is rotated so that the opening 835 unscreens each lens 830 (or group of lenses 830) sequentially in the circular array. In this manner, the lenses 830 are prevented from interfering with one another.

FIG. 42B is a diagram of an alternate embodiment employing a shutter mechanism. In FIG. 42B, a poly-optic array of lenses 840 are arranged in a linear fashion. The lenses 840 are positioned in front of a CCD detector 842. A rectangular or other appropriately shaped shutter 844 is positioned in front of the array of lenses 840. The shutter 844 has an opening 845 (i.e., aperture) enabling a single lens 840 (or several lenses 840, if desired) to operate at a given time. The shutter 844 is movable along the axis 846 parallel to the array of lenses 840, and may be driven by a solenoid, a linear motor, or a mechanical cam (not shown). In such a manner, the position of the opening 845 may be shifted from one lens 840 to the next. In operation, the shutter 844 is driven along the axis 846 parallel to the lenses 840 so as to position the opening 845 in front of the desired lens 840 or lenses 840 in sequence. In this manner, the lenses 840 are prevented from interfering with one another.

FIG. 42C is a diagram of another embodiment employing a shuttering technique. In FIG. 42C, a poly-optic array of lenses 850 forms a circular cluster pattern as shown, or may form any other suitable pattern matched to a particular LCD shutter configuration. An LCD array 854 is positioned in front of the array of lenses 850. The lenses 850 are positioned in front of a CCD detector 852. The LCD array 854 comprises a plurality of electronically operated shutters 855. Each shutter 855 is individually responsive to an electronic shutter command from a shutter controller (not shown). The LCD shutters 855 are sequenced electronically so that one lens 850 (or several lenses 850, if desired) is operating at given time. In this manner, the lenses 850 do not interfere with one another. An advantage of the LCD array 854 is that it has no moving parts, and therefore may increase reliability.

Figure 23C:
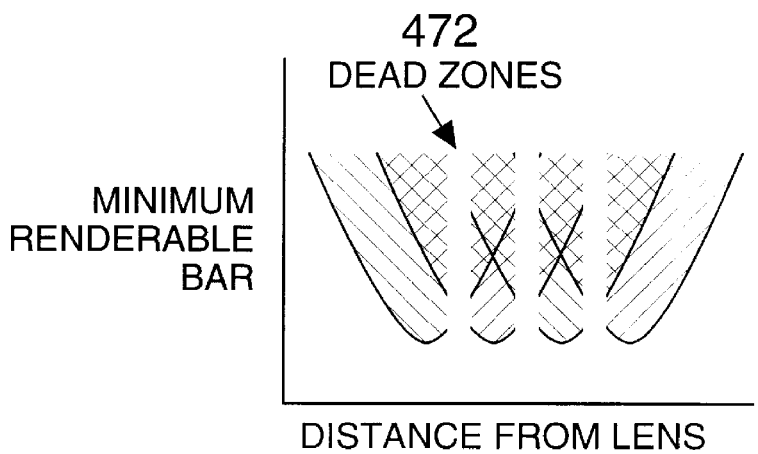

The effect of the shuttering techniques described in FIGS. 42A–42C may be explained with reference to FIGS. 23B and 23C, which, as noted previously, are graphs plotting minimum renderable bar size against distance from a lens. If all the lenses in the previously described poly-optic arrays of FIGS. 42A–42C operate simultaneously, then dead zones 472 such as shown in FIG. 23C may occur in the composite depth of field due to inter-zonal interference, such that a target image may be misidentified or missed entirely by the reading device. The shuttering techniques of FIGS. 42A–42C provide for sequential operation of the individual lenses, thereby minimizing or eliminating inter-zonal interference. The depth of field for each lens, as shown in FIG. 23B, is established separately for each individual lens. However, after sequencing through all the desired lenses using the described shuttering techniques, the composite depth of field becomes the aggregate of the individual depth of field, without the effect of inter-zonal interference. The result is a much larger effective depth of field than is possible with only a single lens, or without shuttering.

The poly-optic and shuttering lens techniques described are preferably used in conjunction with the aperturing techniques described elsewhere herein. Some of the various embodiments may be compared in speed and depth of field characteristics as follows. Use of a small, oblong aperture in connection with a single-focus increases speed over a small, round aperture, as the oblong aperture collects more light. Both the oblong aperture and the round aperture result in a relatively good depth of field. Use of a poly-optic lens configuration with large apertures results in even faster operation, but may result in a "perforated" field depth due to intra-lens or inter-lens interference. The perforation in the depth of field may be eliminated by using shutters. Use of a poly-optic lens configuration with oblong apertures results in even faster operation, and also may result in a perforated field depth. Again, shutters may be used to reduce or eliminate the perforation in the depth of field.

A CCD detector used in conjunction with some of the above lens and/or aperture configurations may be used at a small fraction of saturation (e.g., 1% of full scale) in order allow it to run faster. Running the CCD detector at less than full scale may result in a higher noise system, so correlated double sampling may be used to lower the noise level in the system. Correlated double sampling may also be beneficial where there is no self-generated illumination source being used because the incoming signal level may be reduced. Thus, by gathering enough light and operating in a low noise environment, a CCD detector may use ambient light to read images such as bar code labels.

The optical techniques described herein may be used in whole or part in conjunction with the adjustable-focus techniques described in U.S. Pats. No. 5,317,211 and 5,479,011, both of which are incorporated by reference as if fully set forth herein.

After a target image is processed through the optical front-end and captured by the CCD detector such that a CCD video output signal is produced, the CCD signal is processed in a variety of manners. The CCD output signal is used as part of an auto-exposure or adaptive exposure system for adjusting the exposure time of the CCD detector, as further described herein. The CCD output signal is also processed to determine the locations of bars and spaces and recognize bar codes or other symbols, as also discussed further herein.

Figure 43A:
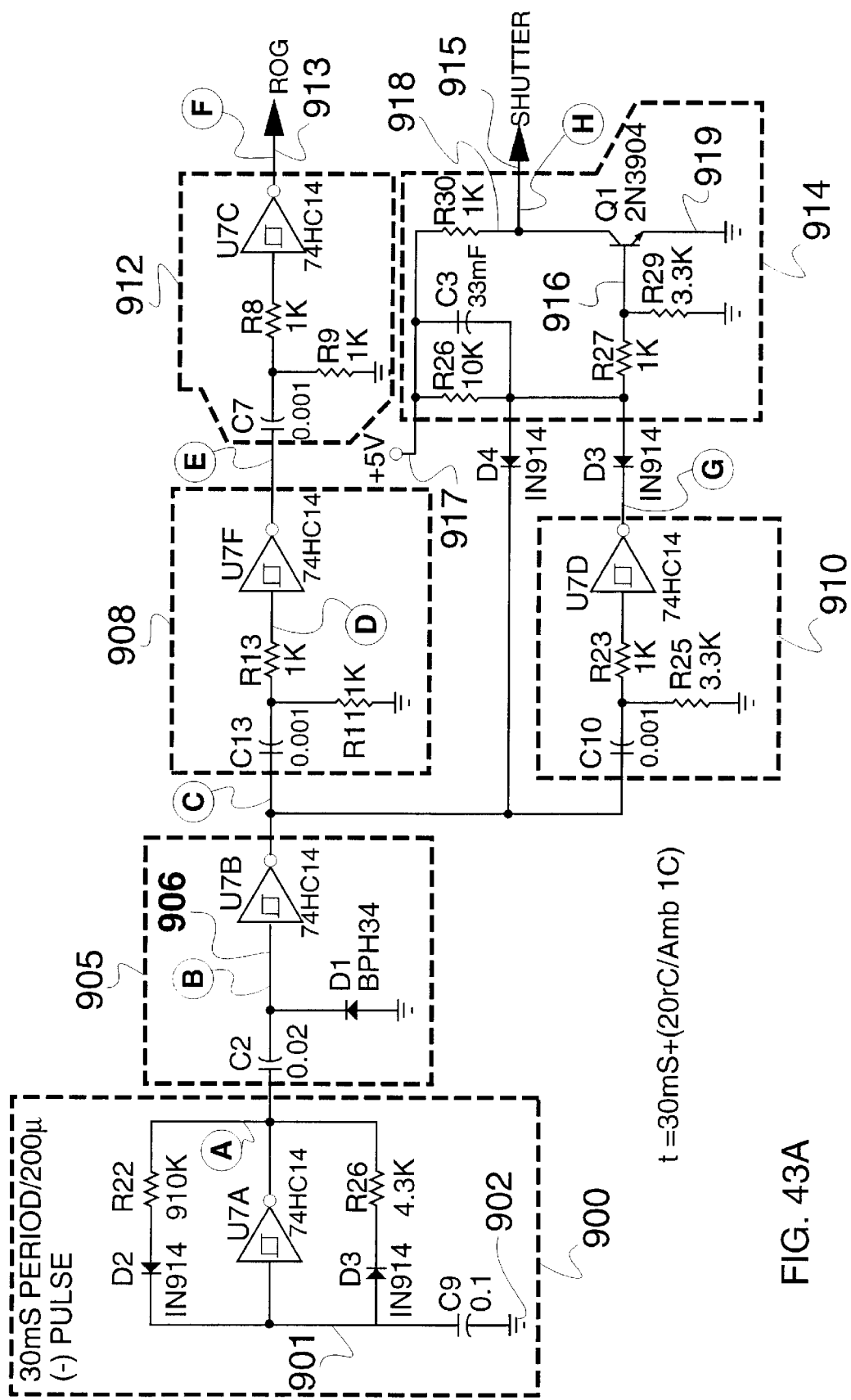
FIG. 43A is a circuit diagram of a preferred adaptive exposure circuit.
Figure 43B:
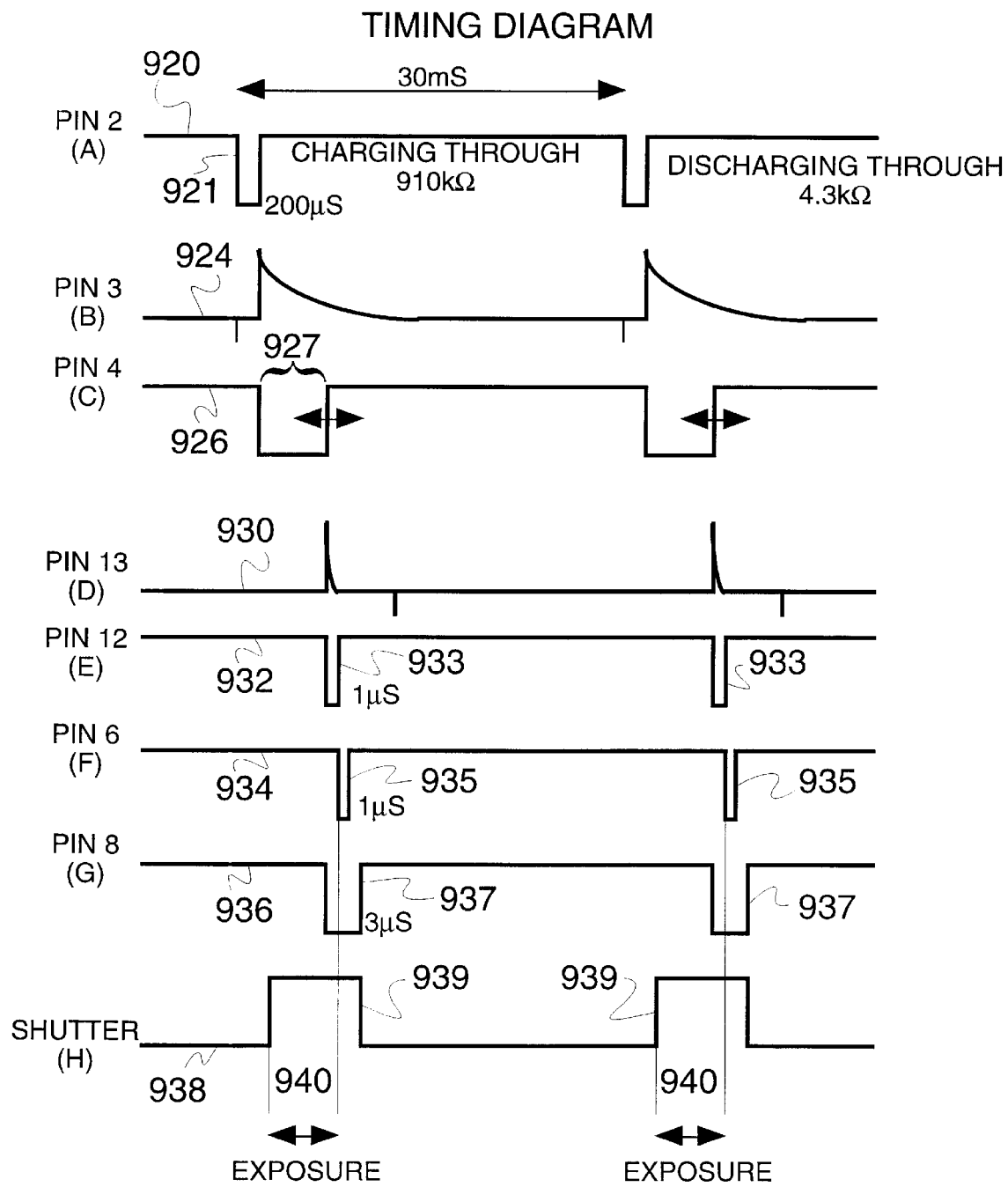
FIG. 43B is a graph of waveform patterns for the circuit of FIG. 43A.

FIG. 43A depicts one embodiment of an adaptive exposure system in accordance with one or more aspects of the present invention. FIG. 43B is a diagram of exemplary waveforms in accordance with the FIG. 43A embodiment.

In FIG. 43A, a pulse train oscillator 900 is shown comprising a Schmitt trigger U7A having an input node 901 connected through a capacitor C9 to ground 902. The input node 901 of the Schmitt trigger U7A is connected through a diode D3 and a resistor R26 positioned in series to the output node 903 of the Schmitt trigger U7A. The input node 901 is also connected to another diode D2 configured in the opposite direction of diode D3, and thereafter to a resistor R22 and then to the output node 903 of the Schmitt trigger U7A.

The output of the pulse train oscillator 900 at point A comprises a periodic waveform 920 such as shown in FIG. 43B. The periodic waveform 920 may have a period of, for example, 30 milliseconds and a 200 microsecond negative-going pulse 921. Capacitor C9 may have a capacitance of 0.1 $\mu$F, resistor R22 may have a resistance of 910 ohms, and resistor R26 may have a resistance of 4.3 k$\Omega$. The output pulse of waveform 920 is generally positive when capacitor C9 is charging through resistor R22, and is negative when the capacitor C9 discharges through resistor R26.

The pulse train oscillator 900 is connected to a monostable multivibrator 905. The monostable multivibrator 905 comprises a capacitor C2 connected to one end of a photodiode D1 as shown. The other end of the photodiode D1 is connected to ground 902. The photodiode D1 is preferably located adjacent to the CCD detector or otherwise nearby so as to be able to detect the amount of light being received from the optical system. The capacitor C2 is connected to the input node 906 of a Schmitt trigger U7B. Capacitor C2 may have a capacitance of 0.02 $\mu$F.

In operation, the pulse train oscillator 900 drives the capacitor C2 and the photodiode D1. The waveform 924 at point B and the resulting output waveform 926 from the monostable multivibrator 905 at point C are shown in FIG. 43B. The conductance of the photodiode D1 controls the output pulse width 927 of the monostable multivibrator 905, and therefore controls the duty cycle of oscillation at point C. When the photodiode Di receives a relatively large amount of light, the output waveform 926 at point C will have a relatively narrow negative pulse (e.g, almost 100% duty cycle). When the photodiode D1 receives a relatively small amount of light, the output waveform 926 will have a relatively wide negative pulse (e.g., near 0% duty cycle).

The output of the monostable multivibrator 905 is connected to two other monostable multivibrators 908 and 910. Both of monostable multivibrators 908, 910 have a similar configuration. Monostable multivibrator 908 comprises a capacitor C13 at its input. The capacitor C13 is shunted by a resistor R11 to ground, and is connected through another resistor R13 to a Schmitt trigger U7F. Capacitor C13 may have a capacitance of 0.001 $\mu$F, and each of resistors R11 and R13 may have a resistance of 1 k$\Omega$. The other monostable multivibrator 910 is configured in a similar manner with capacitor C10, resistors R23 and R25, and Schmitt trigger U7D, except that resistor R25 has a larger resistance than resistor R11, such as 3.3 k$\Omega$.

The output of monostable multivibrator 908 is connected to another monostable multivibrator 912, configured in a similar manner with capacitor C7, resistors R8 and R9, and Schmitt trigger U7C. The output of monostable multivibrator 912 at point F is read-out gate (ROG) signal 913, the function of which is explained below. Monostable multivibrators 908 and 912 preferably each produce a fixed pulse of about 1 microsecond in duration, while monostable multivibrator 910 preferably produces a fixed pulse of about 3 microseconds in duration.

The shutter signal 915 at point H is a function of the outputs of both monostable multivibrators 905 and 910. The output of multivibrator 905 at point C and the output of multivibrator 910 at point G are diode OR'ed together through diodes D4 and D5, respectively, to a shutter output pulse stage 914. The shutter output pulse stage 914 comprises a transistor network, including a transistor Q1 whose base 916 is coupled to each of diodes D4 and D5 through a resistor R27. Diodes D4 and D5 are connected to the reference voltage 917 (e.g., 5 volts) through a resistor R28 and a capacitor C3 connected in parallel. The collector 918 of transistor Q1, which produces the shutter signal 915 at point H, is connected through resistor R30 to the reference voltage 917. The base 916 of the transistor is connected to ground 902 through resistor R29, while the emitter 919 of the transistor Q1 is connected directly to ground 902.

Through the OR'ing operation of diodes D4 and D5, the shutter signal 915 (shown as waveform 938 in FIG. 43B) comprises a series of pulses 939 which transition from a low state to a high state when the negative pulse of monostable multivibrator 905 begins, and stay high until the negative pulse of monostable multivibrator 910 times out. The effect is that of a variable duty cycle oscillator, wherein the duty cycle varies according to the light received by the photodiode D1.

The actual exposure period 940 as shown in FIG. 43B is somewhat less than the duration of the pulses 939 in the shutter signal 938. The exposure period 940 is commenced at the start of each pulse 939 of the shutter signal 938, but is terminated by the ROG signal pulse 935 as shown in waveform 934 of FIG. 43B. The ROG pulse 935 terminates the exposure period 940 by causing a transfer of charge from the pixels in the CCD array into the CCD shift registers. When the shutter signal 938 is high, the pixels collect light. When the shutter signal 938 is low, the pixels are shorted; however, the ROG pulse 935 generally terminates the collection of light before the shutter signal 938 transitions from high to low.

Monostables 908, 910 and 912 ensure that the ROG pulse 935 terminating the exposure period 940 falls cleanly just before the end of the shutter pulse 939 and at a time when clocking to the CCD array is disabled. Monostable 910 establishes a 3 microsecond clock disable period 937, at the end of which the shutter pulse 939 generally terminates. At the same time as the 3 microsecond period 937 begins, monostable 908 establishes a 1 microsecond delay 933, after which the ROG pulse 935 is generated by monostable 912. Thus, the ROG pulse 935 falls at some point in the middle of the 3 microsecond period 937 established by monostable 910, and just prior to the end of the shutter pulse 939. The output of monostable 910 disables clocking to the CCD array at the time when the ROG pulse 934 occurs.

The adaptive exposure circuit of FIG. 43A thus provides an exposure period which varies based on the amount of light. When there is more light, the exposure period 940 is smaller, and when there is less light the exposure period 940 is larger (up to, e.g., 30 milliseconds).

FIGS. 44A and 44B show alternative configurations of an optical system employing an adaptive exposure circuit.

In FIG. 44A, a CCD chip 950 produces a video output signal 956 which is connected to a pre-amplifier 951. The pre-amplified signal 952 is connected to a peak detector 954, which measures the peak-to-peak value of the pre-amplified video signal 952. The peak-to-peak signal 957 is provided to an exposure control circuit 955 which adjusts the exposure period for the CCD chip 950. The exposure control circuit 955 is configured in a similar manner to the exposure control circuit of FIG. 43A, but uses the peak-to-peak signal 957 to control the exposure time rather than the collected light as measured by a photodiode D1.

FIG. 44B shows an alternative adaptive exposure technique that is similar to the technique of FIG. 44A, but the peak-to-peak signal level of the first derivative of the video signal is used to control the exposure time of the CCD chip instead. In FIG. 44B, a CCD chip 960 produces a video output signal 967 which is connected to a pre-amplifier 961. The pre-amplified signal 966 is connected to a signal processing block 962. The signal processing block 962 generates a first derivative of the pre-amplified signal 966. The first derivative signal 963 is connected to a peak detector 964, which measures the peak-to-peak value of the first derivative signal 963. The peak-to-peak signal 968 is provided to an exposure control circuit 965 which adjusts the exposure period for the CCD chip 960. The exposure control circuit 965 is configured in a similar manner to the exposure control circuit of FIG. 43A, but uses the peak-to-peak signal 968 generated from the first derivative of the video signal to control the exposure time rather than the collected light as measured by a photodiode D1.

Once the video signal is obtained, transitions in the video signal may be detected by any of a number of means as known in the art. For example, transitions in the video signal may be detected by taking a second derivative of the video signal, and finding zero crossings of the second derivative signal during selected timing intervals. One such technique is described, for example, in U.S. Pat. No. 4,000,397 entitled "Signal Processor Method and Apparatus" issued in the name of Hebert et al., which patent is hereby incorporated by reference as if fully set forth herein.

Figure 45A:
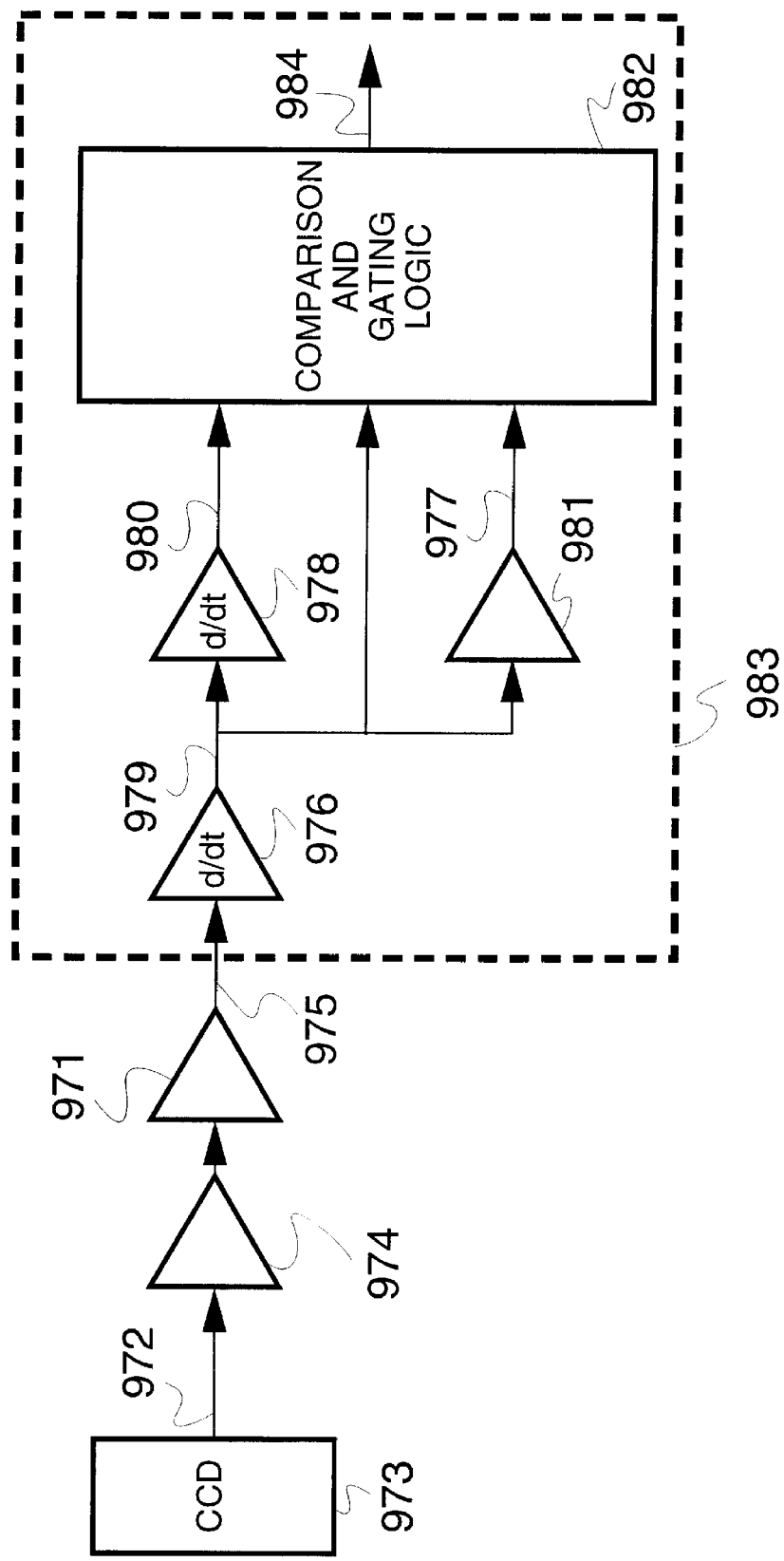
FIG. 45A is a block diagram of a signal processing circuit for determining transitions in a video signal.
Figure 45B:
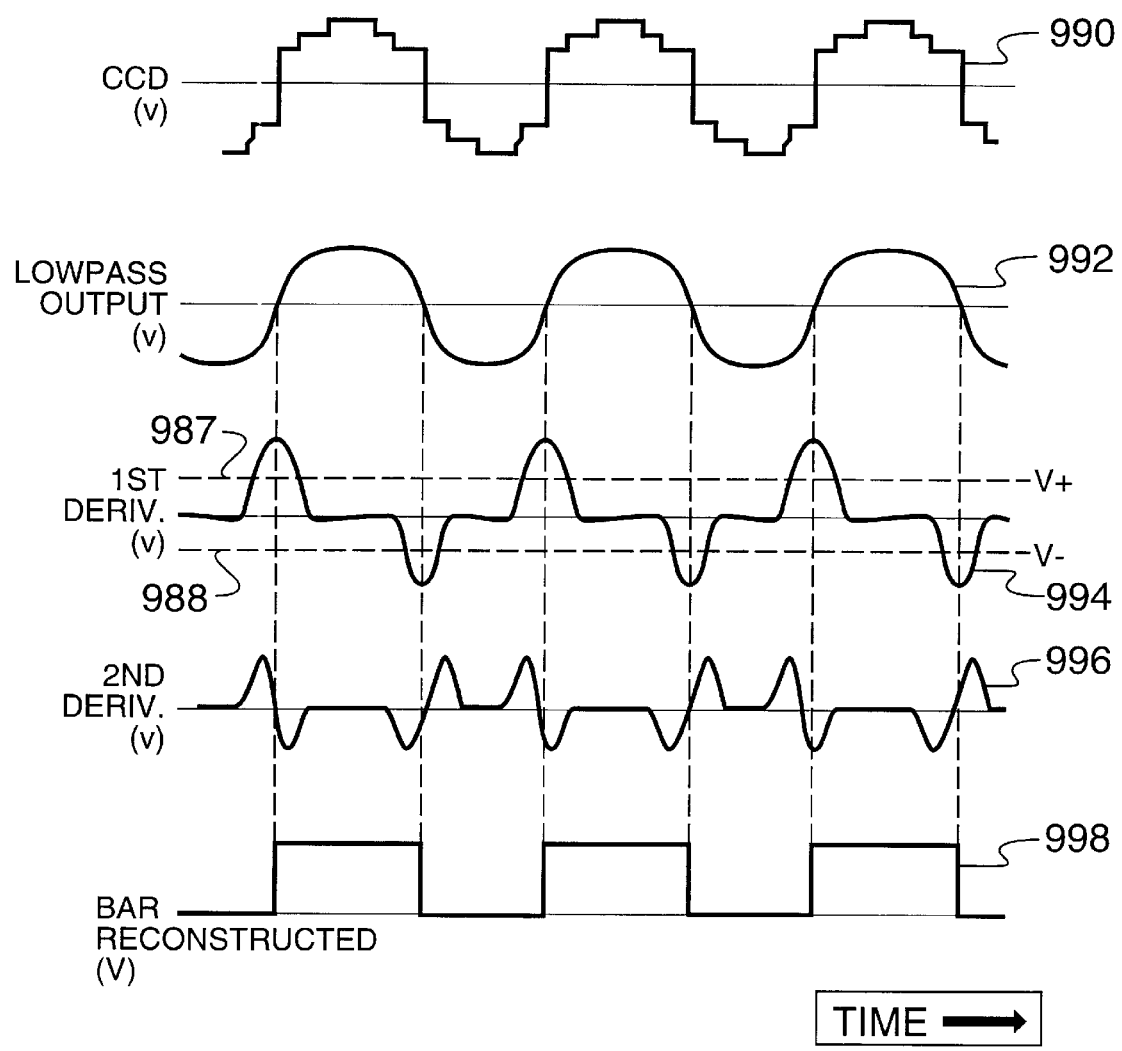
FIG. 45B is a graph of waveform patterns for the circuit of FIG. 45A.

A second-derivative detection circuit is shown in FIG. 45A. Corresponding waveforms for the FIG. 45A circuit are shown in FIG. 45B. In FIG. 45A, a low pass reconstruction filter 971 receives a video input signal 972 from a CCD chip 973. The video input signal 972 may comprise a plurality of stepped voltage levels, like stair steps, corresponding to the contents of the CCD array, such as shown in waveform 990 of FIG. 45B. The video input signal 972 may be passed through an optional gain stage 974, before being fed into the low pass filter 971. The low pass reconstruction filter 971 smooths the video input signal 972 into a smoother, more continuous waveform, such as waveform 992 of FIG. 45B.

The low-pass filtered signal 975 is coupled to a differentiator circuit 976, which generates a first derivative 979 of the low-pass filtered signal 975. The first derivative 979 is coupled to another differentiator circuit 978, which takes another derivative, thereby generating a second derivative 980 of the low-pass filtered signal 975. The first derivative signal 979 corresponds to waveform 994 of FIG. 45B, while the second derivative signal 980 corresponds to waveform 996 of FIG. 45B.

The first derivative signal 979 is also coupled to a peak detector circuit 981, which detects the peak value of the first derivative signal 979 and generates a threshold signal 977 thereby. The threshold signal 977, the first derivative signal 979, and the second derivative signal 980 are provided to a comparator logic block 982. The comparator logic block 982 detects zero crossings of the second derivative signal 996 (as shown in FIG. 45B) by comparing the second derivative signal with a zero voltage level. The zero crossings are considered valid transitions if they occur when the first derivative signal 979 exceeds the level (positive or negative) of the threshold signal 977. Thus, the comparator logic block 982 compares the first derivative signal 979 with the threshold levels (positive and negative) 987, 988 defined by threshold signal 977 and determines a valid transition when the second derivative signal 996 crosses the zero level during a time when the first derivative signal exceeds the level of either threshold signal 987, 988. A reconstructed bar signal waveform 998 such as may be obtained by the method described above is shown in FIG. 45B. The polarity of the bar signal waveform 998 depends on the sign of the first derivative signal 994 at the time of the second derivative zero crossing.

Further details regarding second derivative detection techniques are described in U.S. Pat. No. 4,000,397, cited above. Transitions in the video signal may also be detected by use of techniques described in U.S. Pat. Nos. 5,463,211 and 5,371,361, both of which patents are assigned to the assignee of the present invention and are incorporated by reference as if fully set forth herein. Further related techniques may be found in U.S. Pat. No. 5,298,728 entitled "Signal Processing Method and Apparatus," which patent is also incorporated by reference as if fully set forth herein. The delay-line based signal processing technique described in the '659 application may be workable, for example, without the need for an initial low pass reconstruction filter, and may in some circumstances be configured to operate directly on the CCD video output signal.

Information regarding the location or timing of the transitions in the video signal is provided to the decoder 107, which interprets the transition data by means well known in the art. Thus, the decoder 107 FIG. 1 may determine the relative widths of bars and spaces by measuring the relative time between each transition. The decoder may use the bar and space measurement data to determine which of a variety of bar codes have been read, and/or the particular characters of the bar code. Further details regarding decoding may be found, for example, in U.S. Pat. No. 5,493,108, which is incorporated by reference as if fully set forth herein.

The techniques described herein may be used in combination or, in some instances, separately so as to provide an image reader having increased capacity to operate in various lighting conditions. The described techniques may allow the image reader either to run faster where a self-generated illumination source is used, or to operate in ambient light in the absence of a self-generated illumination source.

The techniques described herein may also be used in conjunction with area imaging techniques such as those described, for example, in U.S. Pat. No. 5,446,271, which is hereby incorporated by reference as if fully set forth herein. Thus, an area imager may be provided having increased speed in various lighting conditions, or being capable of operation in ambient light without a self-generated illumination source.

Figure 46A:
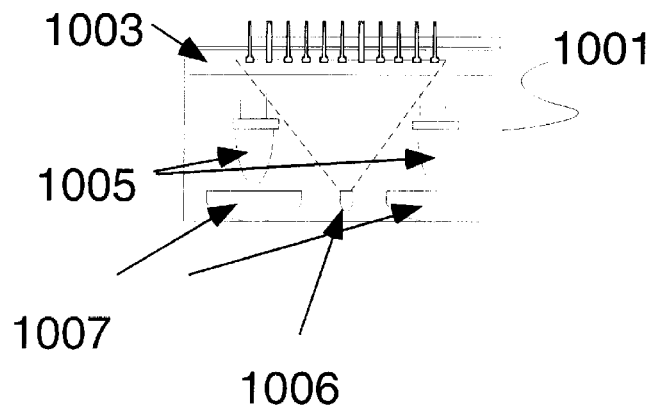
FIGS. 46A–46D are diagrams showing various views of a CCD detection module incorporating various aspects of the present invention.
Figure 46B:
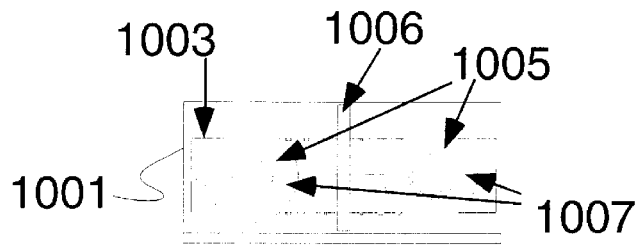
Figure 46C:
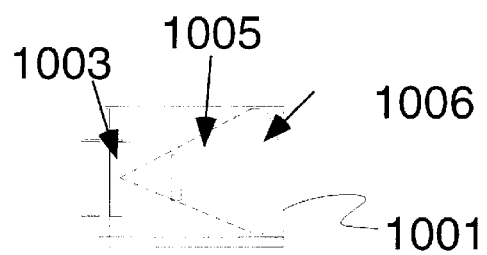
Figure 46D:
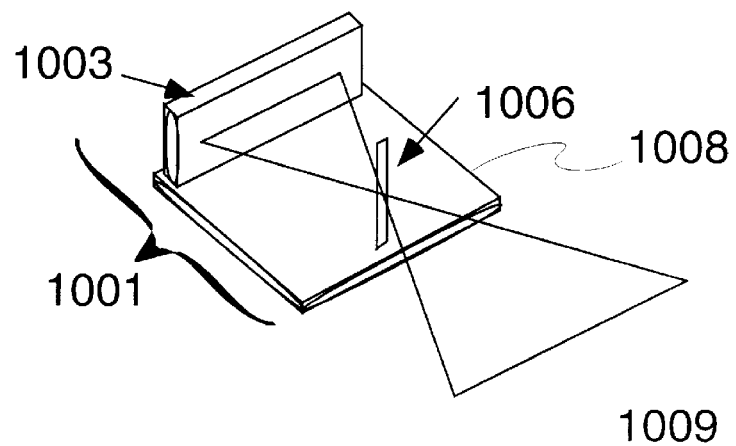

An embodiment of a particular CCD detection module 1001 is depicted from various angles of view in FIGS. 46A–46D. FIG. 46A shows a top view of the CCD detection module 1001, while FIG. 46B shows a front view, FIG. 46C shows a side view, and FIG. 46D shows an oblique view of the CCD detection module 1001. In FIGS. 46A–46D, the CCD detection module 1001 comprises a CCD chip 1003, one or more light emitting diodes (LEDs) 1005, an imaging lens 1006, and one or more focusing or pointer lenses 1007. The pointer lenses 1007 provide focusing for the LEDs 1005. The imaging lens 1006 may be a single zone lens, a high aspect ratio aperture lens, a multi-zone lens, or a combination thereof.

The system may comprise one or more circuit boards 1008 on which to mount the various components of the system, and may further comprise a power supply (not shown), a CCD driver (not shown), and signal processing electronics (not shown). The CCD driver and signal processing electronics may comprise embodiments previously described herein.

In operation, light from the pointer LEDs 1005 is focused through the pointer lenses 1007 in order to allow an operator to aim the unit at the bar code. The purpose of the LEDs is not necessarily to illuminate the bar code, which is illuminated with ambient light. Ambient light reflects off a target (e.g., an encoded symbol) located along a virtual imaging line 1009. The reflected ambient light is focused by an imaging lens 1006 on to the CCD chip 1003. The CCD chip 1003 translates light intensity information into an electrical signal by any of the techniques described previously herein. The electrical signal may be processed and decoded to provide recognition of the encoded symbol.

Alternatively, the CCD detection module 1001 may be configured to operate without the LEDs 1005 and pointer lenses 1007 for providing aiming beams.

Figure 47:
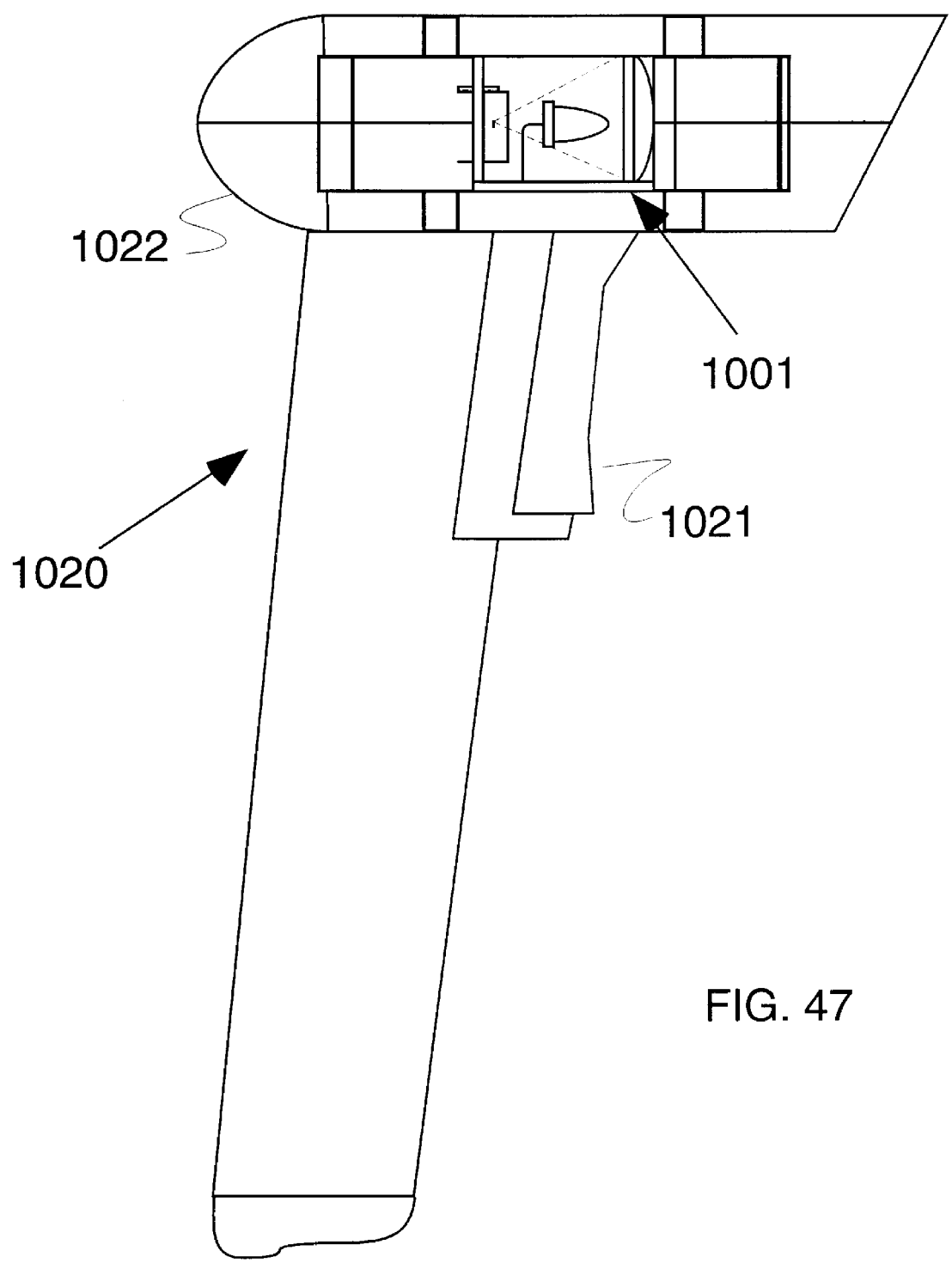
FIG. 47 is a diagram of an embodiment of a handheld imager incorporating the CCD detection module of FIGS. 46A–46D.
Figure 48:
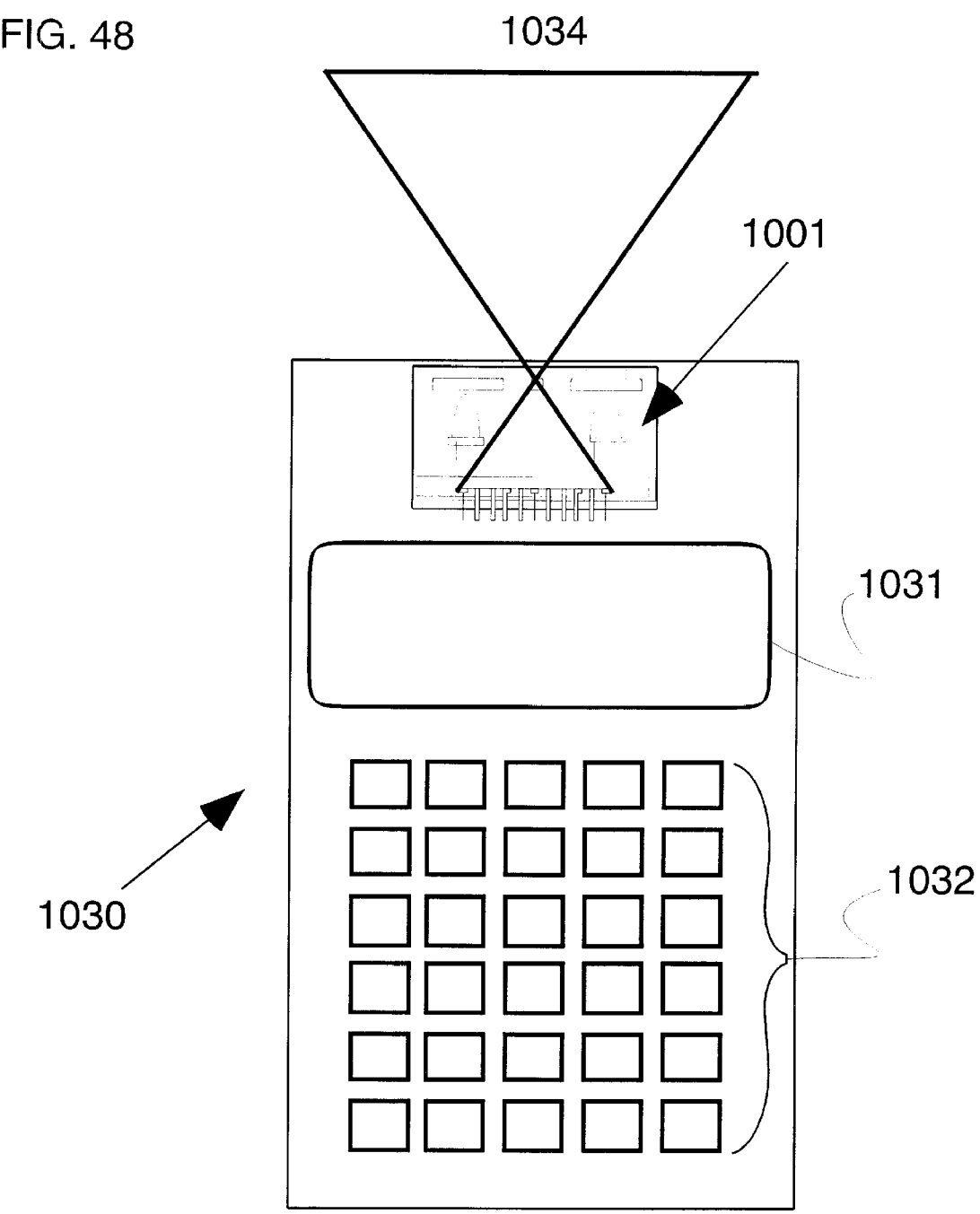
FIG. 48 is a diagram of an embodiment of a portable data terminal incorporating the CCD detection module of FIGS. 46A–46D.

FIGS. 47 and 48 show two different embodiments of systems incorporating the CCD detection module 1001 of FIGS. 46A–46D. FIG. 47 is a diagram of an embodiment of a handheld imaging device 1020 such as may be used in point of sale applications or for inventory control. In the handheld imaging device of FIG. 47, the CCD detection module 1001 is located in a head portion 1022 of the handheld imaging device 1020 and is connected to a handheld scanner controller (not shown). The CCD video output signal from the CCD detection module 1001 may be directly provided to the handheld scanner controller, or may be conditioned and/or processed first by any of the techniques described previously herein. If pointer LEDs are used, the pointer LEDs 1005 may be controlled by a signal from a trigger 1021 which is routed through the handheld scanner controller.

FIG. 48 is a diagram of an embodiment of a portable data terminal 1030 incorporating the CCD detection 1001 module of FIGS. 46A–46D. In FIG. 48, the portable data terminal 1030 comprises a keypad 1032 for entering data and a display screen 1031 for displaying data in a manner known in the art. The CCD detection module 1001 is connected to a decoder (not shown) internal to the portable data terminal 1030. The CCD video output signal from the CCD detection module 1001 may be directly connected to signal conditioning and/or processing electronics in the portable data terminal 1030, or may be conditioned and/or processed within the CCD detection module 1001 by techniques described previously herein, and thereafter provided to the decoder of the portable data terminal 1030. The pointer LEDs 1005 also may be controlled by the portable data terminal 1030.

The CCD detection module 1001 may also be mounted in a fixed fashion (e.g., on a "slim-stand") for retail or industrial applications. Alternatively, the CCD detection module 1001 may be placed on a hand or wrist mounted imaging device for applications such as point of sale operations or inventory control.

Figure 49:
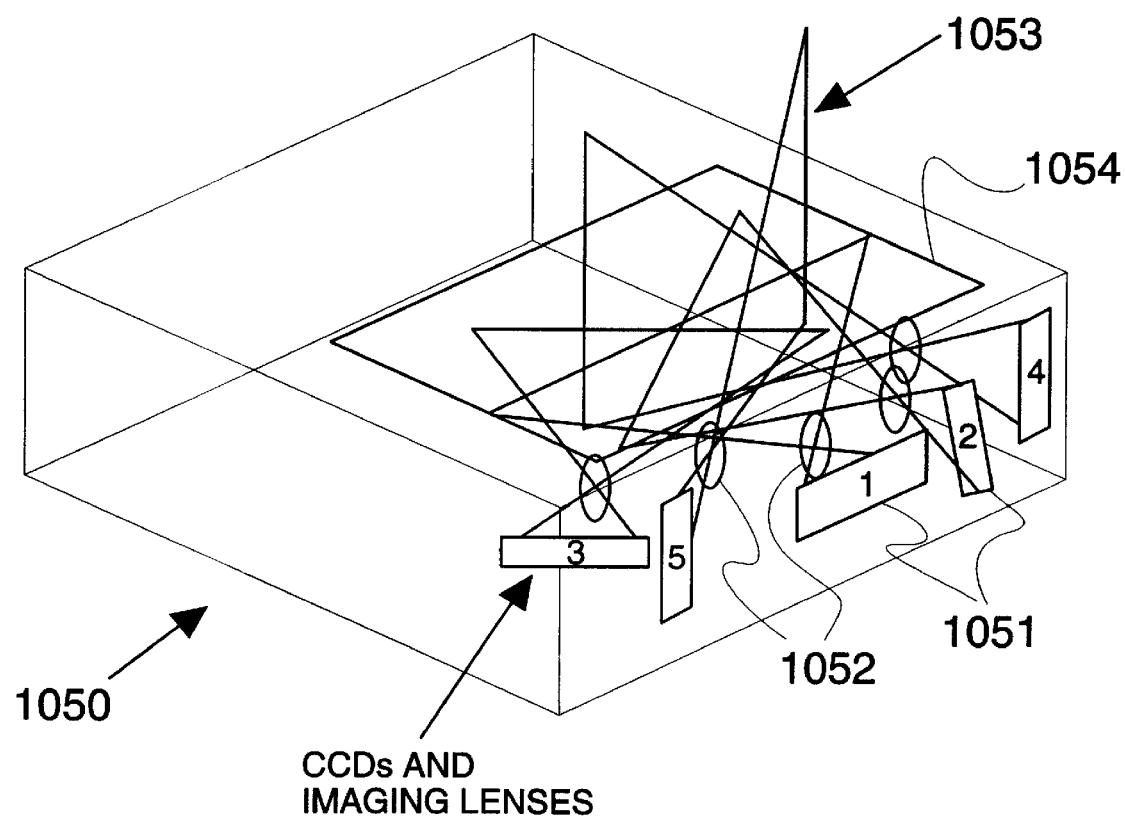
FIG. 49 is a diagram of a multiple-CCD omnidirectional imaging device for reading over a multi-dimensional area.

FIG. 49 is a diagram of an embodiment of a multiple-CCD imaging device which may be employed to read a multi-dimensional area. In FIG. 49, an imaging device 1050 comprises a plurality of CCD detectors 1051. Each CCD detector 1051 has a corresponding lens 1052 for collecting light. The lens 1052 may be a poly-optic lens such as described previously herein, and may be apertured or shaped in accordance with techniques also described previously herein. A transparent element 1054 is placed in the top of the imaging device 1050, such that items bearing encoded symbols may be passed over the imaging device 1050. Light is collected by each lens 1052 along one of a plurality of virtual imaging lines 1053 associated with the lens 1052. By placing the CCD detectors 1051 at different angles (such as shown in the example of FIG. 49), a multi-dimensional region may be covered by the imaging device 1050.

The multiple CCD detectors 1051 may be controlled by a single CCD driver configured in a manner as in FIG. 7, for example. Thus, the CCD detectors 1051 may be polled in series by a single signal processing unit. The imaging device 1050 may be incorporated into a fixed scanning system and may be used for point-of-sale applications, such as retail grocery checkout applications.

Alternative Embodiments

The present invention has been set forth in the form of its preferred embodiments. It is nevertheless intended that modifications to the disclosed optical reading techniques may be made by those skilled in the art without departing from the scope and spirit of the present invention. Moreover, such modifications are considered to be within the purview of the appended claims.

What is claimed is:

1. A bar code reader comprising:

a light sensitive detector;

a lens having a plurality of zones, at least two or said zones having different focal distances and at least partially overlapping depths of field, such that each zone simultaneously focuses light reflected from a target to be read onto said light sensitive detector;

means for reducing, interference between said zones, said means comprising a compound aperture positioned between said lens and said target;

a signal output from said light sensitive detector containing information corresponding to relatively light portions and darker portions of said target; and a decoder coupled to said light sensitive detector.

2. The bar code reader of claim 1 wherein said light focused onto said light sensitive detector while reading said target is comprised solely of ambient light, said bar code reader not including means for illuminating said target while reading.

3. The bar code reader of claim 1 wherein said compound aperture comprises a plurality of apertures, one aperture for each of said zones.

4. The bar code reader of claim 1 wherein said compound aperture comprises a single elongated slit defining a depth of field for each of said zones.

5. The bar code reader of claim 1 wherein said zones are concentric, a first zone comprising a center lens portion and each succeeding zone comprising a ring-shaped lens portion surrounding the preceding zone.

6. The bar code reader of claim 1 wherein said light sensitive detector comprises a charge coupled device.

7. The bar code reader of claim 6 further comprising a correlated double sampling circuit connected to said charge coupled device.

8. The bar code reader of claim 6 further comprising means for varying an exposure time of said charge coupled device as a function of an amount of light received by said charge coupled device.

9. The bar code reader of claim 1 further comprising means for reducing common mode noise in said signal generated by said light sensitive detector.

10. The bar code reader of claim 1 wherein said lens has a depth of field of at least 142.7 millimeters.

11. A bar code reader comprising:

a light sensitive detector;

a lens comprising a rectangular cut-away portion of a round poly-optic lens having a plurality of zones, a first zone comprising a round center portion and each successive zone comprising a concentric ring-shaped lens portion surrounding the preceding zone, at least two of said zones having different focal distances, whereby light reflected from a bar code is focused separately by each zone onto said light sensitive detector;

a signal output from said light sensitive detector containing information corresponding to relatively light portions and darker portions of said bar code; and a decoder coupled to said light sensitive detector.

12. The bar code reader of claim 11 wherein said lens has a width defining a depth of field for each zone, and a cut-away angle defining a field of view for each zone.

13. A bar code reader comprising:

a light sensitive detector;

a lens comprising a cut-away portion of a round poly-optic lens having a plurality of zones, a first zone comprising a round center portion and each successive zone comprising a concentric ring-shaped lens portion surrounding the preceding zone, at least two of said zones having different focal distances, whereby light reflected from a bar code is focused separately by each zone onto said light sensitive detector;

wherein said round poly-optic lens is cut immediately below said first zone to form said cut-away portion;

a signal output from said light sensitive detector containing information corresponding to relatively light portions and darker portions of said bar code; and a decoder coupled to said light sensitive detector.

14. The bar code reader of claim 13 wherein said first zone has the nearest focal distance of said plurality of zones, and each successive zone has a farther focal distance than the previous zone.

15. The bar code reader of claim 13 wherein each zone is apertured.

16. A bar code reader comprising:

a light sensitive detector;

an asymmetric poly-optic lens having a plurality of zones, a first zone comprising a center portion and each successive zone comprising a concentric lens portion surrounding the preceding zone, each of said successive zones having multiple focal distances which are different than the focal distance or focal distances of the other zones, whereby light reflected from a bar code is focused separately by each zone onto said light sensitive detector;

wherein a first portion and second portion of each zone have different focal distances;

a signal output from said light sensitive detector containing information corresponding to relatively light portions and darker portions of said bar code; and a decoder coupled to said light sensitive detector.

17. The bar code reader of claim 16 wherein said first zone has the nearest focal distance of said plurality of zones, and each successive zone has farther focal distances than the previous zone.

18. The bar code reader of claim 16 wherein each zone is apertured.

* * * * *